(12) United States Patent
Kikuchi et al.

(10) Patent No.: US 7,295,760 B2
(45) Date of Patent: *Nov. 13, 2007

(54) DIGITAL VIDEO SYSTEM

(75) Inventors: Shinichi Kikuchi, Yokohama (JP); Hideo Ando, Hino (JP); Kazuhiko Taira, Yokohama (JP); Yuji Ito, Ota-ku (JP); Hideki Mimura, Yokohama (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 524 days.

This patent is subject to a terminal disclaimer.

(21) Appl. No.: 11/005,026

(22) Filed: Dec. 7, 2004

(65) Prior Publication Data

US 2005/0100327 A1    May 12, 2005

Related U.S. Application Data

(62) Division of application No. 10/800,761, filed on Mar. 16, 2004, now Pat. No. 7,187,848, which is a division of application No. 10/417,214, filed on Apr. 17, 2003, now Pat. No. 7,079,754, which is a division of application No. 09/623,460, filed as application No. PCT/JP99/03668 on Jul. 7, 1999, now Pat. No. 6,580,872.

(30) Foreign Application Priority Data

Jul. 7, 1998    (JP)    ................................. 10-192064

(51) Int. Cl.
*H04N 5/91*    (2006.01)

(52) U.S. Cl. ......................................... 386/95; 386/125

(58) Field of Classification Search .................... 386/1, 386/45, 94–97, 106, 111, 112, 125, 126; 360/60, 360/135; 380/201–203; 709/217
See application file for complete search history.

(56) References Cited

U.S. PATENT DOCUMENTS 5,751,371 A    5/1998   Shintani (Continued)

FOREIGN PATENT DOCUMENTS

EP    0 406 021 A    1/1991

(Continued)

OTHER PUBLICATIONS

Patent Abstract of Japan, vol. 1998, No. 10, Aug. 1998, JP 10-126739 A (Kenwood Corp.), May 15, 1998.

(Continued)

*Primary Examiner*—John Miller
*Assistant Examiner*—Christopher Onuaku
(74) *Attorney, Agent, or Firm*—Oblon, Spivak, McClelland, Maier & Neustadt, P.C.

(57) ABSTRACT

The erasion level appending range of a file is instructed. According to this instruction, the erasion level is set. When this setting range does not agree with the cell unit of the current cell, the current cell is divided to set a sequence of divided cells. Playback management information of each of the divided cells and current cell is recreated, and erasion level information is appended to playback management information of the divided cell that belongs to the appending range.

3 Claims, 41 Drawing Sheets

U.S. PATENT DOCUMENTS

| | | | |
|---|---|---|---|
| 5,902,115 A * | 5/1999 | Katayama | 386/106 |
| 5,991,798 A * | 11/1999 | Ozaki et al. | 709/217 |
| 5,999,698 A * | 12/1999 | Nakai et al. | 386/125 |
| 6,078,727 A | 6/2000 | Saeki et al. | |
| 6,181,870 B1 | 1/2001 | Okada et al. | |
| 6,396,998 B1 | 5/2002 | Nozaki et al. | |
| 6,453,119 B1 | 9/2002 | Maruyama et al. | |
| 6,580,872 B1 * | 6/2003 | Kikuchi et al. | 386/95 |
| 6,741,796 B1 * | 5/2004 | Heo | 386/95 |

FOREIGN PATENT DOCUMENTS

| | | |
|---|---|---|
| EP | 0 680 046 A | 11/1995 |
| EP | 0 833 337 A | 4/1998 |
| EP | 0 903 742 A | 3/1999 |
| EP | 0 905 699 A | 3/1999 |
| JP | 7-64838 | 3/1995 |
| JP | 10 222964 | 8/1998 |
| WO | WO 98 22947 A | 5/1998 |

OTHER PUBLICATIONS

Explanation of Circumstances Concerning Accelerated Examination of Japanese Patent Application No. 1998-192064, submitted to Japanese Patent Office on Apr. 25, 2002 (with English Translation).

* cited by examiner

CONTENTS OF PRESENTATION CONTROL INFORMATION PCI

| SYMBOL | CONTENTS |
|---|---|
| PCI_GI | PCI GENERAL INFORMATION |
| NSML_AGLI | ANGLE INFO. FOR NONSEAMLESS |
| HLI | HIGHLIGHT INFORMATION |
| RECI | RECORDING INFORMATION |

FIG. 6

CONTENTS OF PRESENTATION CONTROL INFORMATION
GENERAL INFORMATION PCI_GI

| SYMBOL | CONTENTS |
|---|---|
| NV_PCK_LBN | LOGICAL BLOCK NUMBER OF NAVIGATION PACK |
| VOBU_CAT | CATEGORY OF VOBU |
| RESERVED | RESERVED |
| VOBU_UOP_CTL | USER OPERATION CONTROL OF VOBU |
| VOBU_S_PTM | START PTM OF VOBU |
| VOBU_E_PTM | END PTM OF VOBU |
| VOBU_SE_E_PTM | END PTM OF SEQUENCE END IN VOBU |
| C_ELTM | CELL ELAPSE TIME |
| RESERVED | RESERVED |

FIG. 7

STRUCTURE OF PROGRAM CHAIN INFO. PGCI

| |
|---|
| PROGRAM CHAIN GENERAL INFO. PGC_GI |
| PROGRAM CHAIN COMMAND TABLE PGC_CMDT |
| PROGRAM CHAIN PROGRAM MAP PGC_PGMAP |
| CELL PLAYBACK INFO. TABLE C_PBIT |
| CELL POSITION INFO. TABLE C_POSIT |

FIG. 10

CONTENTS OF CELL PLAYBACK INFO. TABLE C_PBIT

| |
|---|
| CELL PLAYBACK INFO. #1 (C_PBI#1) |
| CELL PLAYBACK INFO. #2 (C_PBI#2) |
| ⋮ |
| CELL PLAYBACK INFO. #n (C_PBI#n) |

FIG. 11

CONTENTS OF CELL PLAYBACK INFORMATION C_PBI

| SYMBOL | CONTENTS |
|---|---|
| C_CAT | CELL CATEGORY |
| C_PBTM | CELL PLAYBACK TIME |
| C_FVOBU_SA | START ADR. OF 1ST VOBU IN CELL |
| C_FILVU_EA | END ADR. OF 1ST ILVU IN CELL |
| C_LVOBU_SA | START ADR. OF LAST VOBU IN CELL |
| C_LVOBU_EA | END ADR. OF LAST VOBU IN CELL |
| CELL TYPE | ERASION LEVEL FLAG<br>00h=PLAYBACK IS PERMITTED & AUTOMATIC ERASION IS PROHIBITED<br>01h=PLAYBACK IS PERMITTED & AUTOMATIC ERASION IS PROHIBITED |

FIG. 12

CONTENTS OF CELL CATEGORY C_CAT

| b31 b30 | b29 b28 | b27 | b26 | b25 | b24 |
|---|---|---|---|---|---|
| CELL BLOCK MODE | CELL BLOCK TYPE | SEAMLESS PLAYBACK FLAG | INTER-LEAVED ALLOCATION FLAG | STS DISCONTI-NUITY FLAG | SEAMLESS ANGLE CHANGE FLAG |

| b23 | b22 | b21 b20 | b16 |
|---|---|---|---|
| RESERVED | CELL PLAY-BACK MODE | ACCESS RESTRICTION FLAG | CELL TYPE |

| b15 b8 |
|---|
| CELL STILL TIME |

| b7 b0 |
|---|
| CELL COMMAND NUMBER |

FIG. 13

CONTENTS OF PROGRAM CHAIN GENERAL INFO. PGC_GI

| SYMBOL | CONTENTS |
| --- | --- |
| PGC_CNT | PGC CONTENTS |
| PGC_PB_TM | PGC PLAYBACK TIME |
| PGC_UOP_CTL | PGC USER OPERATION CONTROL |
| PGC_AST_CTLT | PGC AUDIO STREAM CONTROL TABLE |
| PGC_SPST_CTLT | PGC SUB-PICT. STREAM CONTROL TABLE |
| PGC_NV_CTL | PGC NAVIGATION CONTROL |
| PGC_SP_PLT | PGC SUB-PICTURE PALETTE |
| PGC_CMDT_SA | START ADR. OF PGC COMMAND TABLE |
| PGC_PGMAP_SA | START ADR. OF PROGRAM MAP |
| C_PBIT_SA | START ADR. OF CELL PLAYBACK TABLE |
| C_POSIT_SA | START ADR. OF CELL POS. INFO. TABLE |

FIG. 14

CONTENTS OF PGC GENERAL INFO. PGC_GI FOR TRASH PGC

| SYMBOL | CONTENTS |
|---|---|
| PGC_CNT | PGC CONTENTS |
| PGC_PB_TM | PGC PLAYBACK TIME |
| PGC_UOP_CTL | PGC USER OPERATION CONTROL |
| PGC_AST_CTLT | PGC AUDIO STREAM CONTROL TABLE |
| PGC_SPST_CTLT | PGC SUB-PICT. STREAM CONTROL TABLE |
| PGC_NV_CTL | PGC NAVIGATION CONTROL |
| PGC_SP_PLT | PGC SUB-PICTURE PALETTE |
| PGC_CMDT_SA | START ADR. OF PGC COMMAND TABLE |
| PGC_PGMAP_SA | START ADR. OF PROGRAM MAP |
| C_PBIT_SA | START ADR. OF CELL PLAYBACK TABLE |
| C_POSIT_SA | START ADR. OF CELL POS. INFO. TABLE |
| TRASH_PGC_FLG | TRASH PGC FLAG<br>01h=TRASH PGC<br>00h=CONVENTIONAL PGC |

FIG. 15

CONTENTS OF C_PBI FOR TRASH PGC

| SYMBOL | CONTENTS |
|---|---|
| C_CAT | PGC CATEGORY |
| C_PBTM | PGC PLAYBACK TIME |
| C_FVOBU_SA | START ADR. OF 1ST VOBU IN CELL |
| C_FILVU_EA | END ADR. OF 1ST ILVU IN CELL |
| C_LVOBU_SA | START ADR. OF LAST VOBU IN CELL |
| C_LVOBU_EA | END ADR. OF LAST VOBU IN CELL |
| PGC_N | ORIGINAL PGC NUMBER OF CURRENT CELL |
| C_ID_N | CORRESPONDING CELL NUMBER OF ORIGINAL PGC |

FIG. 16

CONTENTS OF VMGI_MAT

| FIELD NAME | CONTENTS |
| --- | --- |
| VMG_ID | VMG IDENTIFIER |
| RTR_VNG_EA | END ADDRESS OF RTR_VMG |
| RESERVED | RESERVED |
| VMGI_EA | END ADDRESS OF VMGI |
| VERN | VERSION NUMBER OF DVD SPEC. FOR VIDEO RECORDING |
| RESERVED | RESERVED |
| TM_ZONE | TIME ZONE |
| STILL_TM | STILL TIME FOR STILL PICTURES |
| CHRS | CHARACTER SET CODE FOR PRIMARY TEXT |
| RSM_MRKI | RESUME MARKER INFORMATION |
| REP_PICTI | DISC REPRESENTATIVE PICTURE INFORMATION |
| RESERVED | RESERVED |
| M_AVFIT_SA | START ADDRESS OF M_AVFIT |
| S_AVFIT_SA | START ADDRESS OF S_AVFIT |
| RESERVED | RESERVED |
| ORG_PGCI_SA | START ADDRESS OF ORG_PGCI |
| UD_PGCIT_SA | START ADDRESS OF UD_PGCIT |
| TXTDT_MG_SA | START ADDRESS OF TXTDT_MG |
| MNFIT_SA | START ADDRESS OF MNFIT |
| RESERVED | RESERVED |

FIG. 22

CONTENTS OF PGC_GI

| FIELD NAME | CONTENTS |
| --- | --- |
| RESERVED | RESERVED |
| PG_Ns | NUMBER OF PROGRAMS |
| CI_SRP_Ns | NUMBER OF CI SEARCH POINTERS |
| TRASH_PGC_FLG | TRASH PGC FLAG<br>01h=TRASH PGC<br>00h=CONVENTIONAL PGC |

FIG. 28

CONTENTS OF PGI

| FIELD NAME | CONTENTS |
| --- | --- |
| RESERVED | RESERVED |
| PG_TY | PROGRAM TYPE |
| C_Ns | NUMBER OF CELLS IN PROGRAM |
| PRM_TXTI | PRIMARY TEXT INFORMATION |
| IT_TXT_SRPN | ITEM TEXT SRP NUMBER |
| THM_PTRI | THUMBNAIL POINTER INFORMATION |

FIG. 29

CONTENTS OF M_C_GI

| FIELD NAME | CONTENTS |
|---|---|
| RESERVED | RESERVED |
| C_TY | CELL TYPE |
| M_VOBI_SRPN | MOVIE VOBI SRP NUMBER |
| C_EPI_Ns | NUMBER OF CELL ENTRY POINT INFO. |
| C_V_S_PTM | PRESENTATION START TIME OF CELL |
| C_V_E_PTM | PRESENTATION END TIME OF CELL |

CONTENTS OF M_C_EPI

| FIELD NAME | CONTENTS |
|---|---|
| EP_TY | ENTRY POINT TYPE |
| EP_PTM | PTM OF ENTRY POINT |
| PRM_TXTI | PRIMARY TEXT INFORMATION |

2

DIGITAL VIDEO SYSTEM

CROSS REFERENCE TO RELATED APPLICATION

This Application is a Divisional of application Ser. No. 10/800,761, filed on Mar. 16, 2004, now U.S. Pat. No. 7,187,848 which is a divisional of application Ser. No. 10/417,214, filed on Apr. 17, 2003, now U.S. Pat. No. 7,079,754 which is a divisional of application Ser. No. 09/623,460, filed on Sep. 12, 2000, now granted as U.S. Pat. No. 6,580,872, which is the National Stage of International Application No. PCT/JP99/03668, filed on Jul. 7, 1999. This Application is based upon and claims the benefit of priority from the prior Japanese Patent Application No. 10-192064, filed on Jul. 7, 1998. The entire contents of each of the above-listed applications are incorporated herein by reference.

TECHNICAL FIELD

The present invention relates to a digital video system (apparatus and method) capable of real-time recording, and an information recording medium (recordable optical disc) used in this system.

BACKGROUND ART

In recent years, systems for playing back the contents of optical discs such as video CDs that record video data, audio data, and the like have been developed, and have prevailed for the purpose of playing back movie software titles, karaoke data, and the like.

Among such systems, a DVD (Digital Versatile Disc) standard that uses MPEG2 (Moving Picture Experts Group 2) international standards has been proposed.

This standard supports MPEG2 as a moving picture compression scheme, and AC-3 audio, MPEG audio, and the like as audio schemes. The standard is appended with sub-picture data for superimposed dialogs and menus obtained by compressing bitmap data, and control data (navigation data) for special playback control. Furthermore, this standard supports the UDF (Universal Disc Format) Bridge (a hybrid of UDF and ISO9660) to allow a computer to read data.

Also, optical discs such as a DVD-RAM and the like on which digital data can be written or rewritten have been developed. A function that allows one to easily edit the recorded contents is required of a digital video system using such DVD-RAM or the like.

However, a home-use digital video system which allows end-users to easily edit the recorded contents has not become available yet.

DISCLOSURE OF INVENTION

It is an object of the present invention to provide a digital video system (apparatus and method) which allows easy and flexible editing.

It is another object of the present invention to provide an information recording medium (recordable optical disc) which allows efficient data management, and can manage save units finely.

In order to achieve the above objects, the digital video system of the present invention uses a data area for storing file data containing digital movie information recorded in a predetermined recording unit; and a management area for storing navigation data for managing information stored in the data area. In this system the management area includes a storage field for storing an erasion level flag which sets a specific recording unit in the data area in a temporarily erased state.

BRIEF DESCRIPTION OF DRAWINGS

FIG. 6 is a view for explaining the contents of presentation control information (PCI) shown in FIG. 5;

FIG. 7 is a view for explaining the contents of presentation control information general information (PCI_GI) shown in FIG. 6;

FIG. 10 is a view for explaining the contents of program chain information (PCGI) shown in FIG. 9;

FIG. 11 is a view for explaining the contents of a cell playback information table (C_PBIT) shown in FIG. 10;

FIG. 12 is a view for explaining the contents of cell playback information (C_PBI) shown in FIG. 11;

FIG. 13 is a view for explaining the contents of a cell category (C_CAT) shown in FIG. 12;

FIG. 14 is a view for explaining the contents of program chain general information (PGC_GI) for normal PGC;

FIG. 15 is a view for explaining the contents of program chain general information (PGC_GI) for trash PGC;

FIG. 16 is a view for explaining the contents of cell playback information (C_PBI) for trash PGC;

FIG. 22 is a view for explaining the contents of a video manager information table (VMGI_MAT) shown in FIG. 21;

FIG. 28 is a view for explaining the contents of PGC general information (PGC_GI) shown in FIG. 27;

FIG. 29 is a view for explaining the contents of program information (PGI) shown in FIG. 27;

BEST MODE OF CARRYING OUT THE INVENTION

Figure 1:
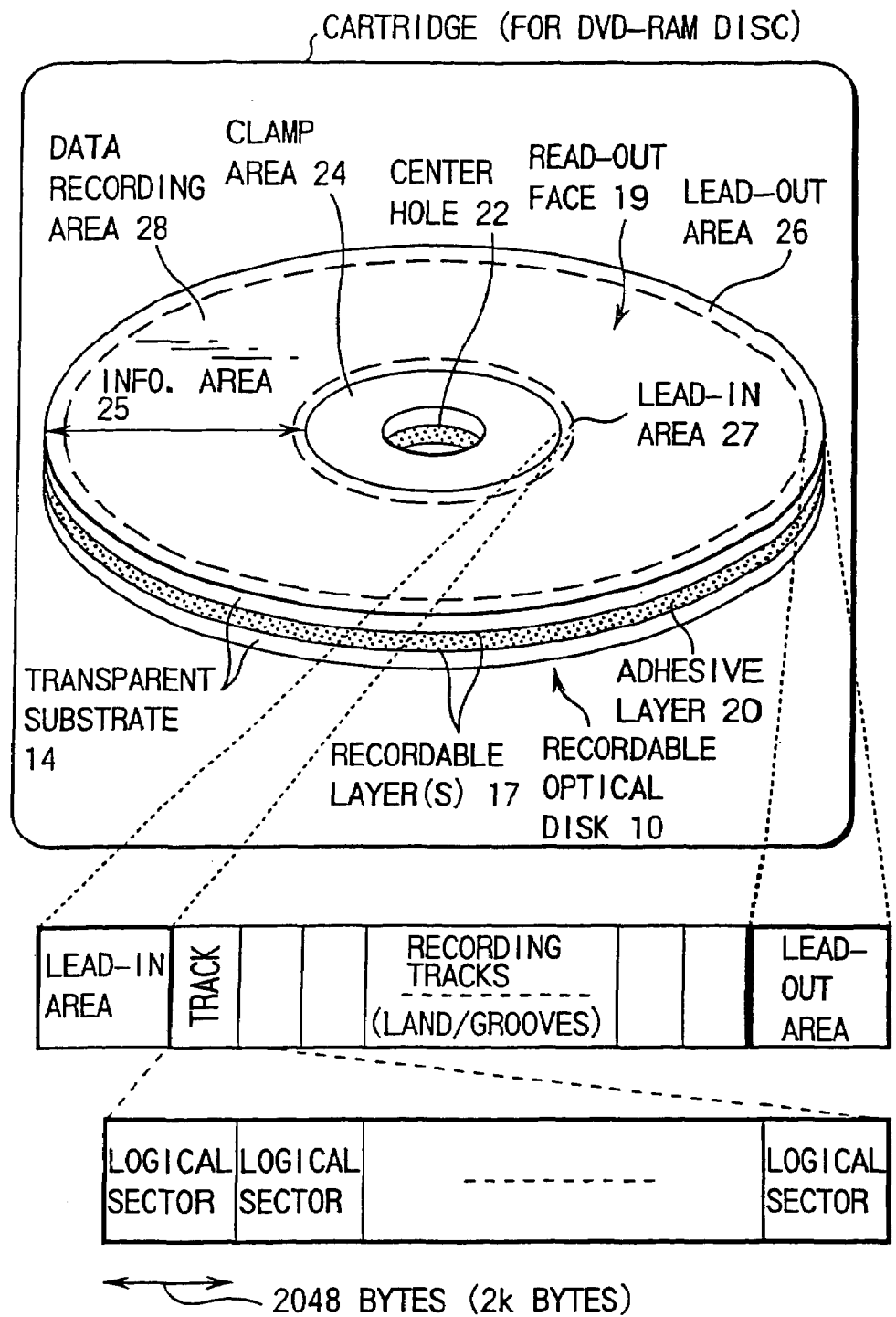
FIG. 1 is a perspective view for explaining the structure of a recordable optical disc according to an embodiment of the present invention.

Preferred embodiments of the present invention will be described hereinafter with reference to the accompanying drawings. In this description, the same reference numerals and symbols denote illustrated components having common functions throughout the figures, and a repetitive description thereof will be avoided.

FIG. 1 is a view for explaining the structure of a recordable optical disc according to an embodiment of the present invention. FIG. 1 also shows the correspondence between the data recording area of optical disc 10 (DVD-RAM or the like), and data recording tracks recorded there.

The physical structure of the optical disc will be explained first.

Referring to FIG. 1, optical disc 10 has a structure obtained by adhering a pair of transparent substrates 14 each having recordable layer 17 (one or two layers) using adhesive layer 20. Each substrate 14 is formed of a 0.6-mm thick polycarbonate film, and adhesive layer 20 consists of an ultraviolet setting resin having a thickness of 40 μm to 70 μm. When the pair of substrates 14 are adhered to each other so that their recordable layers 17 contact each other on the surfaces of adhesive layer 20, a 1.2-mm thick large-capacity optical disc 10 is obtained.

Reference numeral 22 denotes a center hole; and 24, a clamp area. Reference numeral 25 denotes an information area; 26, a lead-out area; 27, a lead-in area; and 28, a data recording area. On recordable layer 17 of information area 25, a recording track is continuously formed in, e.g., a spiral pattern. The continuous track is divided into a plurality of physical sectors, which have serial numbers and are used as recording units.

Referring to FIG. 1, when disc 10 is a rewritable DVD-RAM/DVD-RW (or write once DVD-R), this disc is housed in a cartridge. When the cartridge that houses DVD-RAM disc 10 is loaded into a disc recording/playback apparatus (DVD video recorder or DVD video player), and is extracted, disc 10 alone remains in the apparatus.

The data recording track of recordable layer 17 is divided into a plurality of logical sectors (minimum recording units) each having a given storage capacity, and data are recorded with reference to these logical sectors. The recording capacity per logical sector is determined to be 2,048 bytes which are equal to one pack data length.

Figure 2:
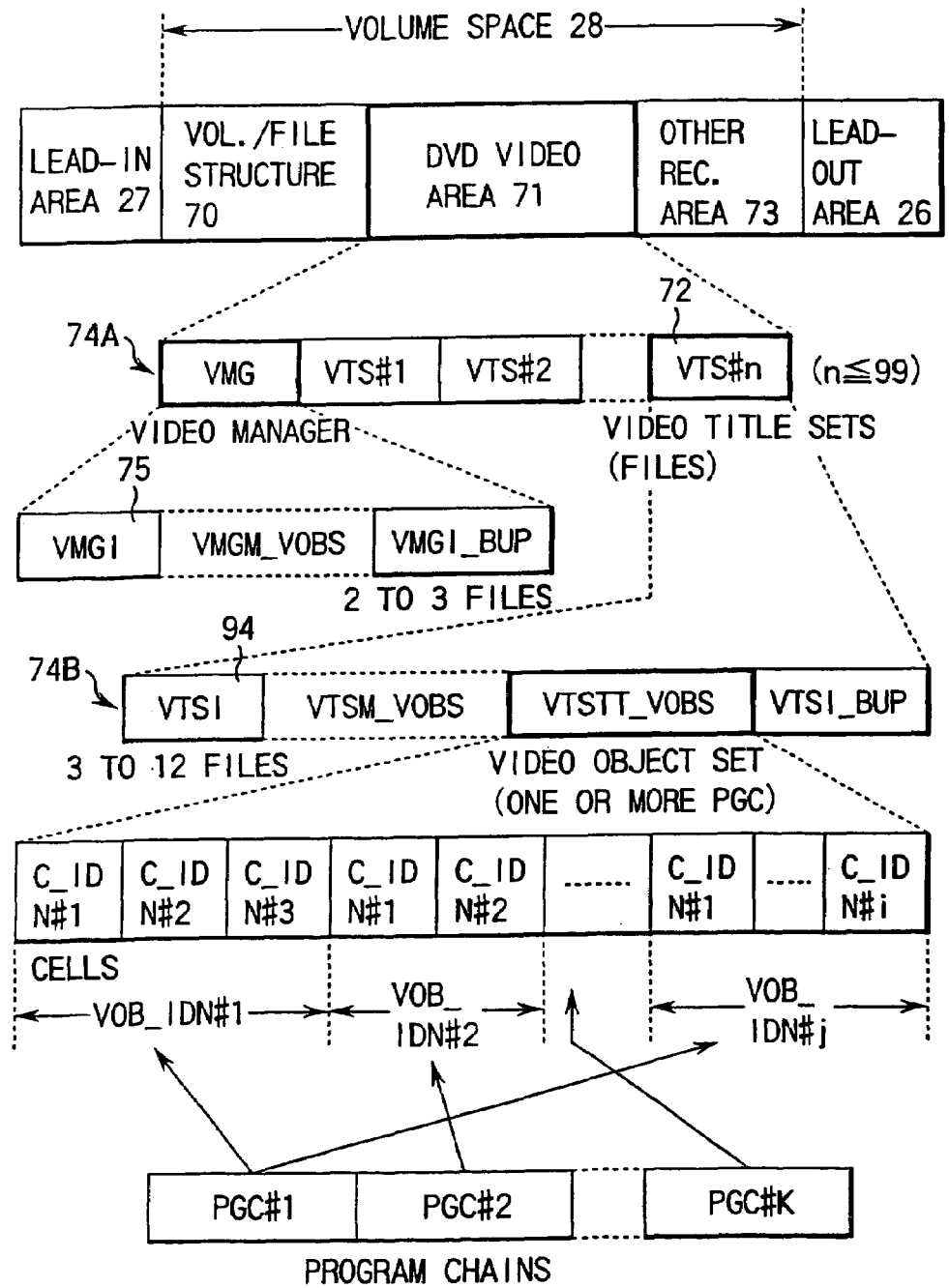
FIG. 2 is a view for explaining an example of the logical structure of information recorded on the optical disc shown in FIG. 1.

FIG. 2 is a view for explaining an example of the logical structure of information recorded on the optical disc shown in FIG. 1.

Information area 25 shown in FIG. 1 can have a structure shown in, e.g., FIG. 2. The logical format of this structure is defined to comply with, e.g., the Universal Disc Format (UDF) Bridge (a hybrid of UDF and ISO9660) as one of standard formats.

Referring to FIG. 2, data recording area 28 is assigned as a volume space. Volume space 28 includes space (volume/file structure) 70 for information of the volume and file structures, space (DVD video area) 71 for applications compatible with the DVD specifications, and space (other recording area) 73 for applications compatible with specifications other than the DVD specifications.

Volume space 28 is physically divided into a large number of sectors, which have serial numbers. The logical addresses of data recorded on this volume space 28 mean logical sector numbers, as specified by the UDF Bridge. The logical sector size in this space is 2,048 bytes as in the physical sector size. The logical sector numbers are assigned serial numbers in ascending order of physical sector number. Note that each physical sector is appended with error correction information and the like unlike logical sectors.

Volume space 28 has a hierarchical structure, which includes volume/file structure area 70, DVD video area 71 consisting of one or more video title sets VTS#n 72, and other recording area 73. These areas are split up on the boundaries of logical sectors. Note that one logical sector is defined to be 2,048 bytes, and one logical block is also defined to be 2,048 bytes. Hence, one logical sector is defined equivalently with one logical block.

Volume/file structure area 70 corresponds to a management area defined by the UDF Bridge. Based on the description of this area 70, the contents of video manager VMG are stored in an internal system memory (not shown) of the apparatus.

DVD video area 71 is constructed by file 74A containing one or more video title sets VTS 72, and video manager VMG for managing these VTS. Note that VMG contains video manager information VMGI, video object set VMGM_VOBS for manager menus, and backup file VMGI_BUP of VMGI, as needed.

Each VTS 72 is constructed by file 74B that contains video object set VTSM_VOBS for video title set menus, video object set VTSTT_VOBS for video title set titles, video title set information VTSI for managing VTSTT_VOBS, and backup file VTSI_BUP of VTSI, as needed.

Other recording area 73 can record information that can be used in VTS mentioned above or other kinds of information that are irrelevant to VTS.

Note that VTSTT_VOBS defines a set of one or more video objects VOB. Each VOB defines a set of one or more cells. A set of one or more cells make up program chain PGC. Assuming that one PGC corresponds to one drama, a plurality of cells that make up this PGC can correspond to various scenes in that drama.

When volume space 28 of single disc 10 stores a plurality of video title sets VTS#n, the structure shown in FIG. 2 is suitably used. However, when volume space 28 of single disc 10 stores only one video title set VTS, another structure may be used. An example of such structure will be described later with reference to FIG. 17. In this structure, file 74A shown in FIG. 2 is omitted, and a file similar to file 74B is stored in the data area of DVD video area 71 instead.

Figure 3:
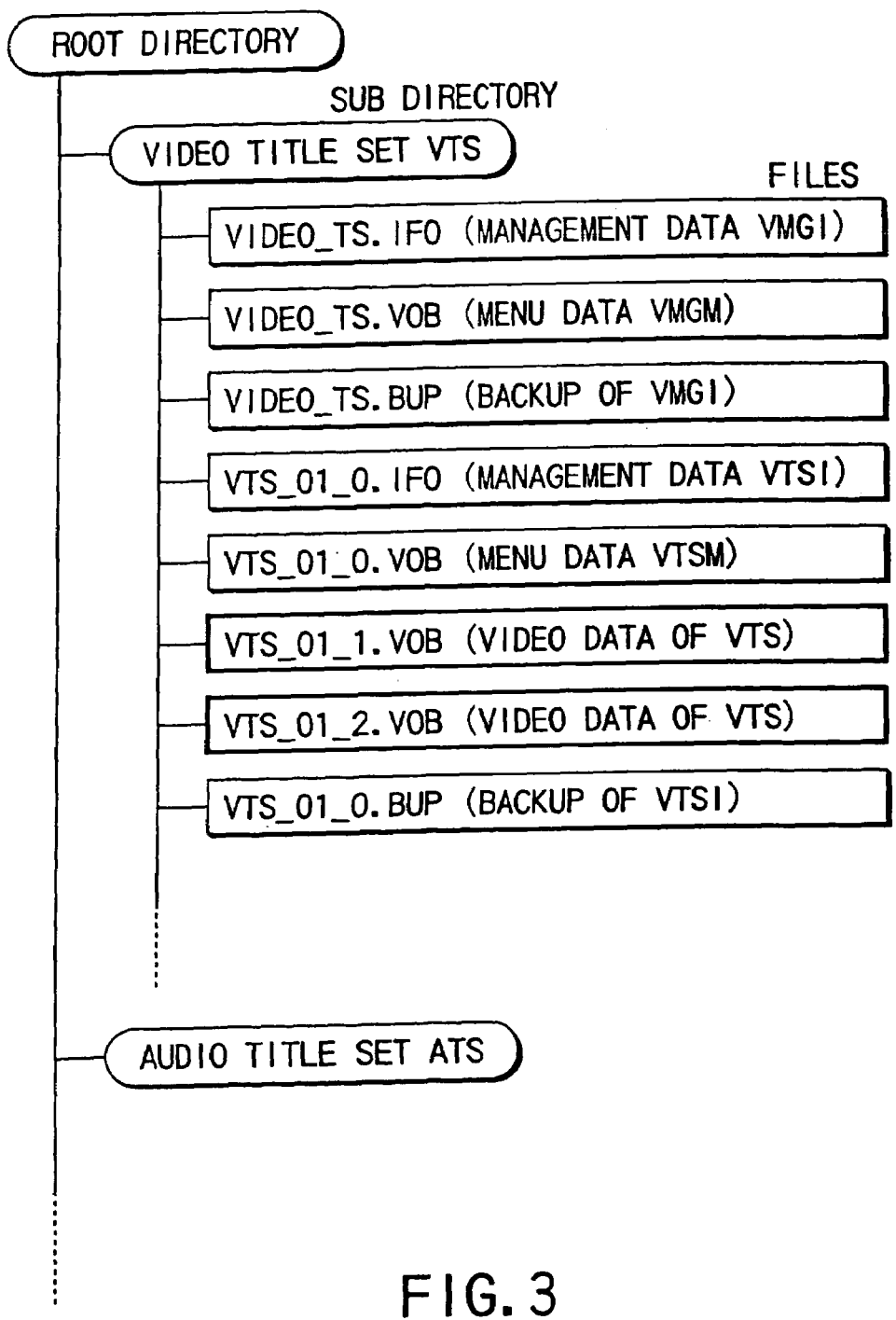
FIG. 3 is a view for explaining an example of the directory structure of information (data files) recorded on the optical disc shown in FIG. 1.

FIG. 3 shows an example of the directory structure of information (data files) recorded on optical disc 10.

As shown in FIG. 3, the subdirectory of video title set VTS, that of audio title set ATS, and the like are linked under the root directory. Various video files (files VMGI, VMGM, VTSI, VTSM, VTS, and the like) are contained in the subdirectory of VTS and managed systematically. A specific file (e.g., specific VTS) can be accessed by designating the path from the root directory to that file.

DVD-RAM (DVD-RW) disc 10 or DVD-R disc 10 may be pre-formatted to have the directory structure shown in FIG. 3 (or FIG. 20 to be described later), and pre-formatted discs 10 may be put on the market as unused discs (raw discs) for DVD video recording.

Figure 20:
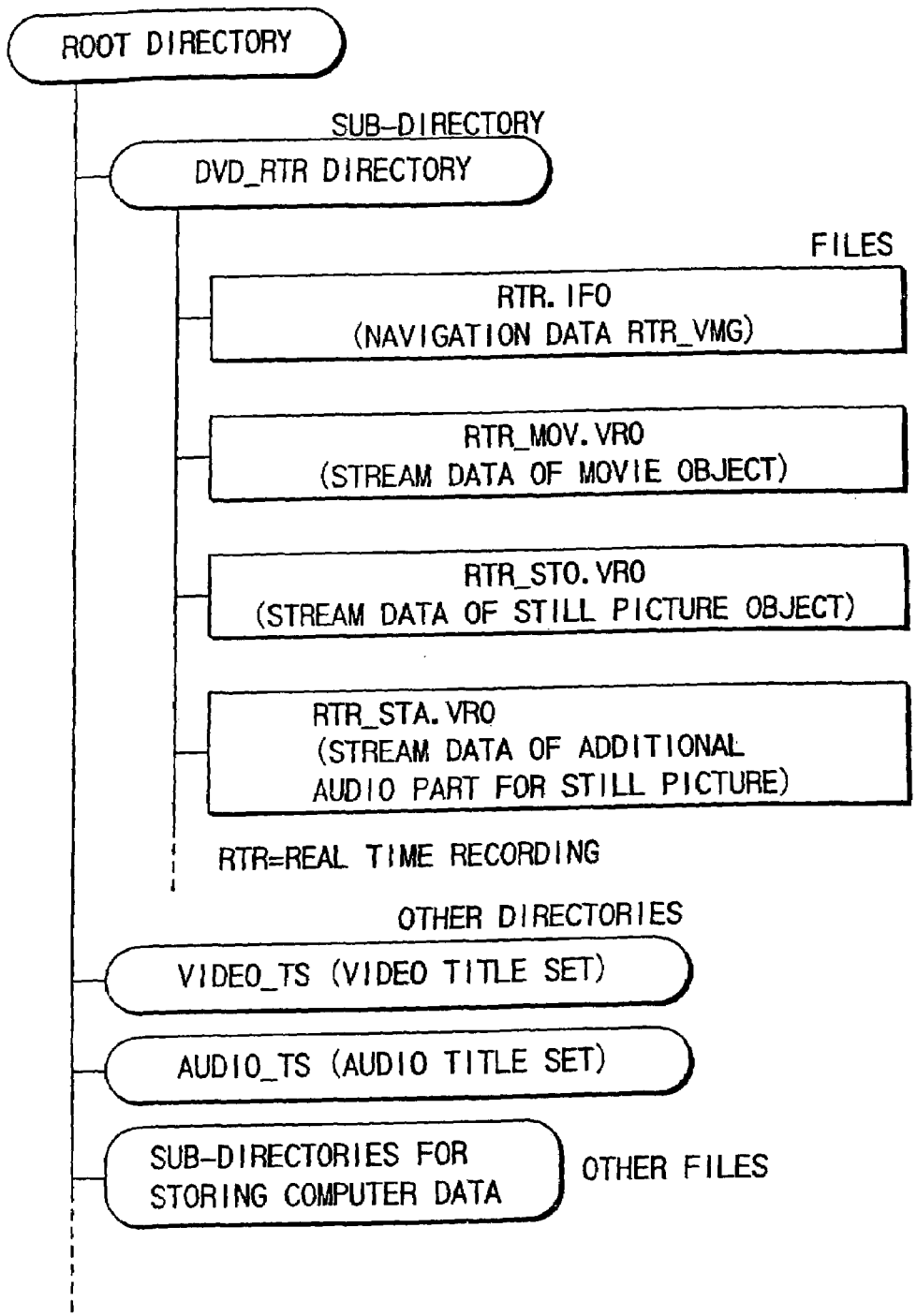
FIG. 20 is a view for explaining the file structure of digital information recorded on the optical disc shown in FIG. 1.

That is, the root directory of pre-formatted raw disc 10 includes a subdirectory named VTS (or DVD_RTR shown in FIG. 20). This subdirectory can contain various management data files (VIDEO_TS.IFO, VTS_01_0.IFO shown in FIG. 3; RTR.IFO shown in FIG. 20); backup files (VIDEO_TS.BUP, VTS_01_0.BUP; backup files are omitted in FIG. 20) for backing up information of these management data files; and video data files (VTS_01_1.VOB and the like in FIG. 3; RTR_MOV.VRO and the like in FIG. 20) which are managed based on the contents of the management data files and store digital moving picture information.

The subdirectory (VTS directory in FIG. 3 or DVD_RTR directory in FIG. 20) can also contain menu data files (VMGM, VTSM) for storing predetermined menu information, as needed.

On single disc 10, a file called video manager VMG is present as information (navigation data) for managing this disc. Furthermore, title set VTS contains a video title set information VTSI file (RTR.IFO in case of FIG. 20), video file, and backup file of VTSI.

Figure 4:
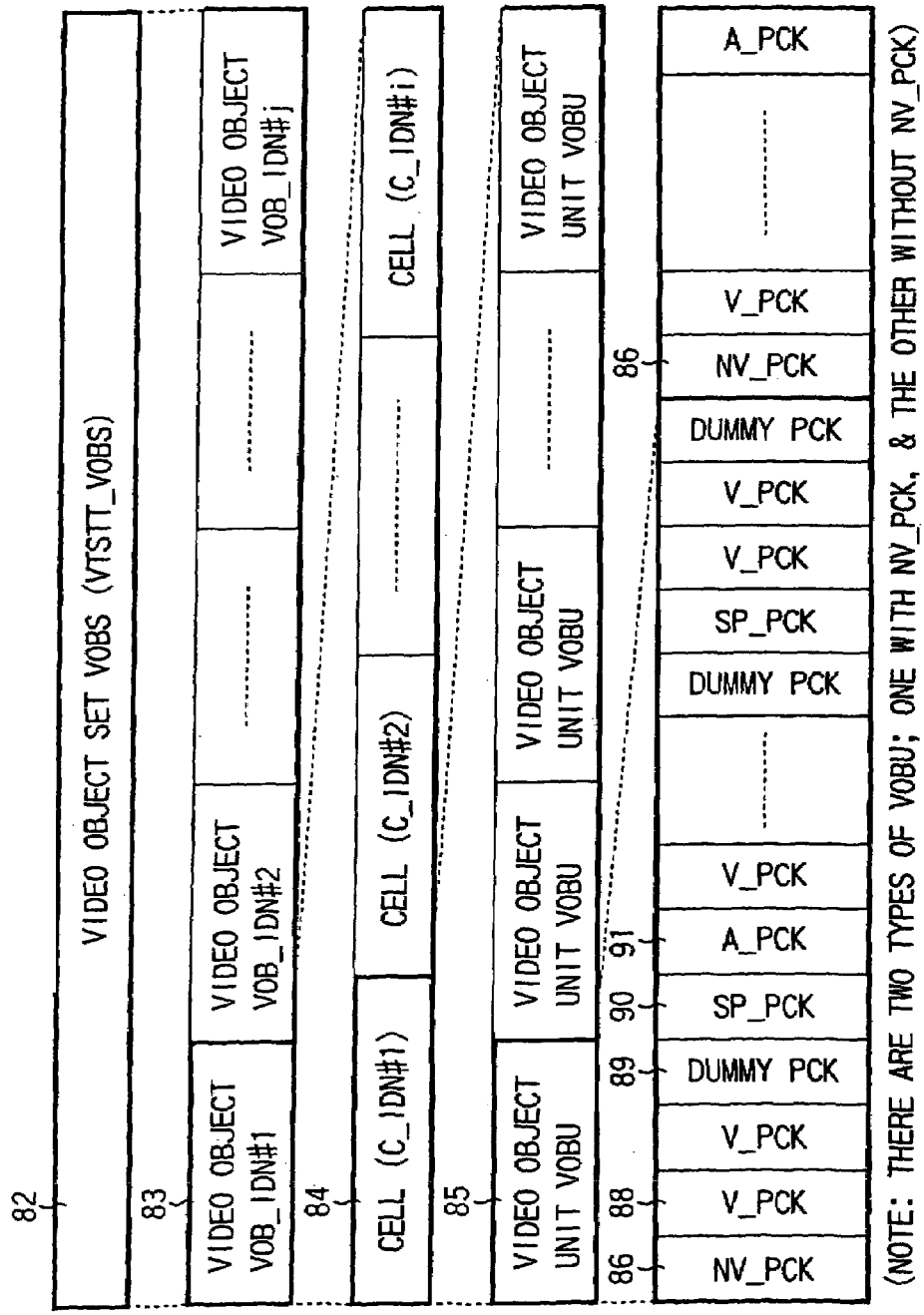
FIG. 4 is a view for explaining an example of the hierarchical structure of a video object set (VTS) shown in FIG. 2.

FIG. 4 shows the hierarchical structure of information contained in video title set title video object set VTSTT_VOBS.

As shown in FIG. 4, video object set VTSTT_VOBS 82 is defined as a set of one or more video objects VOB 83. Each VOB 83 is made up of a set of one or more cells 84, each of which is, in turn, made up of a set of one or more video object units VOBU 85. Each VOBU is made up of a set of various data packs 86 to 91.

Each of these packs serves as a minimum unit of data transfer. The minimum unit for logical processing is a cell, and logical processing is done is units of cells. (When the data structure shown in FIGS. 20 to 33 to be described later is used, processing which uses entry points that can be units smaller than cells can be done.)

The playback time of VOBU corresponds to that of video data made up of one or more picture groups (groups of pictures GOP in MPEG), and is set to fall within the range from 0.4 sec to 1.2 sec. One GOP is screen data which normally has a playback time of about 0.5 sec in the MPEG format, and is compressed to play back approximately 15 images during this interval. Note that even playback data consisting of audio data and/or sub-picture data alone is formed using VOBU as one unit.

When a DVD video recorder can record VOBS with this structure (RTR_MOV.VRO in FIG. 20) on optical disc 10, the user often wants to edit the recording contents after recording. In order to meet such requirement, dummy packs can be appropriately inserted in each VOBU. Each dummy pack can be used to record edit data later.

VOBS for menus normally consists of one VOB, which stores a plurality of menu screen display data. By contrast, VOBS for title sets normally consists of a plurality of VOBs.

VOB is assigned an identification number (IDN#i; i=0 to i), and that VOB can be specified by the identification number. A normal video stream consists of a plurality of cells, but a menu video stream often consists of a single cell. Each cell is assigned an identification number (C_IDN#j) as in VOB.

As mentioned above, the video file (file 74A or 74B in FIG. 2) has a hierarchical structure, and one file is constructed by one or more program chains PGC, each of which is, in turn, constructed by one or more programs. One program is constructed by one or more cells, each of which is, in turn, constructed by one or more video object units VOBU. Each VOBU is constructed by packs each containing a plurality of kinds of data, and each pack is constructed by one or more packets and a pack header.

Video object VOB corresponds to management data PGCI in units of PCGs (this PGCI corresponds to ORG_PGCI in FIG. 21 or UD_PGCI in FIG. 26 to be described later). PGCI stores cell playback information table C_PBIT for managing cells, which are played back in the order described in C_PBIT. Actual cell playback addresses are recorded as cell playback information C_PBI (which corresponds to CI in FIG. 27 to be described later) in C_PBIT.

In the embodiment of the present invention, management information for PGC and that for cells can be independent from each other.

Figure 5:
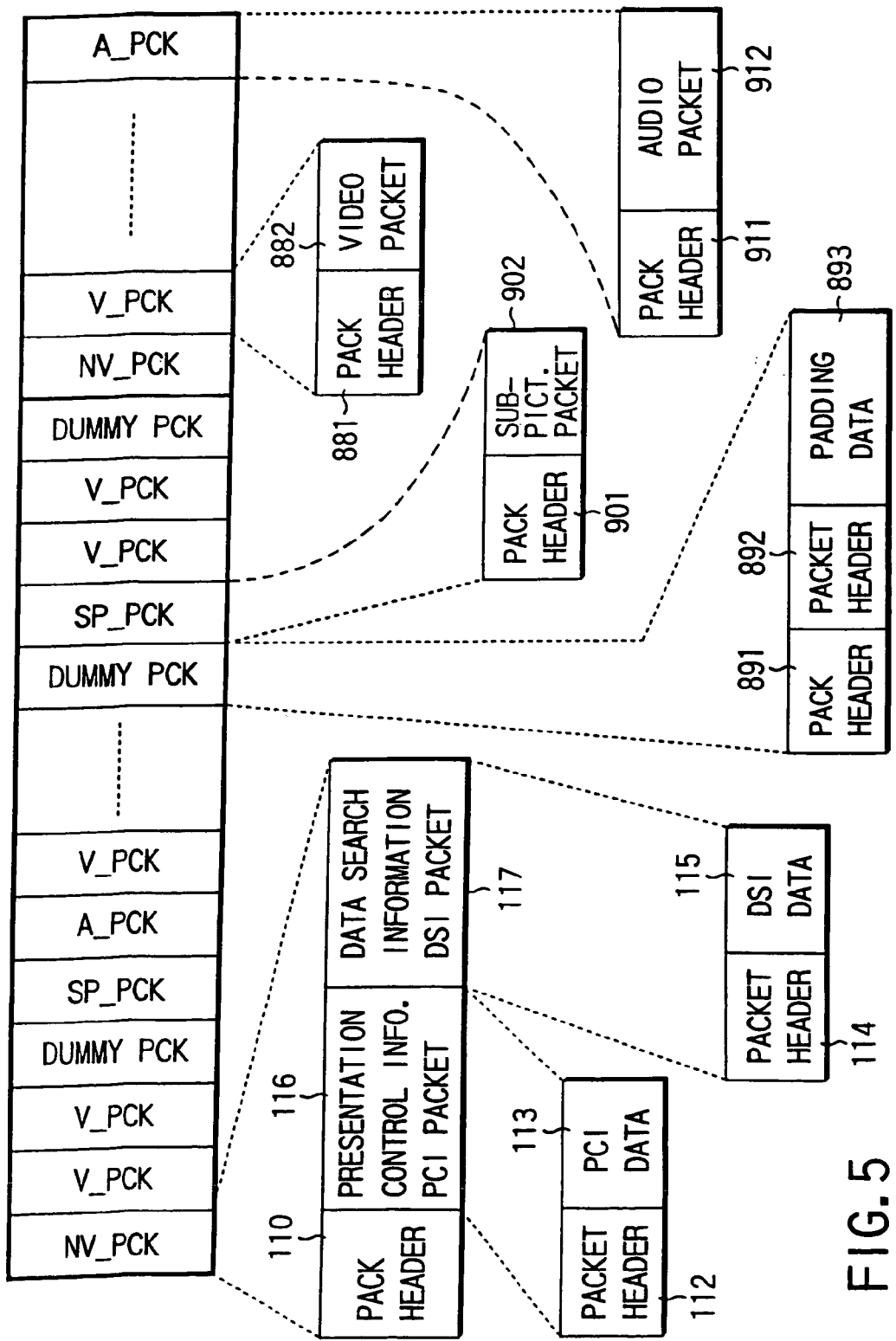
FIG. 5 is a view for explaining the contents of packs in the lowermost layer of the hierarchical structure shown in FIG. 4.

FIG. 5 shows an example of the contents of packs in the lowermost layer of the hierarchical structure shown in FIG. 4. This pack sequence includes navigation pack 86, video packs 88, dummy packs 89, sub-picture packs 90, audio packs 91, and the like.

Navigation pack 86 includes pack header 110, playback control information/presentation control information (PCI) packet 116, and data search information (DSI) packet 117. PCI packet 116 is made up of packet header 112 and PCI data 113, and DSI packet 117 of packet header 114 and DSI data 115.

PCI packet 116 contains control data used upon, e.g., non-seamlessly switching the playback angles. DSI packet 117 contains control data used upon, e.g., seamlessly switching the playback angles. Note that the "angle switching" means changes in angle (camera angle) in which the object picture is watched.

When the structure shown in FIGS. 17 and 18 to be described later is used, navigation pack 86 is not used, and navigation data RTR_VMG shown in FIG. 20 is used instead.

Video pack 88 is comprised of pack header 881 and video packet 882. The dummy pack is comprised of pack header 891 and padding packet 890, and padding packet 890 of packet header 892 and padding data 893. Note that padding data 893 stores insignificant data.

Sub-picture pack 90 is made up of pack header 901 and sub-picture packet 902. The audio pack is made up of pack header 911 and audio packet 912.

Note that video packet 882 contains a packet header (not shown), which records a decode time stamp (DST) and presentation time stamp (PTS). Each of sub-picture packet 902 and audio packet 912 contains a packet header (not shown), which records a presentation time stamp (PTS).

FIG. 6 shows the contents of the presentation control information (PCI data 113) shown in FIG. 5.

The PCI data includes PCI general information (PCI_GI), non-seamless playback angle information (NSML_AGLI), highlight information (HLI), and recording information (RECI). This recording information (RECI) can contain a copyright management code (ISRC) of the international standard.

FIG. 7 shows the contents of the presentation control information general information (PCI_GI) shown in FIG. 6.

Presentation control information general information PCI _GI describes the logical block number (NV_PCK_LBN) of a navigation pack, the category (VOBU_CAT) of VOBU, user operation control (VOBU_UOP_CTL) of VOBU, the start presentation time (VOBU_S_PTM) of VOBU, the end presentation time (VOBU_E_PTM) of VOBU, the end presentation time (VOBU_SE_PTM) of the sequence end in VOBU, and a cell elapse time (C_ELTM).

Note that the logical block number (NV_PCK_LBN) represents the address (recording location) of a navigation pack including the presentation control information (PCI) by the relative number of blocks from the first logical block in the video object set (VOBS) which includes that PCI.

VOBU_CAT describes the contents of copy protection of an analog signal corresponding to video and sub-picture data in VOBU that includes the presentation control information (PCI). VOBU_UOP_CTL describes user operations which are prohibited during the display (presentation) period of VOBU that includes the presentation control information (PCI). VOBU_S_PTM describes the start time of display (presentation) of VOBU that includes the presentation control information (PCI). More specifically, this VOBU_S_PTM indicates the start display time of the first video (first picture) in the display order of the first GOP in VOBU.

VOBU_E_PTM describes the end time of display (presentation) of VOBU that includes the presentation control information (PCI). More specifically, this VOBU_E_PTM indicates the end display time of the last video (last picture) in the display order of the last GOP in VOBU.

On the other hand, when no video data is present in VOBU, or when playback of that VOBU is stopped, this VOBU_E_PTM indicates the end time of virtual video data aligned to time grids of field intervals (1/60 sec in case of NTSC video).

VOBU_SE_PTM describes the end time of display (presentation) based on a sequence end code in video data in VOBU that includes the presentation control information (PCI). More specifically, this end time indicates the end display time of the last video (last picture) in the display order, which picture includes the sequence end code, in VOBU. If no video (picture) with a sequence end code is present in VOBU, 00000000h (h is an abbreviation for hexadecimal) is set in VOBU_SE_PTM.

C_ELTM describes the relative display (presentation) time from the first video frame in the display order of a cell that includes the presentation control information (PCI) to the first video frame in the display order of VOBU that includes the PCI in hours, minutes, and seconds in the BCD format and frames. When no video data is present in VOBU, the first video frame of the virtual video data is used as the video frame.

Figure 8:
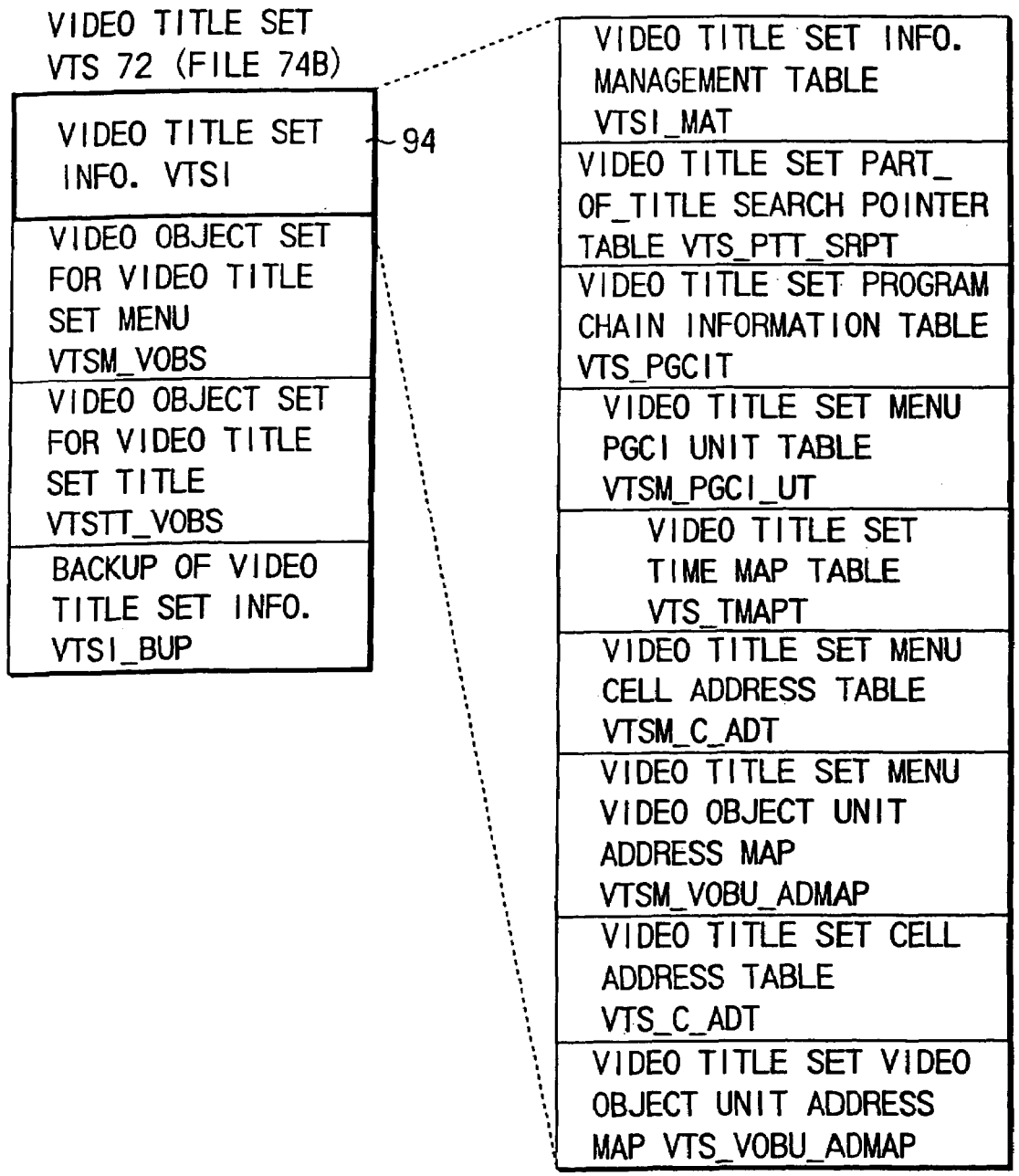
FIG. 8 is a view for explaining the contents of video title set information (VTSI) shown in FIG. 2.

FIG. 8 shows the contents of the video title set information (VTSI) shown in FIG. 2.

This VTS consists of a plurality of files. Each file contains video title set information (VTSI), object set (VTSM_VOBS) for video title set menus, video object sets (VTSTT_VOBS) for video title set titles, and backup information (VTSI_BUP) for video title set information.

VTSI set at the beginning of VTS describes a video title set information management table (VTSI_MAT), a title search pointer table (VTS_PTT_SRPT) for a VTS part_of_title (e.g., chapter of a program), a VTS program chain information table (VTS_PGCIT), a VTS menu PGC information unit table (VTSM_PGCI UT), a VTS time map table (VTS_TMAPT), a VTS menu cell address table (VTSM_C_ADT), a VTS menu VOBU address map (VTSM_VOBU_ADMAP), a VTS cell address table (VTS_C_ADT), and a VTS VOBU address map (VTS_VOBU ADMAP) in this order.

The contents of video title set information management table VTSI_MAT (corresponding to VMGI_MAT shown in FIG. 22 to be described later) are as follows.

More specifically, VTSI_MAT describes a VTS identifier, the end address of VTS, a played back flag indicating whether or not a program recorded on optical disc 10 has been completely played back at least once, an archive flag (ARCHIVE_FLAG; this flag may be omitted, and replaced by a flag in units of cells, as will be described later) which serves to prevent erase errors when a program recorded on optical disc 10 is to be kept without being erased, the end address of VTSI, the format that this optical disc 10 uses and its version number, a VTS category, the end address of VTSI_MAT, the start address of VTS menu VOBS, and the start address of VTSTT_VOBS.

Furthermore, VTSI_MAT describes the start address (VTS_PTT_SRPT_SA) of the part_of_title search pointer table to allow a search for part of VTS, the start address (VTS_PGCIT_SA) of the PGC information table that sets the playback order of VTS, the start address (VTSM_PGCI_UT_SA) of the PGC information unit table for VTS menu display control, the start address (VTS_T-MAST_SA) of the time map table indicating the elapse time of VTS, the start address (VTSM_C_ADT_SA) of the cell address table of cells used for VTS menu display, the start address (VTSM_VOBU_ADMAP_SA) of the VOBU address map for VTS menu display, the start address (VTS_C_ADT_SA) of the VTS cell address table, the start address (VTS_VOBU_ADMAP_SA) of the VTS VOBU address map, information of attributes of video data, audio data, sub-picture data, and the like, the number of sub-picture streams of VTS, a sub-picture stream attribute table of VTS, and a multichannel audio stream attribute table of VTS.

Figure 9:
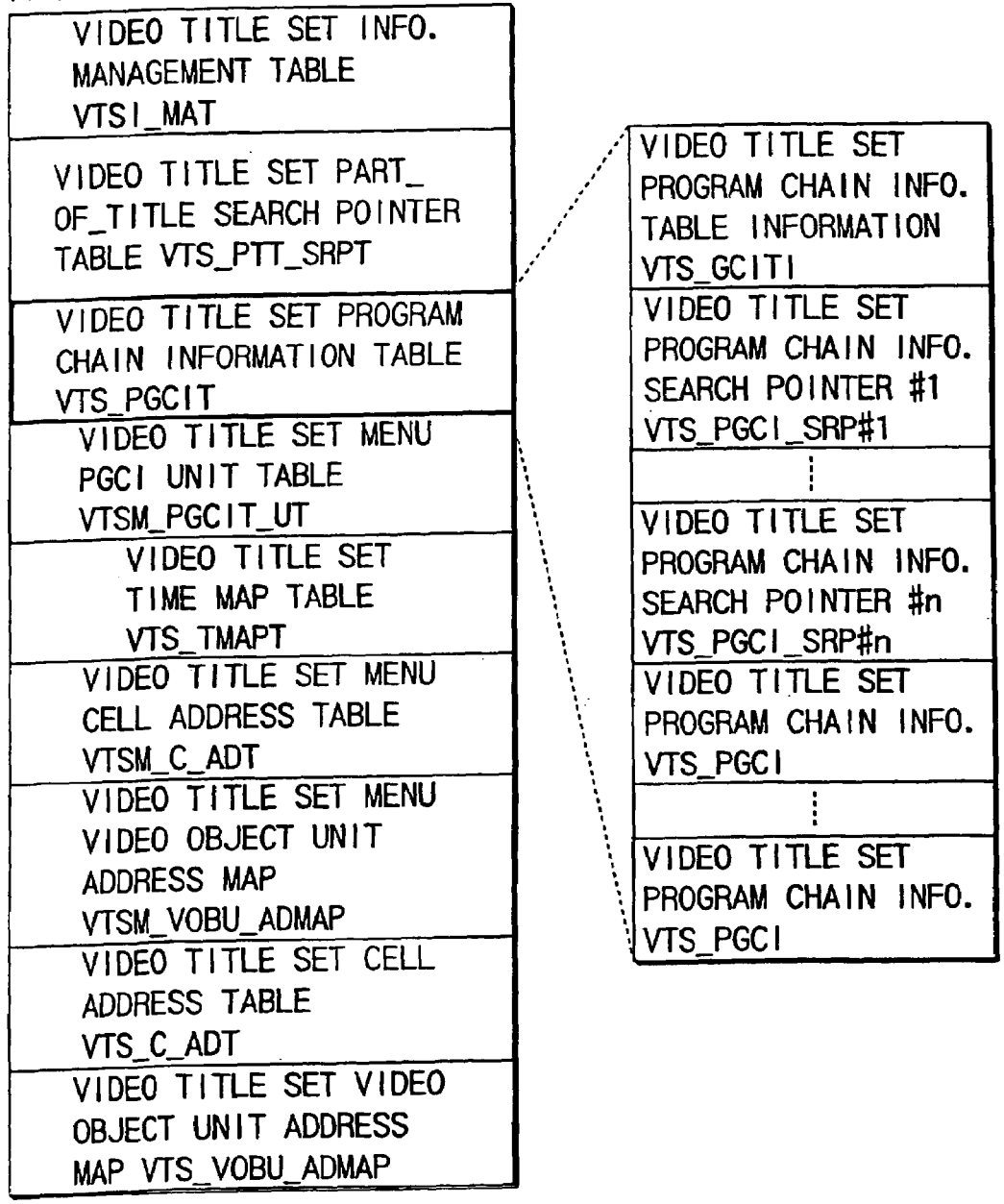
FIG. 9 is a view for explaining the contents of a video title set program chain information table (VTS_PGCIT) shown in FIG. 8.

FIG. 9 shows the contents of the video title set program chain information table (VTS_PGCIT) shown in FIG. 8.

This VTS_PGCIT contains VTS program chain information table information (VTS_PGCITI), VTS program chain information search pointers (VTS_PGCI_SRP#1 to VTS_PGCI SRP#n), and VTS program chain information (VTS_PGCI).

Note that the order of a plurality of pieces of information VTS_PGCI is set independently of that of the plurality of VTS program chain information search pointers VTS_PGCI_SRP#1 to VTS-PGCI-SRP#n. Hence, for example, single program chain information VTS_PGCI can be indicated by one or more program chain information search pointers VTS_PGCI_SRP.

FIG. 10 shows the contents of the program chain information (PGCI) shown in FIG. 9.

PGCI is made up of PGC general information (PGC_GI), a PGC command table (PGC_CMDT), a PGC program map (PGC_PGMAP), cell playback information table (C_PBIT), and cell position information table (C_POSIT).

FIG. 11 shows the contents of the cell playback information table (C_PBIT) shown in FIG. 10.

This cell playback information table C_PBIT can contain a maximum of 255 pieces of cell playback information (C_PBIn; #n=#1 to #255).

Note that cell playback information C_PBI used in the structure shown in FIG. 2 corresponds to cell information CI (FIGS. 27 and 30) used in the structure shown in FIG. 17 (to be described later).

FIG. 12 shows the contents of cell playback information C_PBI (C_PBI#1 to C_PBI#n) shown in FIG. 11.

More specifically, each C_PBI contains a cell category (C_CAT), cell playback time (C_PBTM), the start address (C_FVOBU_SA) of the first video object unit (VOBU) in the cell, the end address (C_FILVU_EA) of the first interleaved unit (ILVU) in the cell, the start address (C_LVOBU_SA) of the last VOBU in the cell, and the end address (C_LVOBU_EA) of the last VOBU in the cell.

Furthermore, in this C_PBI, a 1-byte field (cell type) for describing an erasion level flag is assured.

When this erasion level flag is 00h, a cell appended with this flag can be played back (or not set in an erasion state), and this flag can be used to mean prohibition of automatic erasion.

When the erasion level flag is 01h, a cell appended with this flag is prohibited from being played back (or set in an erasion state), and this flag can be used to mean permission of automatic erasion.

The contents corresponding to the cell erasion level flag shown in FIG. 12 can be described in primary text information PRM_TXTI shown in FIG. 33 (to be described later).

FIG. 13 shows the contents of the cell category (C_CAT) shown in FIG. 12.

This C_CAT indicates the number of cell commands by the lower 8 bits; the cell still time by the next 8 bits (b8 to b15); the cell type with contents different from that shown in FIG. 12 by the next 5 bits; an access restriction flag by the next 1 bit; the cell playback mode (e.g., movie or still) by the next 1 bit; a seamless angle change flag by 1 bit after the next reserved bit; a system time clock STC discontinuity flag (to reset STC or not) by the next 1 bit; an interleaved allocation flag (indicating if the cell designated by C_PBI is located in a continuous block or an interleaved block) by the next 1 bit; a seamless playback flag (indicating if the cell designated by C_PBI is to be played back seamlessly) by the next 1 bit; the cell block type (e.g., angle block) by the next two bits; and the cell block mode (e.g., first cell in the block) by the last two bits.

If the cell block mode bits are 00b (b means binary), this means that the cell is not the one in the block; if the bits are 01b, the cell is the first one in the block; if the bits are 10b, the cell is the one in the block; and if the bits are 11b, the cell is the last one in the block.

If the cell block type bits are 00b, this indicates that the cell block does not belong to the corresponding block; and if the bits are 01b, the corresponding block is an angle block (a block containing multiangle cells).

On the other hand, if this cell block type=01b is detected during playback, the apparatus can inform the viewer that playback of the angle block is currently in progress by flickering an angle mark (or by changing the ON color or shape of the angle mark). With such information, the viewer can make sure that an image in another angle is available for the picture which is currently being played back.

If the interleaved allocation flag is 0b, it indicates that the corresponding cell belongs to a continuous block (that continuously records a plurality of VOBUS); if the interleaved allocation flag is 1b, the corresponding cell belongs to an interleaved block (that interleaved-records ILVUs each containing one or more VOBUS).

If the seamless angle change flag is set (=1b), it represents that the corresponding cell is to be seamlessly played back; if this flag is not set (=0b), the corresponding cell is to be non-seamlessly played back.

That is, if the interleaved allocation flag=1b and seamless angle change flag=0b, the angle can be changed non-seamlessly; if the interleaved allocation flag=1b and seamless angle change flag=1b, the angle can be changed seamlessly.

If a media drive system with a very short access time (a system that can access the beginning of a desired angle block within one video frame period; not limited to an optical disc drive system) is used, the angle can be changed smoothly even when the interleaved allocation flag=0b, i.e., between VOBU sets (different angle cells) which are not interleaved-recorded.

When optical disc 10 with relatively low access speed is used as a recording medium, one recording track of that disc is preferably assigned to recording of one interleaved block. In such format, since the trace destination of an optical head need only move in the radial direction of the disc by a very small distance corresponding to one track width, track jump suffering less time lag (suitable for seamless angle change) can be attained. In this case, if track jump for one video object unit (VOBU) is made, a time lag for a maximum of one revolution of the disc may be produced. Hence, the angle change that requires jumps in units of VOBUs is suitable for non-seamless angle change.

It is technically possible to design a DVD video recorder which allows the viewer (user) to arbitrarily change the contents of the seamless angle change flag in read data after cell data of the corresponding title set are read from an optical disc.

When the seamless angle change flag represents whether the angle information described in navigation pack 86 indicates seamless or non-seamless angle information, if the user has changed this flag, he or she must also modify angle information (not shown) in navigation pack 86 (e.g., modification from seamless angle information to non-seamless angle information).

When the cell playback mode is 0b, it indicates continuous playback in the cell; if the mode is 1b, still playback in each VOBU present in the cell.

The access restriction flag can be used to prohibit direct selection by user operation when the user makes recording, playback, and the like. For example, when the access restriction flag of a cell that records answers for a collection of questions is set (=1b), the user is prohibited from reading the answers by stealth.

The cell type in FIG. 13 with contents different from those of the cell type shown in FIG. 12 can indicate the following facts by its 5-bit contents, for example, when the corresponding cell is formed for karaoke.

If the 5 bits are 00000b, no cell type is designated; if the 5 bits are 00001b, a title picture of the karaoke is designated; if the 5 bits are 00010b, an introduction part of the karaoke is designated; if the 5 bits are 00011b, a song part other than a climax (bridge) part is designated; if the 5 bits are 00100b, a song part of the first climax part is designated; if the 5 bits are 00101b, a song part of the second climax part is designated; if the 5 bits are 00110b, a song part for a male vocal is designated; if the 5 bits are 00111b, a song part for a female vocal is designated; if the 5 bits are 01000b, a song part for mixed voices is designated; if the 5 bits are 01001b, an interlude part (instrumental part) is designated; if the 5 bits are 01010b, fading-in of the interlude part is designated; if the 5 bits are 01011b, fading-out of the interlude part is designated; if the 5 bits are 01100b, the first ending part is designated; and if the 5 bits are 01101b, the second ending part is designated. The contents of the remaining 5-bit code can be used for other purposes.

Note that the angle change can be applied to that for background video data of the karaoke. (For example, a full-figure shot, closeup shots of the face and mouth, and the like of a singer who is singing a guide vocal can be angle-changed seamlessly along with the flow of a karaoke music or non-seamlessly by going back some bars, or during repeat playback between desired bars, whichever the viewer desires.)

On the other hand, if the 8-bit contents of the cell still time are 00000000b, zero still time is designated; if the contents are 11111111b, limitless still time is designated; if the contents fall within the range from 00000001b to 11111110b, a still display time having a duration defined by the decimal value (1 to 254) designated by the contents and expressed in seconds is designated. The number of cell commands indicates the number of commands to be executed upon completion of playback of the corresponding cell.

FIG. 14 shows the contents of general information (PGC_GI) of a normal program chain (PGC).

More specifically, program chain general information PGC_GI describes PGC contents (PGC_CNT), a PGC playback time (PGC_PB_TM), PGC user operation control information (PGC_UOP_CTL), a PGC audio stream control table (PGC_AST_CTLT), a PGC sub-picture stream control table (PGC SPST_CTLT), PGC navigation control information (PGC_NV_CTL), a PGC sub-picture palette (PGC_SP_PLT), the start address (PGC_CMDT_SA) of a PGC command table, the start address (PGC_PGMAP_SA) of a PGC program map, the start address (C_PBIT_SA) of a playback information table of cells in PGC, and the start address (C_POSIT_SA) of a position information table of cells in PGC.

PGC_CNT indicates the number of programs and number of cells (a maximum of 255) in that PGC. In PGC having no video object VOB, the number of programs is "0".

PGC_PB_TM represents the total playback time of programs in that PGC in hours, minutes, seconds, and the number of video frames. This PGC_PB_TM also describes a flag (tc_flag) indicating the type of video frame, and a frame rate (25 or 30 frames per sec) or the like is designated by the contents of this flag.

PGC_UOP_CTL indicates user operations prohibited in PGC which is being played back.

PGC_AST_CTLT can contain control information for each of eight audio streams. Each control information includes a flag (availability flag) indicating if the corresponding audio stream is available in that PGC, and conversion information from an audio stream number to the number of an audio stream to be decoded.

PGC_SPST_CTLT includes a flag (availability flag) indicating if that sub-picture stream is available in the corresponding PGC, and conversion information from a sub-picture stream number (32 numbers) into the number of a sub-picture stream to be decoded.

PGC_NV_CTL includes Next_PGCN indicating the number of PGC to be played back next after the PGC which is currently being played back, Previous_PGCN indicating the number (PGCN) of PGC quoted by a navigation command "LinkPrevPGC" or "PrevPGC_Search( )", GoUp_PGCN indicating the number of PGC to which that PGC is to return, a PG Playback mode indicating the playback mode (sequential playback, random playback, shuffle playback, and the like) of the program, and a Still time value indicating the still time after that PGC is played back.

PGC_SP-PLT describes 16 sets of luminance signals and two color difference signals used in a sub-picture stream in that PGC.

PGC_CMDT_SA assures a description area for a pre-command executed before PGC playback, a post-command executed after PGC playback, and a cell command executed after cell playback.

PGC_PGMAP_SA describes the start address of PGC_PGMAP representing the program configuration in that PGC by a relative address from the first byte of program chain information PGCI.

C_PBIT_SA describes the start address of cell playback information table C_PBIT that determines the playback order of cells in that PGC by a relative address from the first byte of PGCI.

C_POSIT_SA describes the start address of cell position information table C_POSIT indicating VOB identification numbers and cell identification numbers used in that PGC by a relative address from the first byte of PGCI.

FIG. 15 shows the contents of program chain general information (PGC_GI) of trash PGC that provides a "trash box" file for file erasion, and the like.

Trash PGC_GI shown in FIG. 15 is configured by adding a trash PGC flag (TRASH_PGC_FLG) to PGC_GI shown in FIG. 14.

If this trash PGC flag is 01h, it indicates that the corresponding PGC is "trash PGC that pertains to playback of an erased cell". On the other hand, if this trash PGC flag is 00h, it indicates that the corresponding PGC is not "trash PGC" but a normal PGC.

Trash PGC_GI shown in FIG. 15 is PGC general information when PGC is built to permit playback of a cell, which is seemingly deleted (recording data remains undeleted in practice, but is prohibited from being played back by the erasion level flag), by inputting a special keyword (or by, e.g., mouse operation for dragging a file icon from a trash box icon).

In this case, the special keyword input for a specific cell in PGC with the trash PGC flag=01h (i.e., "trash box") corresponds to operation for restoring a video file (file icon) that has been thrown into the "trash box" file (trash icon) from the trash box.

FIG. 16 is a view for explaining the contents of cell playback information (C_PBI) in trash PGC.

C_PBI of trash PGC shown in FIG. 16 has a configuration in which the cell type in C_PBI shown in FIG. 12 is replaced by PGC_N that designates an original PGC number to which a cell that has been thrown into the trash box belongs, and C_IN_N for designating that cell number.

This C_PBI of trash PGC has no "erasion level flag" shown in FIG. 12.

Cell playback information C_PBI shown in FIG. 16 is used for restoring a "cell which is seemingly deleted" that belongs to PGC with the trash PGC flag=01h in FIG. 15.

Management information (PGC_$G_1$ and C_PBI for trash PGC) for restoring and playing back a "cell thrown into the trash box" shown in FIGS. 15 and 16 may be left in the internal memory of the apparatus (DVD video recorder) or may be written on disc 10 as hidden information which is invisible to the user.

Figure 17:
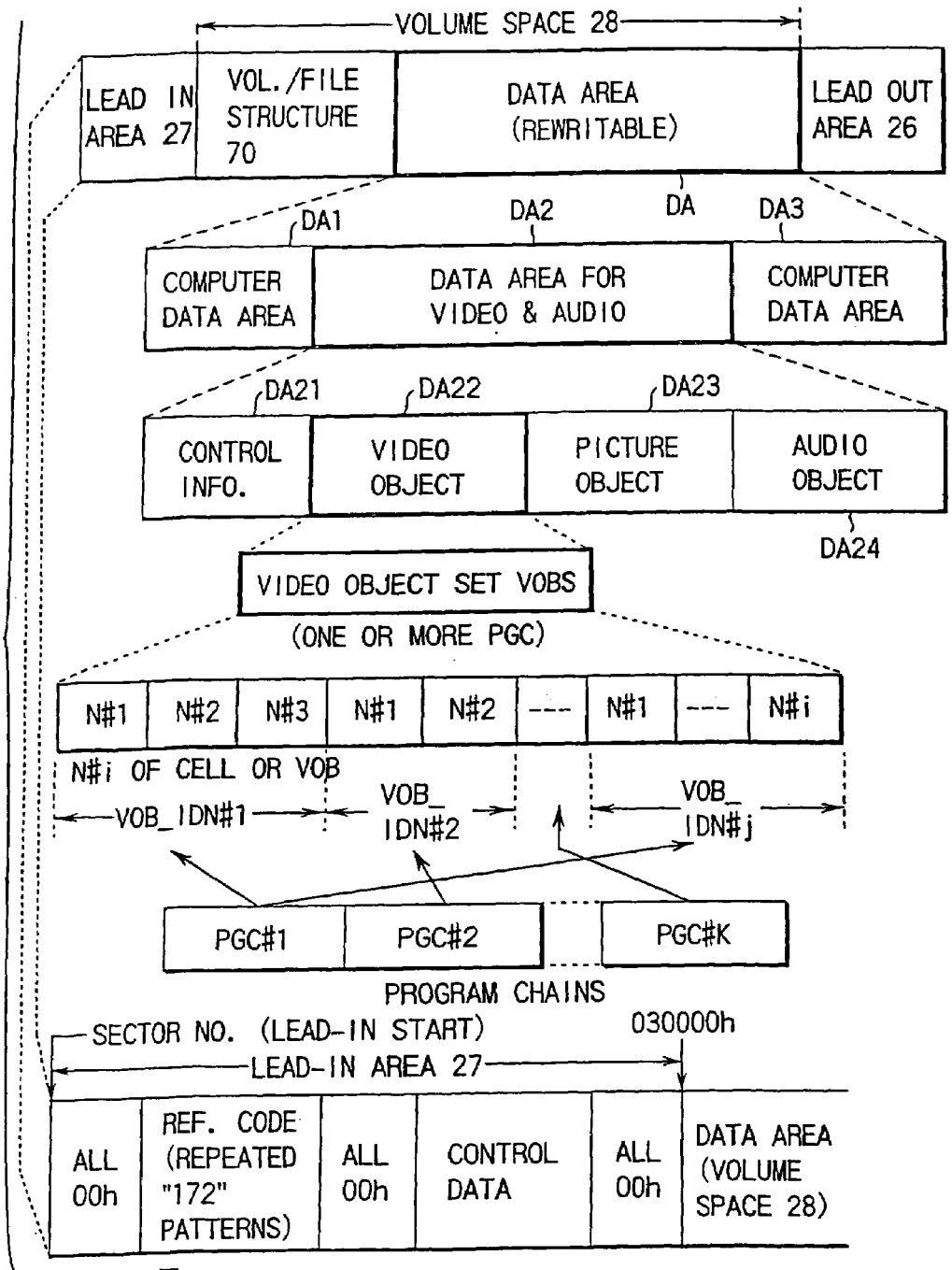
FIG. 17 is a view for explaining the format of digital information recorded on the optical disc shown in FIG. 1.

FIG. 17 is a view for explaining the format of digital information recorded on the optical disc shown in FIG. 1.

In this structure, lead-in area 27 includes an emboss data zone whose light reflection surface has an embossed pattern, a mirror zone whose surface is flat (mirror surface), and a rewritable zone capable of information rewriting. Lead-out area 26 is also designed to be capable of information rewriting.

Data recording area (volume space) 28 is made up of volume/file management (structure) information 70 and data area DA whose contents can be rewritten by the user.

Volume/file management information 70 records file information of audio and video data recorded on data area DA, and information that pertains to the whole volume.

Data area DA can randomly record areas DA1 and DA3 for recording computer data, and video & audio data area DA2 for recording video/audio data. Note that the recording order, recording information size, and the like of computer data and video/audio data can be arbitrarily determined. Data area DA can record computer data or video/audio data alone.

Video & audio data area DA2 contains control information DA21, video object DA22, picture object DA23, and audio object DA24.

Control information DA21 can contain control information required upon executing various processes such as recording (image and/or audio recording), playback, editing, search, and the like.

For example, control information DA21 can contain file RTR.IFO of navigation data RTR_VMG shown in FIG. 20 (to be described later).

Video object DA22 can contain information of the contents of recorded video data.

Picture object DA23 can contain still picture information of still pictures, slide pictures, and the like.

Audio object DA24 can contain information of the contents of recorded audio data.

Note that video object DA22 is made up of video object set VOBS. This VOBS has contents corresponding to one or more program chains PGC#1 to PGC#k which respectively designate cell playback orders by different methods.

The emboss data zone of lead-in area 27 records the following information in advance:

(1) the disk type such as a DVD-ROM, DVD-RAM (or DVD-RW), DVD-R, and the like; the disk size such as 12 cm, 8 cm, and the like; the recording density; and information that pertains to the entire information storage medium such as physical sector numbers indicating the recording start/end positions, and the like;

(2) the recording power and recording pulse width; the erasion power; the playback power; information that pertains to recording/playback/erasion characteristics such as the linear velocity upon recording/erasion, and the like; and (3) information that pertains to the manufacture of an individual information recording medium such as the manufacturing number, and the like.

The rewritable zone of each of lead-in area 27 and lead-out area 28 contains the following fields:

(4) a field for recording a unique disk name of each information recording medium;

(5) a test recording field (for confirming recording/erasion conditions); and (6) a field for recording management information that pertains to a defective field in data area DA.

A DVD-RTR recorder/player (RTR video recorder or personal computer with a DVD-RAM drive) can record data in fields (4) to (6).

When disc 10 is set in a DVD-RTR recorder/player (RTR video recorder), information in lead-in area 27 is read. Lead-in area records a predetermined reference code and control data in ascending order of sector number.

The reference code in lead-in area 27 consists of two error correction code blocks (ECC blocks). Each ECC block has 16 sectors. These two ECC blocks (32 sectors) are generated by appending scramble data. Upon playing back the reference code appended with the scramble data, file operation or the like on the playback side is done to play back a specific data symbol (e.g., 172) to assure the subsequent data read precision.

Control data in lead-in area 27 is made up of 192 ECC blocks. In this control data field, the contents for 16 sectors in the respective blocks are repetitively recorded 192 times.

This control data consisting of 16 sectors contains physical format information in the first sector (2,048 bytes), and disc manufacturing information and contents provider information in the subsequent sectors.

The physical format information contained in the control data has the following contents.

That is, the first location describes the version of the DVD specifications the recording information complies with.

The second location describes the size (12 cm, 8 cm, or the like) of the recording medium (optical disc 10) and minimum read rate. In case of read-only DVD video, 2.52 Mbps, 5.04 Mbps, and 10.08 Mbps are specified as minimum read rates, and other minimum read rates are reserved. For example, when image recording is done at an average bit rate of 2 Mbps by an RTR video recorder capable of variable bit-rate recording, the minimum read rate can be set at 1.5 to 1.8 Mbps using the reserved field.

The third location describes the disc structure (the number of recordable layers, track pitch, type of recordable layer, and the like of the recording medium (optical disc 10). Based on the type of recordable layer, it can be identified if that disc 10 is a DVD-ROM, DVD-R, or DVD-RAM (DVD-RW).

The fourth location describes the recording density (linear density and track density) of the recording medium (optical disc 10). The linear density indicates the recording length per bit (0.267 µm/bit, 0.293 µm/bit, or the like). The track density indicates the spacing between neighboring tracks (0.74 μm/track, 0.80 μm/track, or the like). The fourth location includes a reserved field to designate other numerical values as linear and track densities for a DVD-RAM or DVD-R.

The fifth location describes the start and end sector numbers and the like of data area 28 of the recording medium (optical disc 10).

The sixth location describes a burst cutting area (BCA) descriptor. This BCA is applied to only a DVD-ROM disc as an option, and is an area for storing recording information after completion of the disc manufacturing process.

The seventh location describes a free space of the recording medium (optical disc 10). For example, when disc 10 is a single-sided, single-layered recording DVD-RAM disc, information indicating 2.6 GB (or the number of sectors corresponding to this number of bytes) is described at this location of disc 10. When disc 10 is a double-sided recording DVD-RAM disc, information indicating 5.2 GB (or the number of sectors corresponding to this number of bytes) is described at that location.

Other locations are reserved for future use.

Figure 18:
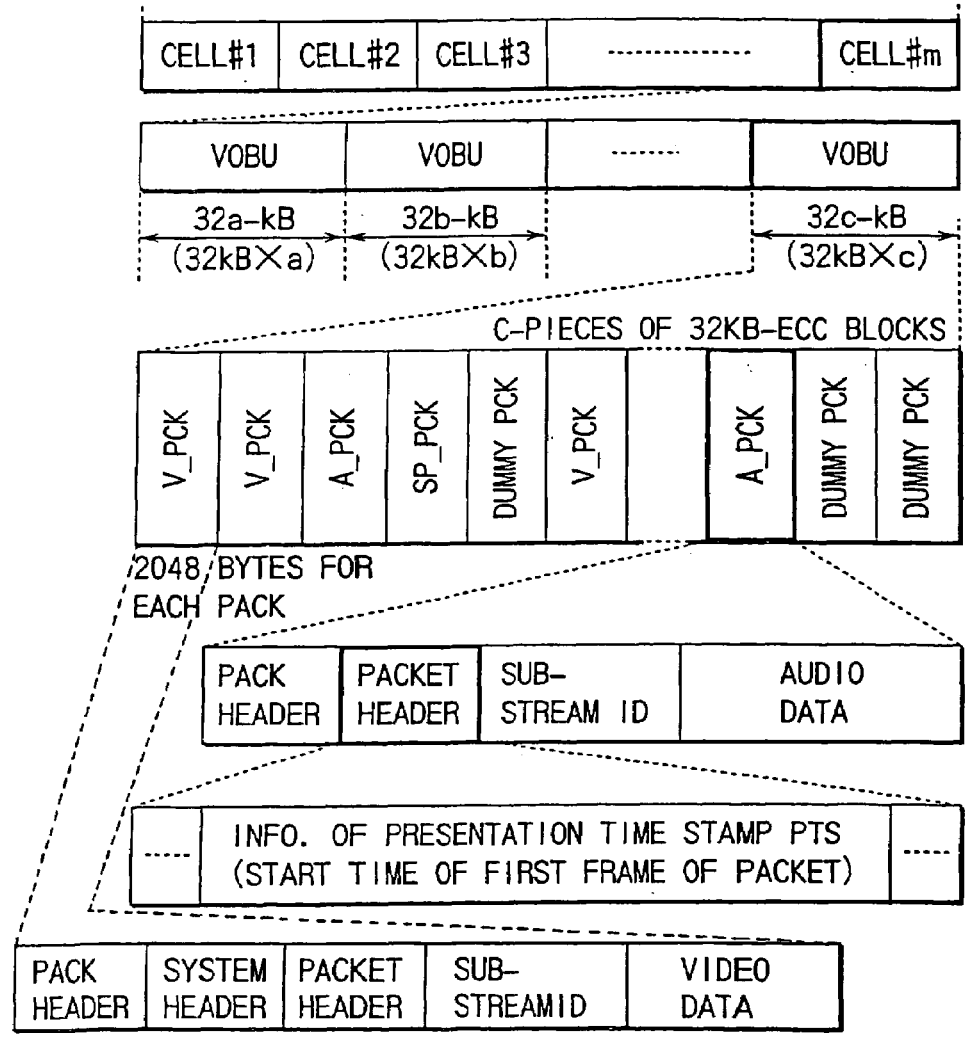
FIG. 18 is a view for explaining the data structure of a video object unit (VOB) shown in FIG. 17.

FIG. 18 is a view for explaining the data structure of the video object unit (VOB) shown in FIG. 17.

As shown in FIG. 18, each cell (e.g., cell #m) that forms video object DA22 consists of one or more video object units (VOBU). Each VOBU is formed as a set (pack sequence) of video packs, sub-picture packs, audio packs, dummy packs, and the like.

Each of these packs has a predetermined size, i.e., 2,048 bytes, and serves as a minimum unit upon transferring data.

The playback time of VOBU corresponds to that of video data made up of one or more picture groups (GOP), and is set to fall within the range from 0.4 sec to 1.2 sec. One GOP is screen data which normally has a playback time of about 0.5 sec in the MPEG format, and is compressed to play back approximately 15 images during this interval. (VOBU contains an integer number of GOPs, except for a special case wherein a gap is formed in the flow of video data. That is, VOBU is a video information compression unit synchronous with GOPS.)

When VOBU contains video data, a video data stream is formed by lining up GOPs (complying with the MPEG format) each consisting of video packs, sub-picture packs, audio packs, and the like. However, VOBU is determined with reference to the playback time of GOPs independently of the number of GOPs.

Note that even playback data consisting of audio data and/or sub-picture data alone is formed using VOBU as one unit. For example, when VOBU is formed by audio packs alone, audio packs to be played back within the playback time of the VOBU to which that audio data belongs are stored in that VOBU like in a video object of video data.

The packs that form each VOBU have similar data structures except for a dummy pack. An audio pack will be taken as an example. As shown in FIG. 18, a pack header is allocated at the beginning of the pack, a packet header and sub-stream ID follow, and audio data is allocated at the end of the pack. In such pack format, the packet header is written with information of presentation time stamp PTS indicating the start time of the first frame in the packet.

On the other hand, a video pack has a data structure obtained by excluding the sub-stream ID from the audio pack shown in FIG. 18 (note that the start video pack in VOBU has a predetermined system header between the pack and packet headers).

In a DVD-RTR recorder/player that can record a video program that contains video object DA22 with the structure shown in FIG. 18 on optical disc 10, the user often wants to edit the recording contents after recording. In order to meet such requirement, dummy packs can be appropriately inserted in each VOBU. Each dummy pack can be used to record edit data later.

Figure 19:
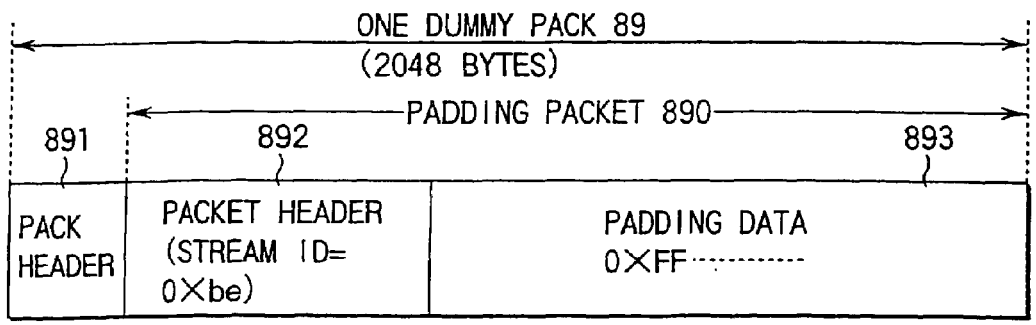
FIG. 19 is a view for explaining the data structure of a dummy pack shown in FIG. 18.

The dummy pack shown in FIG. 18 shows a data structure shown in FIG. 19.

More specifically, one dummy pack 89 is comprised of pack header 891, packet header 892 having a predetermined stream ID, and padding data 893 padded with a predetermined code (insignificant data). Note that packet header 892 and padding data 893 form padding packet 890. The contents of padding data 893 in a non-used dummy pack are not especially significant.

This dummy pack 89 can be appropriately used when the recording contents are to be edited after predetermined image recording is done on disc 10 shown in FIG. 1, and in other cases (for example, the dummy pack is used as an audio pack that stores audio information of after recording).

More specifically, the dummy pack is inserted into each VOBU for the purposes of:

addition of information to be additionally recorded after image recording (for example, memo information indicating that after-recording information is inserted into an audio pack and replaced by a dummy pack is inserted as sub-picture information into a sub-picture pack and is replaced by a dummy pack);

compensation of a short size from an integer multiple of 32 kbytes to match the VOBU size with an integer multiple of the ECC block size (32 kbytes); and so forth.

Also, the dummy pack can be used to store reduced-scale image (thumbnail picture) data which is displayed on a user menu, as needed.

FIG. 20 is a view for explaining an example of the directory structure of information (data files) recorded on the optical disc shown in FIG. 1 to have the data structure shown in FIG. 17.

According to the DVD-RTR specifications capable of digital recording/playback of a video picture in real time, the contents of a DVD-RTR disc are managed using the directory structure shown in FIG. 20, and are saved in accordance with a file system such as ISO9660, UDF, or the like. (RTR is an abbreviation for real time recording.)

Even when the data structure shown in FIG. 17 is used on the disc/apparatus side, this data structure is invisible to the user. The data structure that the user can actually see is a hierarchical file structure shown in FIG. 20.

More specifically, directories such as a DVD_RTR directory, VIDEO_TS directory, AUDIO_TS directory, computer data file directories, and the like are displayed on the display screen (not shown) of the root directory by means of menu windows, icons, or the like in correspondence with the types of data recorded on data area DA shown in FIG. 17.

The DVD_RTR directory shown in FIG. 20 stores file RTR.IFO of navigation data RTR_VMG, file RTR_MOV.VRO of movie video object RTR_MOV.VOB, file RTR_STO.VRO of still picture video object RTR_STO.VOB, file RTR_STA.VRO of additional audio object RTR_STA.VOB for still pictures, and the like.

Note that file RTR.IFO stores management information such as a program set, program, entry point, play list, and the like for managing moving picture information.

File RTR_MOV.VRO stores recorded moving picture information and its audio information, file RTR_STO.VRO stores recorded still picture information and its audio information, and file RTR_STA.VRO stores after-recording data for a still picture, and the like.

When a DVD-RTR recorder/player (RTR video recorder) has a function of displaying the directories shown in FIG. 20 and also has a playback function of a DVD video disc (ROM disc), and the DVD video disc is set in its disc drive, the VIDEO_TS directory shown in FIG. 20 is activated. In this case, when the VIDEO_TS directory is opened, the recording contents of the set disc are further displayed.

When the DVD-RTR recorder/player has a DVD audio playback function and a DVD audio disc is set in its disc drive, the AUDIO_TS directory shown in FIG. 20 is activated. In this case, when the AUDIO_TS directory is opened, the recording contents of the set disc are further displayed.

Furthermore, when the DVD-RTR recorder/player comprises a personal computer with a DVD-RAM drive and has a computer data processing function, and a DVD-RAM (or DVD-ROM) disc that has recorded computer data is set in that disc drive, the computer data directory shown in FIG. 20 is activated. In this case, when the computer data directory is opened, the recording contents of the set disc are further displayed.

The user can access the recorded sources of DVD video source, DVD video ROM, DVD audio, and computer data (including computer programs) as if he or she were operating a personal computer, while observing a menu screen or window display screen displayed with the directory structure shown in FIG. 20.

Figure 21:
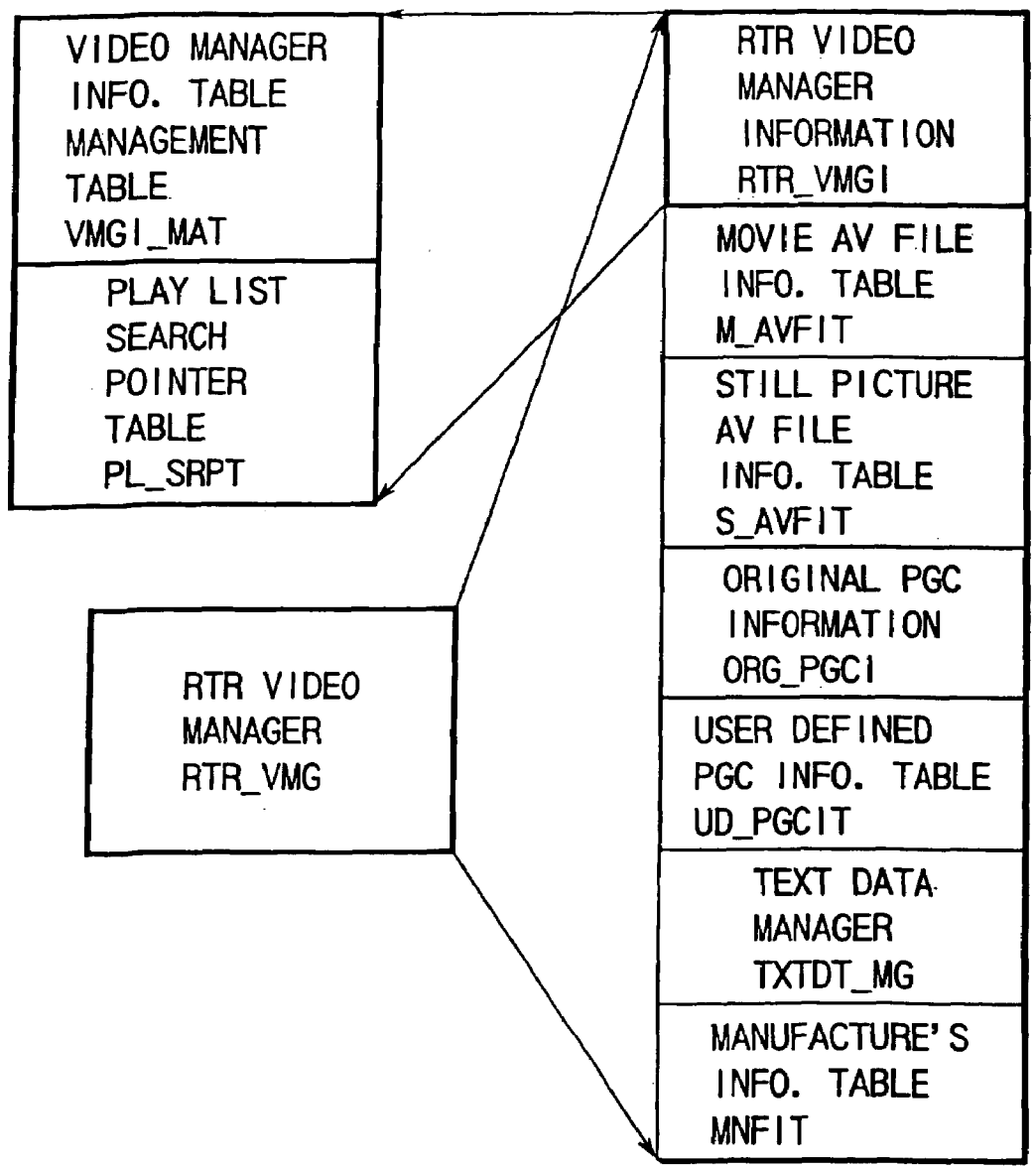
FIG. 21 is a view for explaining the data structure of a navigation data file (RTR_VMG) shown in FIG. 20.

FIG. 21 is a view for explaining the data structure of the navigation data file (RTR_VMG) shown in FIG. 20. RTR video manager RTR_VMG as navigation data is comprised of various kinds of information, as shown in FIG. 21.

Referring to FIG. 21, RTR video manager information RTR_VMGI describes basic information of recordable optical disc (RTR disc) 10 shown in FIG. 1. This RTR_VMGI contains video manager information management table VMGI_MAT and play list search pointer table PL_SRTP.

RTR_VMGI further contains movie AV file information table M_AVFIT, still picture AV file information table S_AVFIT, original PGC information ORG_PGCI, user defined PGC information table UD_PGCIT, text data manager TXTDT_MG, and manufacturer's information table MNFIT.

FIG. 22 shows the contents of the video manager information management table (VMGI_MAT) shown in FIG. 21.

Referring to FIG. 22, VMG identifier VMG_ID describes "DVD_RTR_VMG0" that specifies an RTR_VMG file using an ISO646 character set code.

RTR_VMG_EA describes the end address of RTR_VMG by a relative byte number from the first byte of RTR_VMG.

VMGI_EA describes the end address of RTR_VMGI by a relative byte number from the first byte of RTR_VMG.

VERN describes the version number of the DVD specifications for video recording (real time video recording).

TM_ZONE describes the time zone of the RTR disc. In the DVD_RTR specifications, five different data fields (PL_CREATE_TM, VOB_REC_TM, FIRST_VOB_REC_TM, LAST_VOB_REC_TM, and VOBU_REC_TM) are specified. These five different data fields are generally called REC_TM. REC_TM contains data TZ_TY and TZ_OFFSET. TZ_TY describes a common universal time or local time, and TZ_OFFSET describes a date offset from the common universal time in units of minutes.

STILL_TM describes the still time of a still picture in units of seconds.

CHRS describes a character set code used in primary text information. With this CHRS, for example, an ISO8859-1 character set code or shift JIS kanji code can be designated.

RSM_MRKI describes program chain number PGCN, program number PGN, cell number CN, marker point MRK_PT, and marker creation time MRK_TM. PGCN in this information indicates the number of the program chain where a marker point is present. When the marker is present in an original PGC, PGCN is set at "0". PGN indicates the number of the program where the marker point is present. When a resume marker is present in a user defined PGC, PGN is set at "0". CN indicates a marker point in a target cell. When the resume marker is present in a movie cell, MRK_PT describes a presentation time (PTM) using an RTR presentation time description format. MRK_TM describes the time of creation of the marker using an RTR date description format.

REP_PICTI describes program chain number PGCN, program number PGN, cell number CN, picture point PICT_PT, and representative picture creation time CREAT_TM.

PGCN in this information indicates the number of the program chain where a representative picture of the disc is present. The representative picture of the disc is designated by only the pointer in an original PGC. Hence, when this representative picture pointer is present, PGCN is set at "0". PGN indicates the number of the program where the representative picture of the disc is present. When the resume marker is present in a user defined PGC, PGN is set at "0". CN indicates the number of the cell where the representative picture of the disc is present. PICT_PT indicates the representative image of the disc in the target cell. When the representative picture is present in a movie cell, PICT_PT describes the presentation time (PTM) using the RTR presentation time description format. When this representative image is present in a still picture cell, PICT_PT describes a still picture VOB entry number (S_VOB_ENTN) in a corresponding still picture VOB group (S_VOG). CREAT_TM describes the time of creation of the representative picture of the disc using the RTR date description format.

M_AVFIT_SA describes the start address of movie AV file information table M_AVFIT shown in FIG. 21 by a relative byte number from the first byte of RTR_VMG.

S_AVFIT_SA describes the start address of still picture AV file information table S_AVFIT shown in FIG. 21 by a relative byte number from the first byte of RTR_VMG.

ORG_PGCI_SA describes the start address of original PGC information ORG_PGCI shown in FIG. 21 by a relative byte number from the first byte of RTR_VMG.

UD_PGCIT_SA describes the start address of user defined PGC information table UD_PGCIT shown in FIG. 21 by a relative byte number from the first byte of RTR_VMG. If UD_PGCIT is not available, UD_PGCIT_SA is set at "0000 0000h".

TXTDT_MG_SA describes the start address of text data manager TXTDT_MG shown in FIG. 21 by a relative byte number from the first byte of RTR_VMG. If TXTDT_MG is not available, TXTDT_MG_SA is set at "0000 0000h".

MNFIT_SA describes the start address of manufacturer's information table MNFIT shown in FIG. 21 by a relative byte number from the first byte of RTR_VMG. If MNFIT is not available, MNFIT_SA is set at "0000 0000h".

Figure 23:
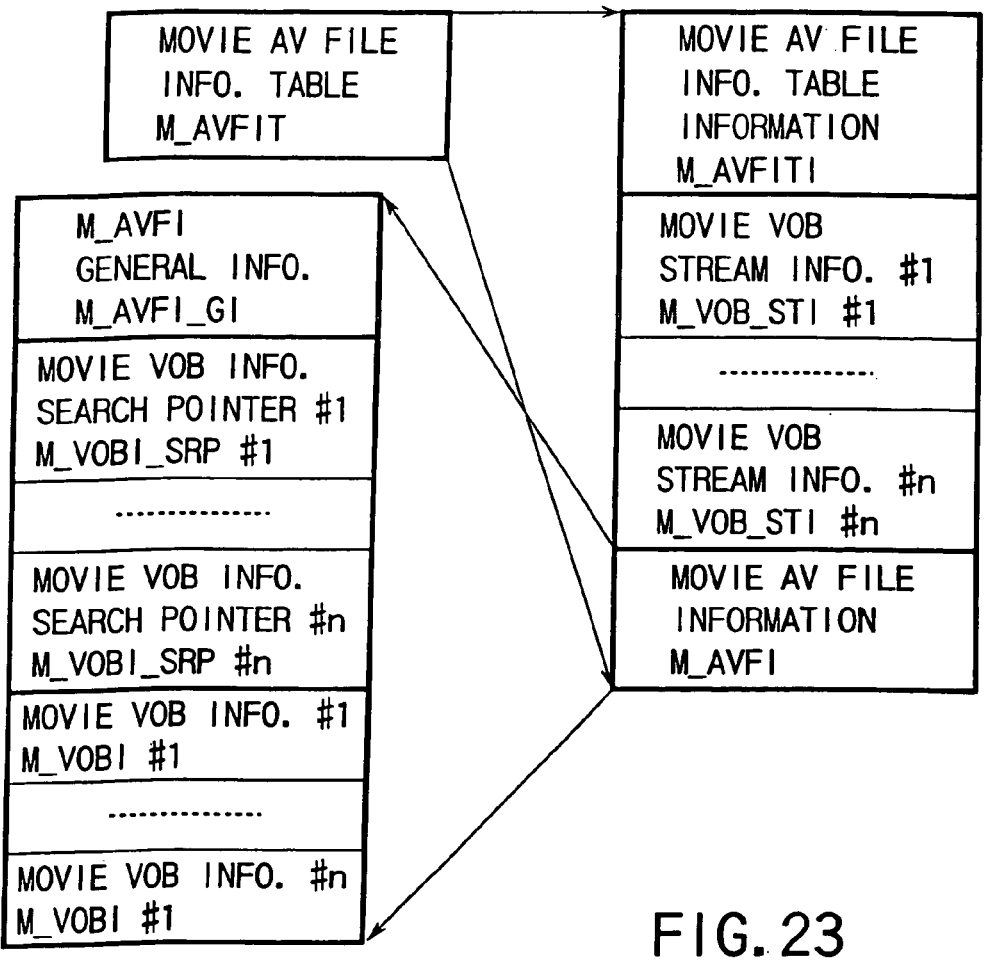
FIG. 23 is a view for explaining the data structure of a movie AV file information table (M_AVFIT) shown in FIG. 21.

FIG. 23 shows the data structure of the movie AF file information table (M_AVFIT) shown in FIG. 21.

M_AVFIT describes information of a movie AV file (file RTR_MOV.VRO shown in FIG. 20), and contains movie AV file information table information M_AVFITI, one or more pieces of movie VOB stream information M_VOB_STI#1 to M_VOB_STI#n, and movie AV file information M_AVFI.

M_AVFI is information of a movie AV file having a predetermined file name (RTR_MOV.VRO), and contains movie AV file information general information M_AVFI GI, one or more movie VOB information search pointers M_VOB_SRP#1 to M_VOBI_SRP#n, and one or more pieces of movie VOB information M_VOBI#1 to M_VOBI#n.

One movie AV file can contain one or more VOBs, and each VOB has movie VOB information M_VOBI for VOB in M_AVFI. One or more pieces of M_VOBI in M_AVFI are described in the same order as that of VOB data stored in the movie AV file.

Figure 24:
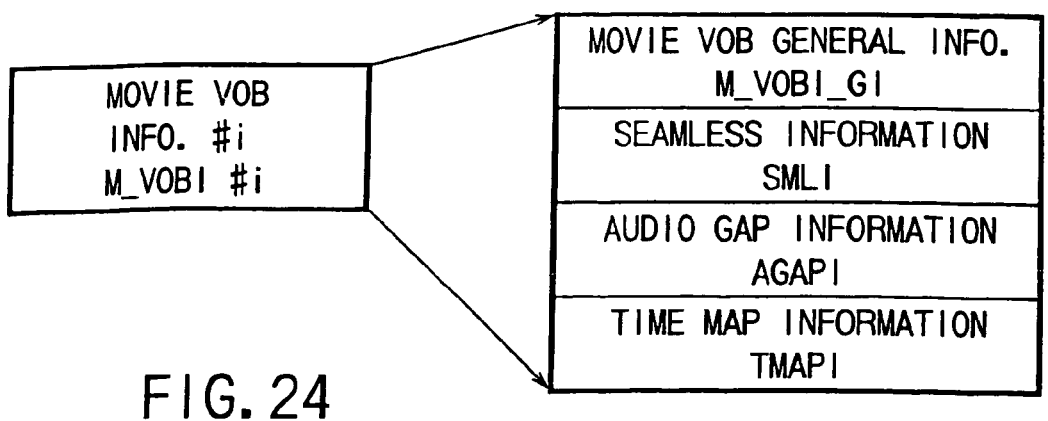
FIG. 24 is a view for explaining the data structure of movie VOB information (M_VOBI) shown in FIG. 23.

FIG. 24 shows the data structure of the movie VOB information (M_VOBI) shown in FIG. 23. AS shown in FIG. 24, M_VOBI contains movie VOB general information M_VOBI_GI, seamless information SMLI, audio gap information AGAPI, and time information TMAPI.

M_VOBI_GI shown in FIG. 24 contains VOB_TY which describes the type of VOB, VOB_REC_TM which describes the recording time of the start field in VOB using the RTR date description format, VOB_REC_TM_SUB which describes the recording time (sub-second information) of the start field in VOB by the number of video fields, M_VOB_STIN which describes the number of movie VOB stream information, VOB_V_S_PTM which describes the presentation start time of the first video field in VOB using the RTR presentation time description format, and VOB_V_E_PTM which describes the presentation end time of the last video field in the VOB using the RTR presentation time description format.

VOB_TY includes TE which indicates if that VOB has been temporarily erased, A0_STATUS which indicates the status of audio stream #1, analog protection system APS which indicates the format of analog copy protection or the ON/OFF state of this copy protection, SML_FLG which indicates if VOB is to be played back seamlessly, A0_GAP_LOC which indicates if an audio gap is present in audio stream #0 and the location of the audio gap if it is present, and A1_GAP_LOC which indicates if an audio gap is present in audio stream #1 and the location of the audio gap if it is present.

VOB_REC_TM is updated to indicate the recording time of the start field of the remaining VOB if the start field of a given VOB is deleted (erased).

More specifically, "new VOB_REC_TM=old VOB_REC_TM+playback duration of erased field".

On the other hand, if the playback duration of the erased field cannot be displayed in units of seconds (for example, when the playback duration of the erased field is 60.5 sec), We have "new VOB_REC_TM+new VOB_REC_TM_SUB=old VOB_REC TM+old VOB_REC_TM SUB+playback duration of erased field".

Since VOB_REC_TM describes the date of video recording, even when audio data has been modified, such modification has no influence on VOB_REC_TM.

The aforementioned RTR date description format will be briefly explained below. In this format, playback time PTM is expressed by a PTM base and PTM extension. The PTM base is a value measured using 90 kHz as a unit, and the PTM extension is a value measured using 27 MHz as a unit.

SMLI shown in FIG. 24 contains VOB_FIRST_SCR which describes SCR (system clock reference) of the first pack of current VOB using the RTR presentation time description format, and PREV_VOB_LAST_SCR which describes SCR of the last pack in previous VOB using the RTR presentation time description format.

Figure 25:
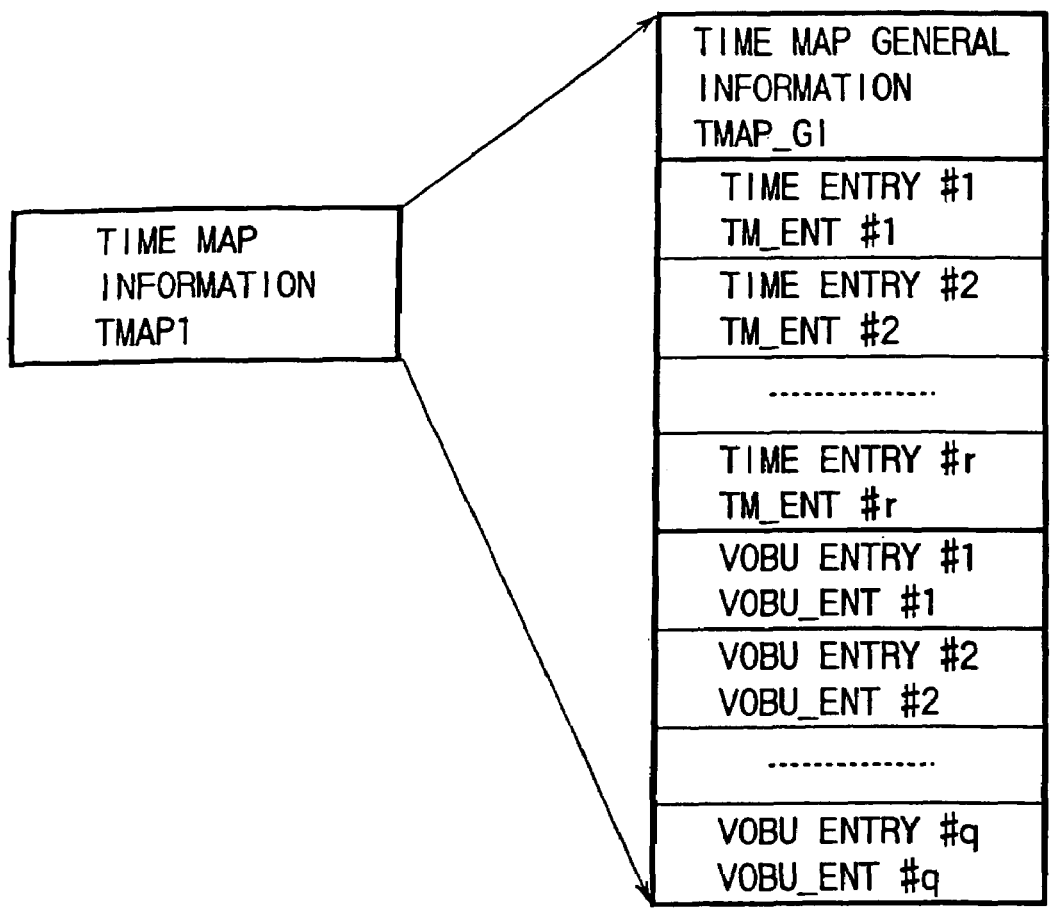
FIG. 25 is a view for explaining the data structure of time map information (TMAPI) shown in FIG. 24.

FIG. 25 shows the data structure of the time map information (TMAPI) shown in FIG. 24.

Time map information TMAPI is used upon executing special playback (e.g., cell playback in the order unique to each user using user defined PGC) and time search.

Time map information TMAPI includes time map generation information TMAP_GI, one or more time entries TM-ENT#L to TM_ENT#r, and one or more VOBU entries VOBU_ENT#1 to VOBU_ENT#q.

Each VOBU entry contains information of the size and playback time of VOBU. The VOBU size is presented in units of sectors (2 kbytes), and the playback time is presented in units of video fields (one field=$\frac{1}{60}$ sec in NTSC; one field=$\frac{1}{50}$ sec in PAL).

Since the VOBU size is presented in units of sectors, as described above, VOBU can be accessed using addresses in units of sectors.

Each VOBU entry includes reference picture size information 1STREF_SZ, VOBU playback time information VOBU_PB_TM, and VOBU size information VOBU_SZ.

Note that VOBU_PB_TM represents the playback time of VOBU of interest in units of video fields. On the other hand, reference picture size information ISTREF_SZ represents the size of the first reference picture (corresponding to I-picture in MPEG) of VOBU of interest in units of sectors.

On the other hand, each time entry contains address information (VOBU_ADR) of the corresponding VOBU, and time difference information (TM_DIFF). This time difference information indicates the difference between the playback time designated by the time entry and the VOBU presentation start time.

Assuming that the time interval (time unit TMU) between two successive time entries is 10 sec, this time entry interval corresponds to 600 fields in, e.g., NTSC video.

Normally, the "time interval between neighboring VOBUs" is expressed by the number of fields in the VOBU entry. As another method, "count value from a given VOBU to the next VOBU by a clock counter" may be used to express the "time interval between neighboring VOBUS".

For example, the "time interval between neighboring VOBUs" can be expressed by the "difference value between the value of presentation time stamp at the start position of one VOBU and the value of PTS at the start position of the immediately succeeding VOBU".

In other words, "the time interval in a specific unit can be expressed by the difference value of the clock counter in that unit".

Time map generation information TMAP_GI shown in FIG. 25 includes TM_ENT_Ns indicating the number of time entries in that time map information, VOBU_ENT_Ns indicating the number of VOBU entries in that time map information, time offset TM_OSF for that time map information, and address offset ADR_OFS of that time map information.

When a value (10 seconds or equivalent) corresponding to 600 fields in NTSC video (or 500 fields in PAL video) is used as time unit TMU, time offset TM_OSF is used to represent the time offset within TMU.

When the VOBU size is expressed by the number of sectors, address offset ADR_OFS is used to indicate a file pointer from the beginning of an AV file.

Time entry TM_ENT shown in FIG. 25 includes VOBU_ENTN indicating the number of the corresponding VOBU entry, TM_DIFF indicating the time difference between the playback time of VOBU designated by the time entry, and the calculated playback time, and VOBU_ADR indicating the target VOBU address.

When time unit TMU is expressed by 600 fields in NTSC (or when time unit TMU is expressed by 500 fields in PAL), the "calculated playback time" with respect to time entry #j is given by TMU×(j−1)+TM_OSF.

On the other hand, VOBU_ADR indicates the target VOBU address by the total size of VOBUs preceding VOBU of interest when the VOBU size is expressed in units of sectors.

In the aforementioned data structure, in order to start playback from the middle of certain VOBU, that access point must be determined. This access point is assumed to be a time entry point.

This time entry point is located at a position separated from the position indicated by movie address information of VOBU by the time difference indicated by time difference information TM_DIFF in time entry TM_ENT. This time entry point serves as a special presentation start point (or time search point) indicated by time map information TMAPI.

Figure 26:
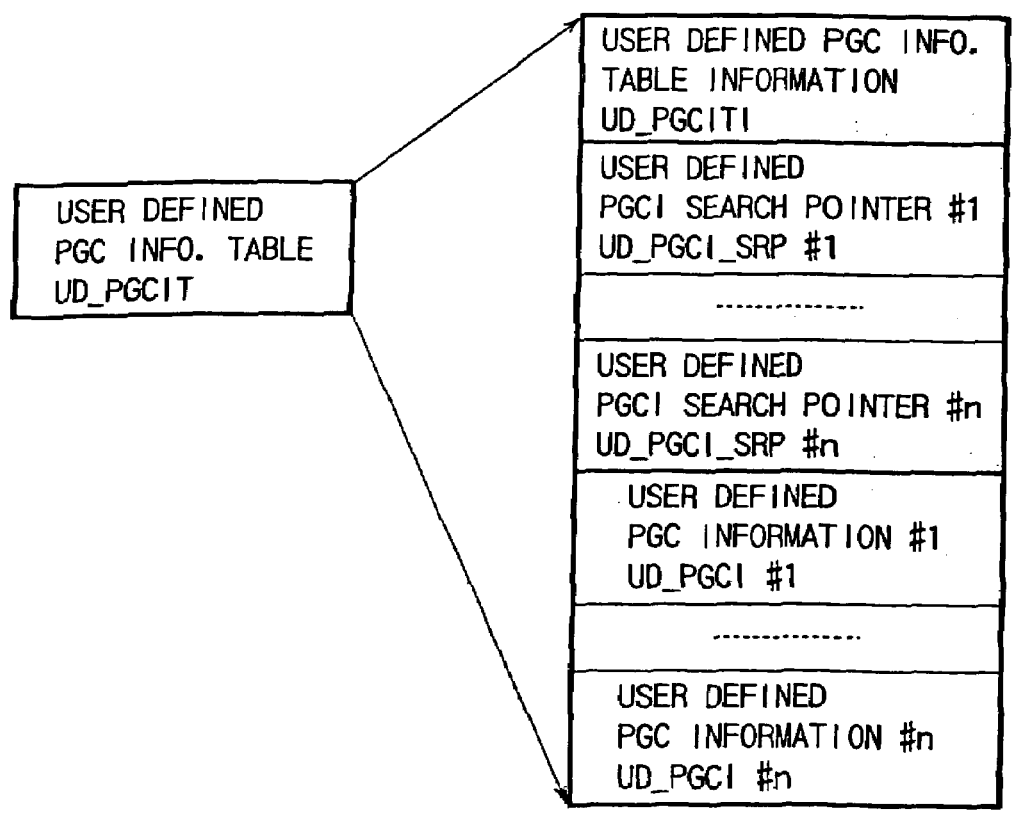
FIG. 26 is a view for explaining the data structure of a user defined PGC information table (UD_PGCIT) shown in FIG. 21.

FIG. 26 shows the data structure of the user defined PGC information table (UD_PGCIT) shown in FIG. 21.

When a trash PGC is created, the trash PGC is defined as a part of user-defined PGC information (UD_PGCI). If no trash PGC is defined, a given PGCN may be assigned to a trash PGC.

UD_PGCIT includes user defined PGC information table information UD_PGCITI, one or more user defined PGCI search pointers UD_PGCI_SRP#1 to UD_PGCI_SRP#n, one or more pieces of user defined PGC information UD_PGCI#1 to UD_PGCI#n.

All UD_PGCs are assigned program chain numbers PGCN ranging from 1 to 99 in the description order of UD_PGCI_SRP in UD_PGCIT. This PGCN can specify each PGC.

UD_PGCITI contains UD_PGCI_SRP_Ns indicating the number of UD_PGCI_SRPs, and UD_PGCIT_EA indicating the end address of UD_PGCIT.

Note that the maximum value of UD_PGCI_SRP_Ns is set at, e.g., "99". UD_PGCIT_EA represents the end address of UD_PGCIT by a relative byte number from the first byte of UD_PGCIT.

UD_PGCI_SRP includes start address UD_PGCI_SA of UD_PGCI. This UD_PGCI_SA represents the start address of UD_PGCI by a relative byte number from the first byte of UD_PGCIT.

Figure 27:
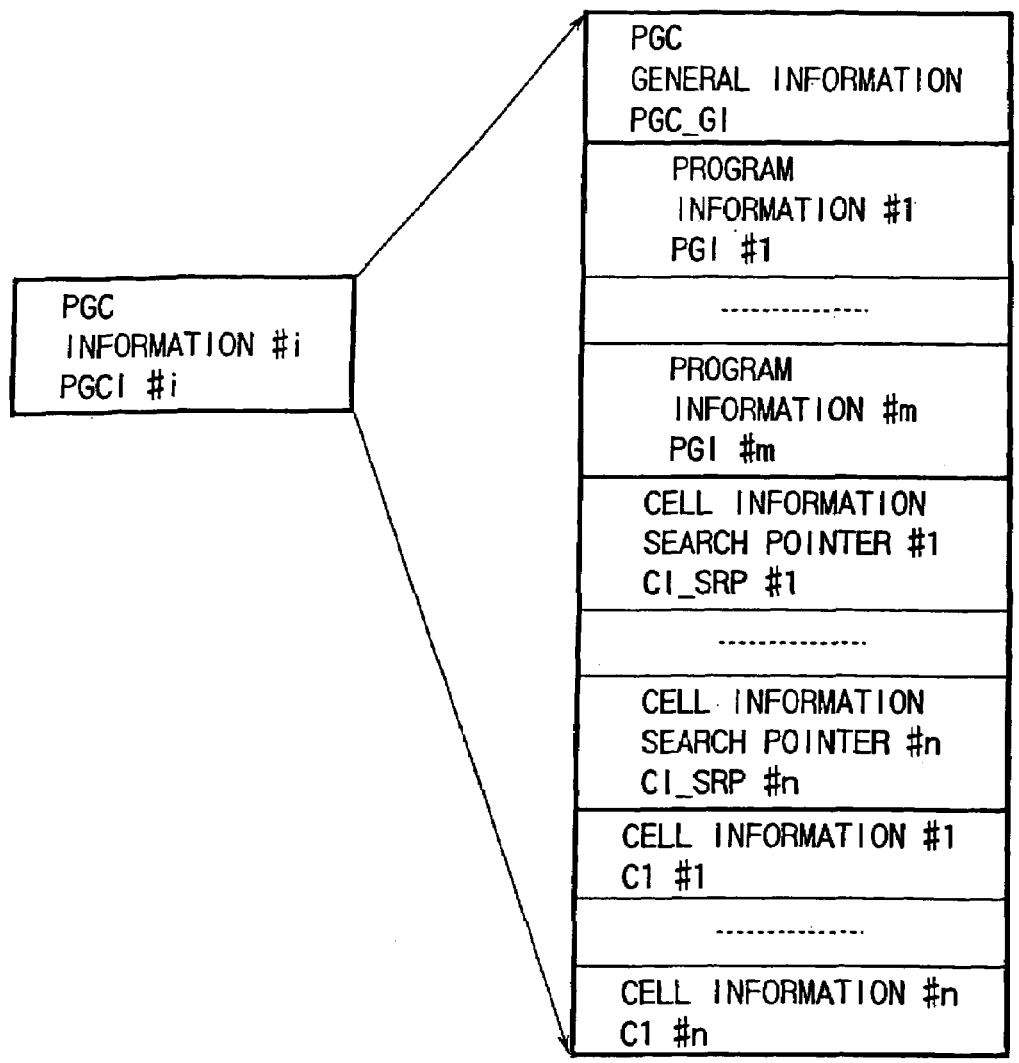
FIG. 27 is a view for explaining the data structure of PGC information (PGCI; information of an original PGC or user defined PGC)

FIG. 27 shows the data structure of the PGC information (PGCI). PGCI contains navigation information for program chain PGC.

Two different types of program chains, i.e., original PGC and user defined PGC, are available (see the contents of RTR_VMG shown in FIG. 21). Original PGC has VOB and PGCI. However, user defined PGC does not have its own VOB, and refers to VOB in original PGC.

As shown in FIG. 27, PGC information (PGCI#i) includes PGC general information PGC_GI, one or more pieces of program information PGI#1 to PGI#m, one or more cell information search pointers CI_SRP#L to CI_SRP#n, and one or more pieces of cell information CI#1 to CI#n.

Note that the start address of cell information CI can be indicated by CI SA described as a relative byte number from the first byte of PGCI.

Here, PGCI of FIG. 27 corresponds to VTS_PGCI of FIG. 9, and this VTS-PGCI corresponds to a combination of UD_PGCIF of FIG. 26 and an original PGCI (ORG_PGCI).

FIG. 28 shows the contents of the PGC general information (PGC_GI) shown in FIG. 27.

This PGC_GI contains PG_Ns that describes the number of programs in PGC, and CI_SRP_Ns that describes the number of CI_SRPs in PGC.

In case of user defined PGC, PG_Ns is set at "0". On the other hand, the maximum number of programs PG in original PGC is "99", and the maximum number of cells in PGC is "999".

This PGC_GI can also include a trash PGC flag as in PGC_GI of trash PGC shown in FIG. 15.

FIG. 29 shows the contents of the program information (PGI) shown in FIG. 27.

This PGI includes PG_TY which describes the type of program, C_Ns which describes the number of cells in PG, primary text information PRM_TXTI used in PG, search pointer number IT_TXT_SRPTN of IT_TXT where text data corresponds to PG, and thumbnail pointer information THM_PTRI.

Note that PRM_TXTI is constructed by a 128-byte field, and the first 64 bytes of that field are described by an ASCII character set. When an ASCII text is less than 64 bytes, "00h" is written in blank bytes.

The second 64 bytes of the 128-byte field are used to describe primary text of another character set (e.g., shift JIS or ISO8859-15). Note that the code of "another character set" is described in VMGI_MAT, and is shared by all the pieces of primary text information in the disc.

Note that a terminal control code that assumes a value ranging from "01h" to "1Fh" is never described in PRM_TXTI.

THM_PTRI describes information of a thumbnail pointer. That is THM_PTRI includes CN that describes the number of the cell where the thumbnail pointer is present, and THM_PT that describes the thumbnail pointer in the target cell.

When the resume marker is present in a movie cell, THM_PT describes the presentation time (PTM) using the RTR presentation time description format.

On the other hand, when a thumbnail is present in a still picture cell, THM_PT describes a still picture VOB entry number (S_VOB_ENTN) in a corresponding still picture VOB group (S_VOG).

THM_PTRI may be optionally set or used in either an RTR recorder or player. When the RTR recorder does not have performance capable of processing THM_PTRI, all the pieces of 8-byte THM_PTRI may be set at "FFh", On the other hand, when the RTR player does not have performance capable of processing THM_PTRI, it may simply ignore THM_PTRI.

Figure 30:
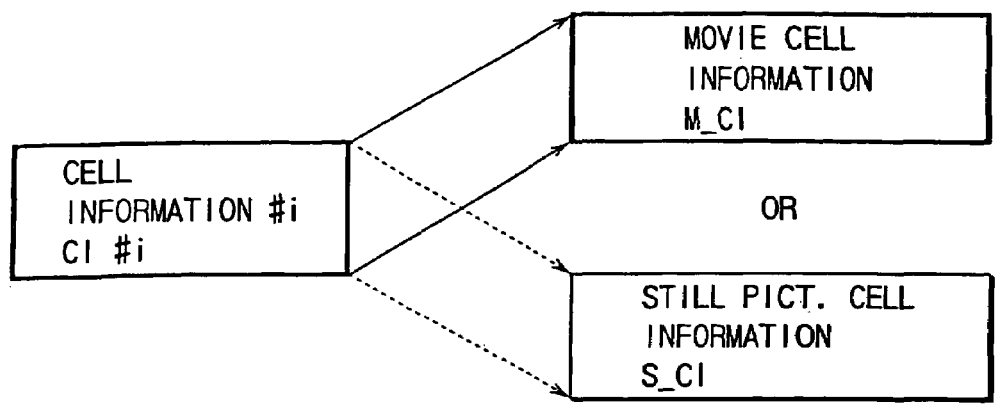
FIG. 30 is a view for explaining the data structure of cell information (CI) shown in FIG. 27.

FIG. 30 shows the data structure of the cell information (CI) shown in FIG. 27.

As shown in FIG. 30, there are two kinds of cell information, i.e., movie cell information M_CI and still picture cell information S_CI.

Information (M_C_EPI) that pertains to the entry point is written in movie cell information M_CI in navigation data file RTR.IFO shown in FIG. 20.

Figure 31:
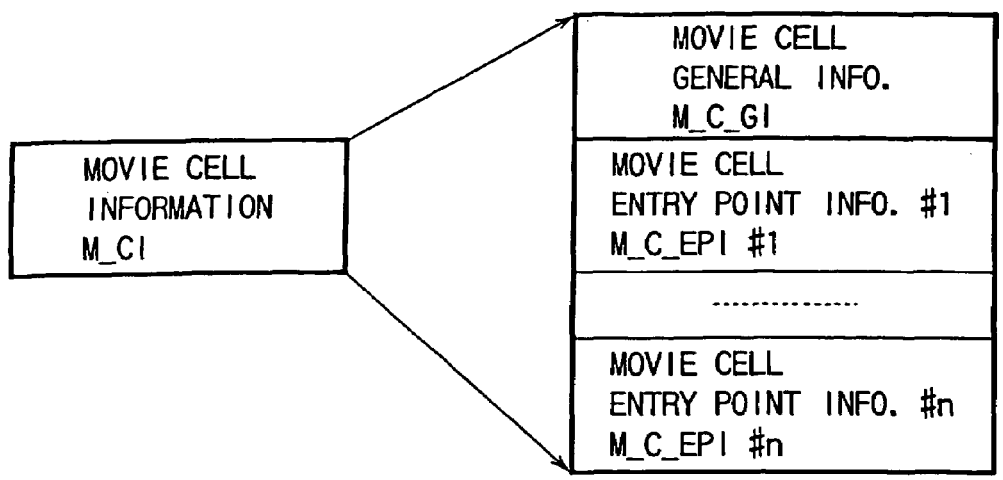
FIG. 31 is a view for explaining the data structure of movie cell information (M_CI) shown in FIG. 30.

FIG. 31 shows the data structure of the movie cell information (M_CI) shown in FIG. 30.

As shown in FIG. 31, M_CI contains movie cell general information M_C_GI, and one or more pieces of movie cell entry point information M_C_EPI#1 to M_C_EPI#n.

Figures 32, 33:
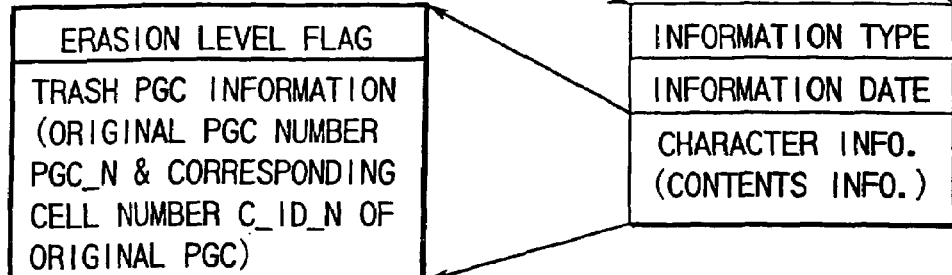
FIG. 32 is a view for explaining the contents of movie cell general information (M_C_GI) shown in FIG. 31.
FIG. 33 is a view for explaining the contents of movie cell entry point information (M_C_EPI) shown in FIG. 31.

FIG. 32 shows the contents of the movie cell general information (M_C_GI) shown in FIG. 31.

That is, M_C_GI contains C_TY which describes the type of cell, M_VOBI_SRPN which describes the number of the movie VOBI search pointer corresponding to VOB of this cell, C_EPI_Ns which describes the number of pieces of cell entry point information, C_V_S_PTM which describes the presentation start time of this cell using the RTR presentation time description format, and C_V_E_PTM which describes the presentation end time of this cell using the RTR presentation time description format.

Note that C_V_S_PTM and C_V_E_PTM satisfy the following conditions.

(1) In case of a cell in original PGC

C_V_S_PTM must be set in the first four VOBUs of the corresponding VOB; and

C_V_S_PTM must be set in the last four VOBUS of the corresponding VOB.

(2) In case of a cell in user defined PGC $$O\_C\_V\_S\_PTM \leq C\_V\_S\_PTM < C\_V\_E\_PTM$$ must hold.

where O_C_V_S_PTM indicates the presentation start time of an original cell corresponding to VOB referred to by this cell, and O_C_V_E_PTM indicates the presentation end time of an original cell corresponding to VOB referred to by this cell.

FIG. 33 shows the contents of the movie cell entry point information (M_C_EPI) shown in FIG. 31.

This M_C_EPI has two types (type 1 and type 2). M_C_EPI of type 1 without any text information is composed of EP_TY and EP_PTM, and M_C_EPI of type 2 with text information is composed of EP_TY, EP_PTM, and PRM_TXTI. FIG. 33 shows M_C_EPI of type 2.

As shown in FIG. 33, M_C_EPI includes EP_TY that describes the type of entry point, EP_PTM that describes the presentation time of the entry point using the RTR presentation time format, and PRM_TXTI that describes primary text information and the like of the entry point.

Upon playback, the value EP_PTM and cell playback time are converted into file pointers that point to VOBU by the time map TMAP information (see FIG. 25), and are also converted into physical addresses by the file system.

PRM_TXTI in M_C_EPI is constructed by a 128-byte field. The first 64 bytes of that field are used to describe primary text using an ASCII character set. When ASCII text is less than 64 bytes, "00h" fills blank bytes. The latter 64 bytes of the 128-byte field are used to describe primary text of another character set (e.g., shift JIS or ISO8859-15). Note that "another character set" is described in $VMGI_{13}$ MAT, and is shared by all the pieces of primary text information in the disc.

Note that a terminal control code that assumes a value ranging from "0lh" to "1Fh" is never described in PRM_TXTI.

EP_TY in M_C_EPI is comprised of 1-byte data including a 2-bit type identification code. If this identification code is "00b", it indicates that M_C_EPI is of type 1 (empty primary text data or no data); if the code is "01b", it indicates that M_C_EPI is of type 2 (primary text data).

This EP_TY has a 6-bit reserved field in addition to the 2-bit type identification code that identifies type 1 or 2. Using some or all the bits of this reserved field, the contents of PRM_TXTI in M_C_EPI can be further specified. (If all the six bits are used, a maximum of 64 different specifications may be made. More than 6 bits may be assigned to this designation code to specify more types.)

The bits using this reserved field will be referred to as a designation code for designating the contents of the primary text information hereinafter.

Specific bits in the designation code can designate whether PRM_TXTI in M_C_EPI shown in FIG. 33 is "text information" with "information type" and/or "information date" or "text information" without "information type" and/or "information date".

Furthermore, specific bits in the designation code can designate whether PRM_TXTI in M_C_EPI shown in FIG. 33 is "text information" with corresponding "thumbnail information" in addition to "information type" and/or "information date", or "text information" without "thumbnail information". (The "thumbnail information" corresponds to, e.g., thumbnail pointer information THM_PTRI shown in FIG. 29.)

Moreover, specific bits in the designation code can designate whether PRM_TXTI in M_C_EPI shown in FIG. 33 consists of "thumbnail information" alone without any "text information" or "thumbnail information" with "text information".

When the designation code (not shown) in EP_TY designates "information type", "information date", and "text information" shown in FIG. 33, these pieces of information can be used to express the following contents.

More specifically, "information type" describes an attribute of the entry point, "information date" describes the date of registration (recorded on the disc) of the entry point, and "text information" describes additional information (a brief comment of a picture at the entry point) that pertains to the entry point.

The attributes of the entry point described in "information type" include:

information type [1]=0, user mark (the user registers the entry point)

information type [1]=1; set mark (an apparatus such as a DVD_RTR video recorder or the like registers the entry point)

information type [1]=3; erasion prohibition mark (corresponding to the erasion level flag described in the cell type in C_PBI shown in FIG. 12)

information type [1]=4; trash box mark (corresponding to information of trash PGC shown in FIG. 16)

information type [1] 5 to 7; other marks

Note that [1] in information type [1] means the first data field of the information type. If this data field has a 3-bit configuration, information type [1] can express eight different marks.

Figure 34:
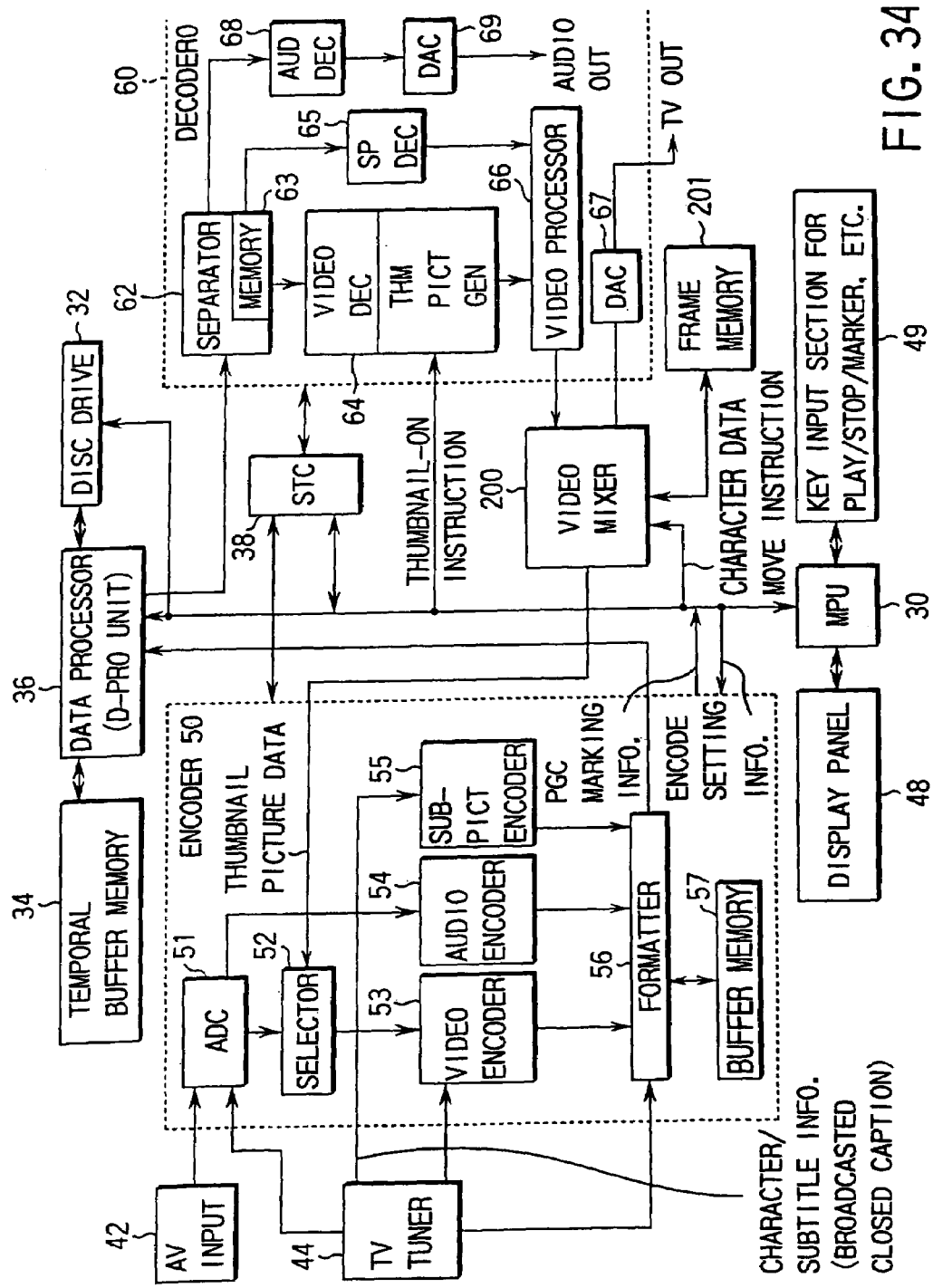
FIG. 34 is a block diagram showing an example of the arrangement of an apparatus for recording/playing back a video program or the like in real time (RTR video recorder) using the recordable optical disc shown in FIG. 1.

FIG. 34 shows an example of the arrangement of an apparatus (RTR video recorder) for recording (recording/playing back) digital moving picture information (video program or the like) at variable recording rate using optical disc (DVD-RAM, DVD-RW, or DVD-R disc) 10 shown in FIG. 1.

The apparatus main body of the RTR video recorder shown in FIG. 34 has disc drive 32 for rotating a recording disc and reading/writing information on the disc, encoder 50 which constructs the recording side, decoder 60 which constructs the playback side, and microcomputer (MPU) 30 for controlling operations of the overall apparatus.

Encoder 50 comprises analog-to-digital converter (ADC) 51, selector 52, video encoder 53, audio encoder 54, sub-picture encoder 55, formatter 56, and buffer memory 57.

ADC 51 receives an external analog video signal+external analog audio signal from AV input 42, or analog TV signal+analog audio signal from TV tuner 44. This ADC 51 converts the input analog video signal into digital data at, e.g., a sampling frequency=13.5 MHz and the number of quantization bits=8. (More specifically, luminance component Y, color difference component Cr (or Y−R), and color difference component Cb (or Y−B) are respectively quantized by 8 bits.) Likewise, ADC 51 converts the input analog audio signal into digital data at, e.g., a sampling frequency=48 kHz and the number of quantization bits=16.

When an analog video signal and digital audio signal are input to ADC 51, the digital audio signal passes through ADC 51.

When a digital video signal and digital audio signal are input to ADC 51, these signals pass through ADC 51.

A digital video signal output from ADC 51 is supplied to formatter 56 via selector 52 and video encoder 53. Also, a digital audio signal output from ADC 51 is supplied to formatter 56 via audio encoder 54.

Selector 52 selects a signal output from video mixer 200 and sends it to video encoder 53 when a reduced-scale image (thumbnail picture) for editing (to be described later) is to be recorded.

Video encoder 53 has a function of converting the input digital video signal into a digital signal compressed at variable bit rate on the basis of the MPEG2 or MPEG1 specifications.

Audio encoder 54 has a function of converting the input digital audio signal into a digital signal (or linear PCM digital signal) compressed at fixed bit rate on the basis of the MPEG or AC-3 specifications.

When a digital video signal (for example, a signal from a DVD video player with an independent output terminal of a sub-picture signal) with the structure shown in FIGS. 2 to 5 or FIGS. 17 and 18 is input from AV input 42, or when a DVD video signal with such data structure is broadcasted and is received by TV tuner 44, a teletext signal (closed caption) component in the DVD video signal is input to sub-picture encoder 55. Sub-picture data input to sub-picture encoder 55 is arranged into a predetermined signal format, and is then sent to formatter 56.

Formatter 56 executes predetermined signal processing of the input video signal, audio signal, sub-picture signal, and the like using buffer memory 57 as a work area, and outputs recording data that matches the aforementioned format (file structure) to data processor 36.

In this processing, a cell is set as a minimum unit of main picture data (video data), and cell playback information C_PBI shown in FIG. 11 (or cell information CI shown in FIG. 27) is created. Then, the configuration of cells that construct program chain PGC, attributes of main picture, sub-picture, and audio data, and the like are set (some of these pieces of attribute information use information obtained upon encoding the respective data), and information management table information (VMGI, VTSI shown in FIG. 3; or RTR_VMG shown in FIG. 20) including various kinds of information is created.

Encoded main picture data, audio data, and sub-picture data are segmented into packs each having a predetermined size (2,048 bytes). Dummy packs are inserted into these packs, as needed. Note that time stamps such as PTS (presentation time stamp), DTS (decode time stamp), and the like are described in packs other than dummy packs, as needed. As for PTS of sub-picture data, a time arbitrarily delayed from PTS of main picture data or audio data in the identical playback time band can be described.

Data cells are arranged in units of VOBUs to allow playback in the time code order of data, thus forming VOB consisting of a plurality of cells. VOBS that combines one or more VOBs is formatted into a file structure that matches VTS shown in FIG. 3 or RTR_MOV.VRO shown in FIG. 20.

The RTR video recorder shown in FIG. 34 comprises disc drive 32, temporary buffer memory 34, data processor (D-PRO unit) 36, and system time clock (STC) 38 as means for reading/writing (recording and/or playing back) information with respect a recordable DVD_RTR disc.

Temporary buffer memory 34 is used to buffer a given amount of data to be written on the disc (data output from encoder 50) via D-PRO unit 36, and to buffer a given amount of data played back from the disc (data input to decoder 60) via D-PRO unit 36.

For example, when temporary buffer memory 34 comprises a 4-Mbyte semiconductor memory (DRAM), it can buffer recording or playback data for approximately 8 seconds at an average recording rate of 4 Mbps. When temporary buffer memory 34 comprises a 16-Mbyte EEPROM (flash memory), it can buffer recording or playback data for approximately 30 seconds at an average recording rate of 4 Mbps. Furthermore, when temporary buffer memory 34 comprises a 100-Mbyte, very small HDD (hard disc drive), it can buffer recording or playback data for 3 minutes or more at an average recording rate of 4 Mbps. Also, temporary buffer memory 34 can also be used to temporarily store recording information when the disc is used up during recording, until that disc is exchanged by a new disc.

D-PRO unit 36 supplies DVD recording data from encoder 50 to disc drive 32, receives a DVD playback signal played back from the disc from drive 32, rewrites management information (directory record, VMGI_MAT, VTSI_MAT, RTR_VMG, and the like) recorded on the disc, and erases data (some or all fields of VTS, RTR_MOV.VRO, or the like) recorded on the disc, under the control of MPU 30.

MPU 30 includes a ROM written with various control programs and the like, a RAM which provides a word area required for executing programs, and the like, in addition to a CPU core of the microcomputer.

This MPU 30 executes processes such as free space detection of the disc which is being used in recording, recording space (the number of recorded packs) detection, remaining space detection, warning, recording mode change instruction, and the like, in accordance with the control programs stored in its ROM.

Furthermore, MPU 30 has a function of designating an erasion level appending range to cell units (or entry point units), a function of setting an erasion level, a function of dividing a cell, a function of detecting the erasion level, and the like. With these functions, user operability of the RTR video recorder system can be improved.

Of the execution results of various control programs by MPU 30, the contents the user of the DVD_RTR video recorder should know are displayed on display panel 48 of the DVD_RTR video recorder, or are displayed on a monitor display as on-screen display (OSD).

Decoder 60 comprises separator 62 for separating the respective packs from DVD_RTR playback data with the aforementioned pack structure, memory 63 used upon executing pack separation and other signal processes, video decoder 64 for decoding contents of video packs separated by separator 62, sub-picture decoder 65 for decoding the contents of sub-picture packs separated by separator 62, audio decoder 68 for decoding the contents of audio packs separated by separator 62, and video processor 66 for appropriately mixing sub-picture data from sub-picture decoder 65 with video data output from video decoder 64, i.e., superposing sub-picture data such as menus, highlight buttons, superimposed dialogs, and the like on main picture data, and outputting them.

Note that video decoder 64 incorporates a thumbnail picture generator for generating an image (thumbnail picture) obtained by extracting and reducing a predetermined I-picture portion from, e.g., MPEG video data in accordance with a command from MPU 30.

This thumbnail picture is output to an external TV monitor via video mixer 0200 and DAC (digital-to-analog converter) 67, or is supplied to video encoder 63 via video mixer 200 and selector 52.

The thumbnail picture data supplied to video encoder 53 can be written in a predetermined dummy pack (see FIGS. 18 and 19) by formatter 56.

The output from video processor 66 is supplied to video mixer 200. Frame memory 201 used for mixing video data is connected to video mixer 200.

A digital signal output from video processor 66 via video mixer 200 is supplied to an external monitor (not shown) such as a television receiver via video DAC 67.

Or the digital signal from video processor 66 may be supplied to a built-in liquid crystal display (not shown) or the like of the apparatus.

The output from audio decoder 68 is supplied to an external device via audio DAC 69.

The digital video output from video mixer 200 or digital audio output from audio DAC 68 may be externally output via an appropriate digital output interface, although pertinent connections are not shown in the drawings.

Furthermore, key input unit 49, and display panel 48 for displaying the operation state and the like of the DVD-RTR recorder are connected to MPU 30.

Figure 35:
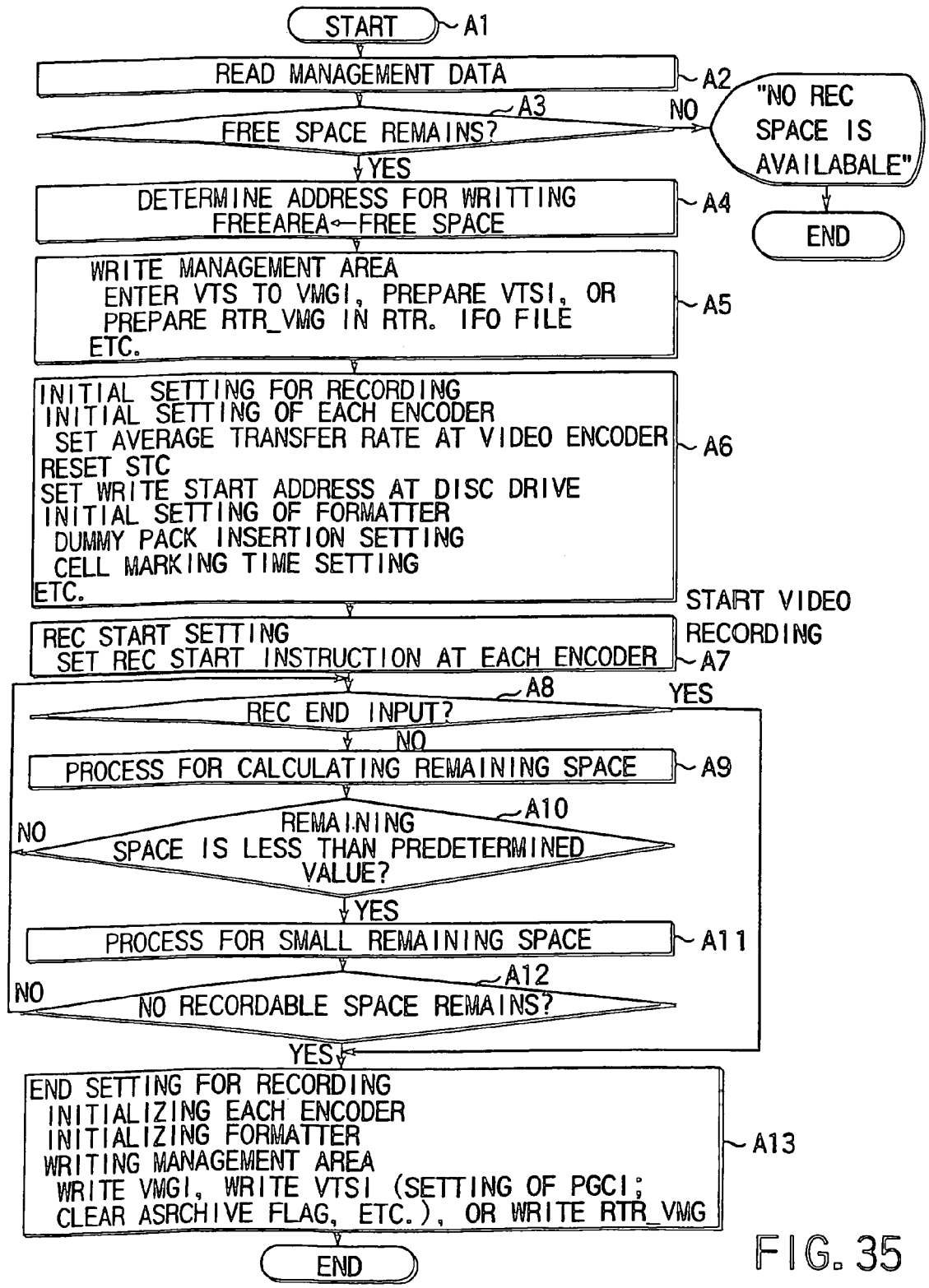
FIG. 35 is a flow chart for explaining recording in the apparatus shown in FIG. 34.

FIG. 35 is a flow chart for explaining image recording by the apparatus shown in FIG. 34.

Upon receiving an image recording command from key input unit 49 (or a preserved recording program or key operation at a remote controller (not shown)), MPU 30 shown in FIG. 34 reads management data from disc 10 via disc drive 32 (step A2), and determines a write area (step A4).

MPU 30 then sets management data (creates VMGI and VTSI files shown in FIG. 3; or creates RTR_VMG file shown in FIG. 20) in a management area to be able to write data in the determined area, and sets the write start address of video data in disc drive 32 to prepare for data recording (step A5).

If there is no recordable space (NO in step A3), a warning tone or message is generated or displayed.

MPU 30 then resets the time in STC 38. Note that STC 38 is a system timer, and recording or playback is done with reference to the measurement value of this STC.

Furthermore, MPU 30 makes other setups (steps A6 and A7).

The flow of a video signal upon recording is as follows.

AV signals input from TV tuner 44 shown in FIG. 34 or an external device are A/D-converted, a video signal is supplied to video encoder 53, and an audio signal is supplied to audio encoder 54. Also, a teletext signal or the like is supplied from TV tuner 44 to SP encoder 55.

The respective encoders (53 to 55 in FIG. 34) compress and packetize the input signals (note that each packet is formed to have a size of 2,048 bytes per pack), and input the packets to formatter 56. The respective encoders determine PTS and DTS of each packet in accordance with the value of STC 38, as needed.

Formatter 56 temporarily stores packet data in buffer memory 57, then packs the input packet data, and mixes them in units of GOPs. Formatter 56 appends a navigation pack to the head of each GOP, as needed, and inputs packs to D-PRO unit 36.

D-PRO unit 36 forms ECC groups in units of 16 packs, appends ECC data to these groups, and sends them to disc drive 32. When disc drive 32 is not ready to record on the disc, D-PRO unit 36 temporarily transfers ECC group data to temporary buffer memory 34, and waits until disc drive 32 is ready to record. When disc drive 32 is ready to record, recording is started. In this case, a large-size memory is assumed as temporary buffer memory 34 so as to store recording data for several minutes or more by high-speed access.

At the end of recording, MPU 30 records address data of navigation packs (or navigation data) in fast-forwarding or rewinding data fields of the respective navigation packs (or navigation data), and records required information on the management area after recording, thus ending recording (steps A8 to A14).

Note that MPU 30 shown in FIG. 34 can read out various kinds of information from the file management area and the like on disc 10 shown in FIG. 1, and can write various kinds of information on the recording area of this disc by sending commands to D-PRO unit 36 via data bus.

At the end of recording, erasion level flags set in units of cells, which are used by the RTR video recorder system are cleared to permit playback (step A13). That is, playback of all cells is permitted upon initial recording.

This erasion level flag is described in C_PBI (FIG. 12). When an archive flag (erasion prohibition flag) is stored in VMG, it is also cleared.

If M_C_EPI (FIG. 33) in RTR_VMG includes the erasion level flag or trash PGC information, it is also cleared.

The data processing upon playback is as follows.

Upon receiving a playback command, MPU 30 reads data on the management area via disc drive 32 and D-PRO unit 36, and determines the playback address. MPU 30 then sends the determined playback data address and a read command to disc drive 32.

In response to the received command, disc drive 32 reads out sector data from the disc, performs error correction using D-PRO unit 36, and outputs the readout data to decoder 60 in the form of pack data.

In decoder 60, separator 62 receives and packetizes the readout pack data. Depending on data contents, MPU 30 transfers video packet data (MPEG video data) to video decoder 64, audio packet data to audio decoder 68, and sub-picture packet data to SP decoder 65, and saves the contents of navigation packs (or navigation data) in its internal memory to use them when required. In this manner, MPU 30 can quickly access navigation data anytime.

At the beginning of transfer of the respective packet data, PTS included in a header is loaded to STC 38 (MPU 30 sets PTS in a navigation pack in STC, or video decoder 64 automatically sets PTS of video data in STC 38). After that, the respective decoders play back data in synchronism with PTS values in packet data, and moving picture data with audio and superimposed dialog data can be played back on a TV monitor.

In some cases, an erasion level flag is described in cell playback information (CPB_I), as shown in FIG. 12. Hence, before cell playback, the erasion level is checked, and if the cell is temporarily erased (i.e., level=01h), the control skips playback of that cell and starts processes of the next cell.

When a temporary erase flag is described in VOB information (VOB_GI), the VOB information of VOB entered in cell information is read out before reproducing (playback)

the cell. Then, the status of the temporary erase flag is checked. If the status indicates a temporarily-eased state (or the flag=01h), the playback of that cell is skipped, and the process of playing back the subsequent cell is activated.

That is, in this system, since erasion level flags are set in units of cells, erasion setting (to automatically exclude a given cell from those to be played back) can be done in units of cells, thus allowing more flexible presentation and management.

Accordingly, a temporary erasion process is done as follows.

Figure 36:
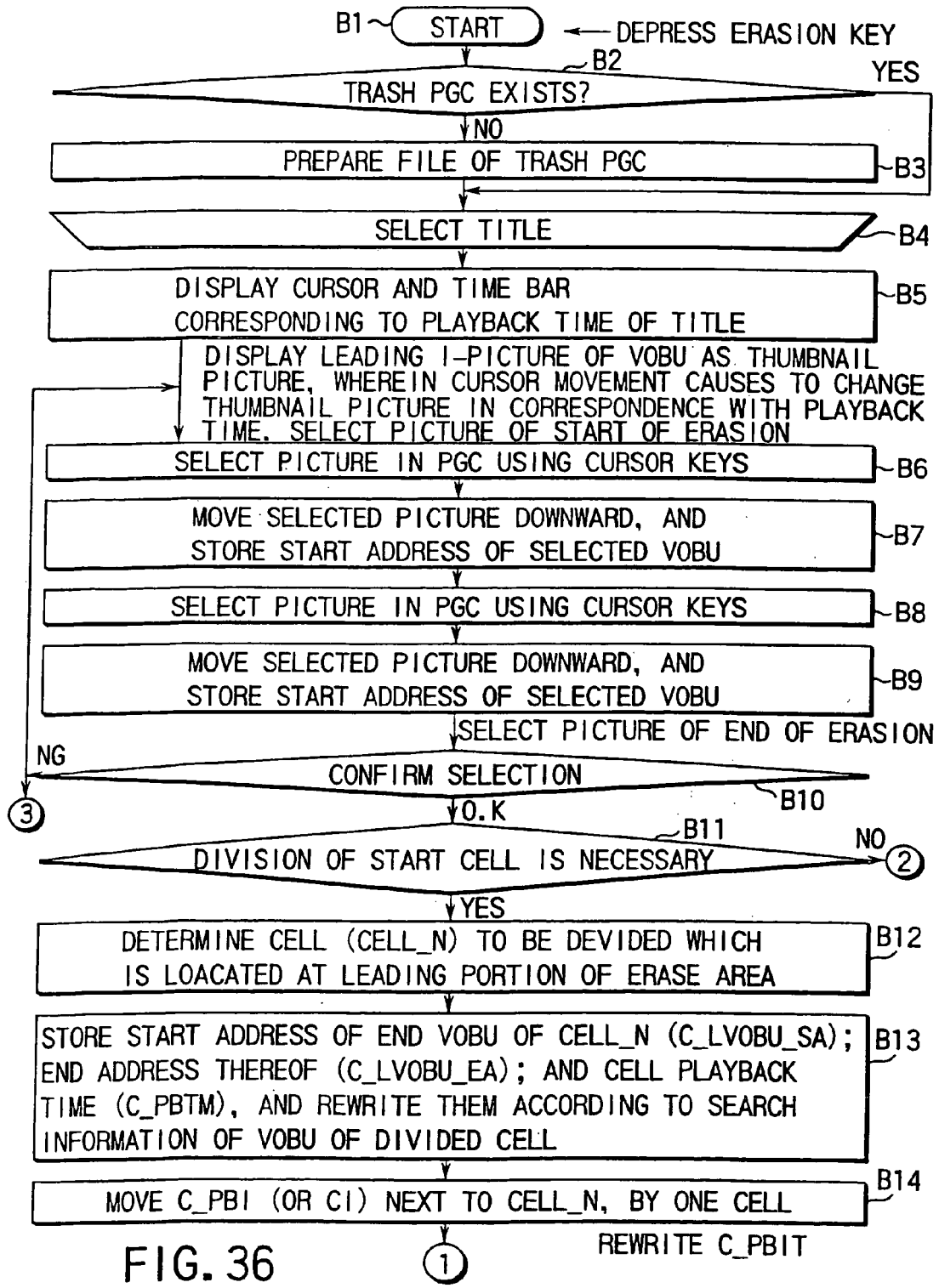
FIG. 36 is a flow chart for explaining an erasion level setup process.
Figure 37:
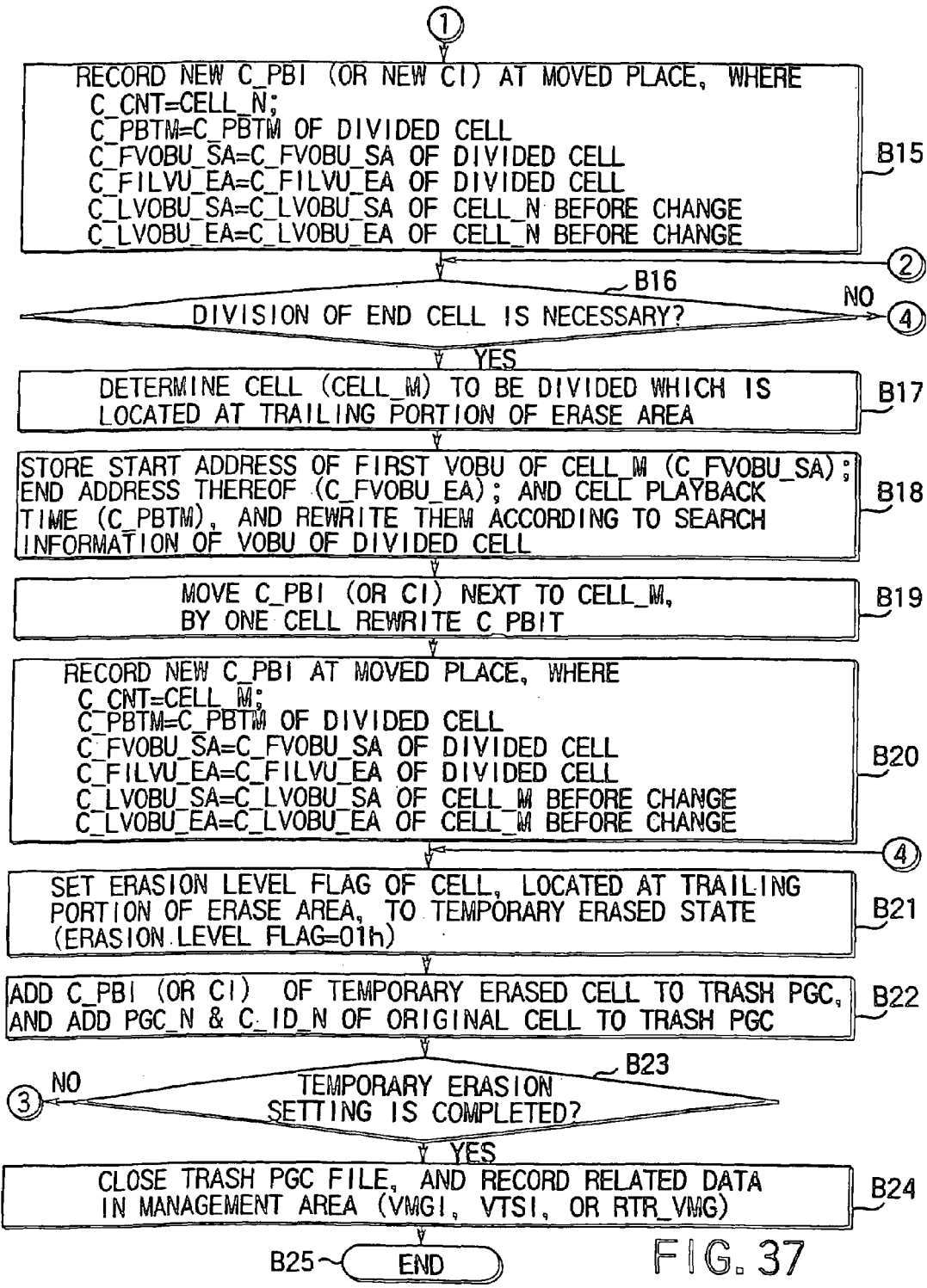
FIG. 37 is a flow chart continued from FIG. 36.
Figure 38:
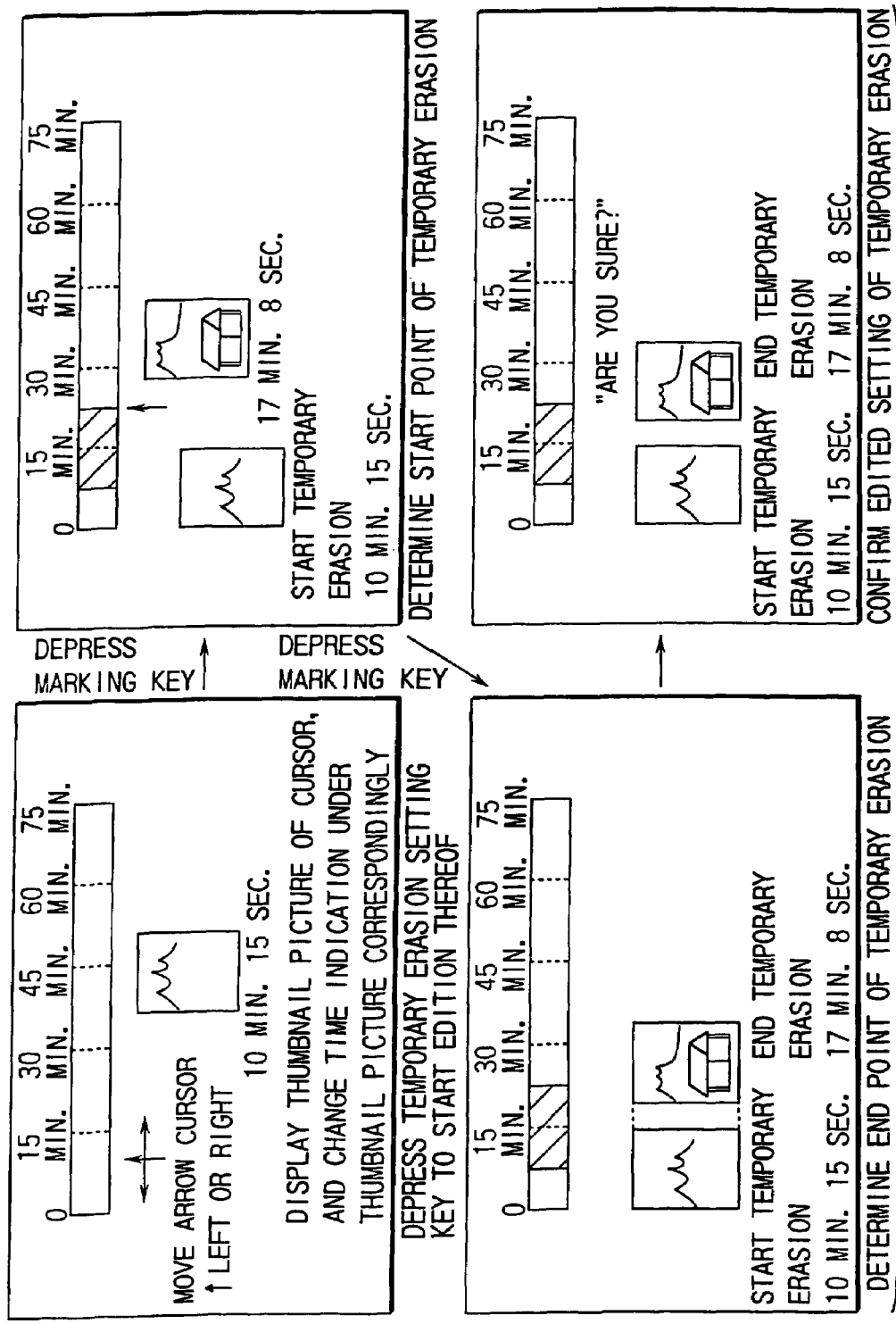
FIG. 38 is a view for explaining examples of windows displayed upon setting the erasion level.
Figure 39:
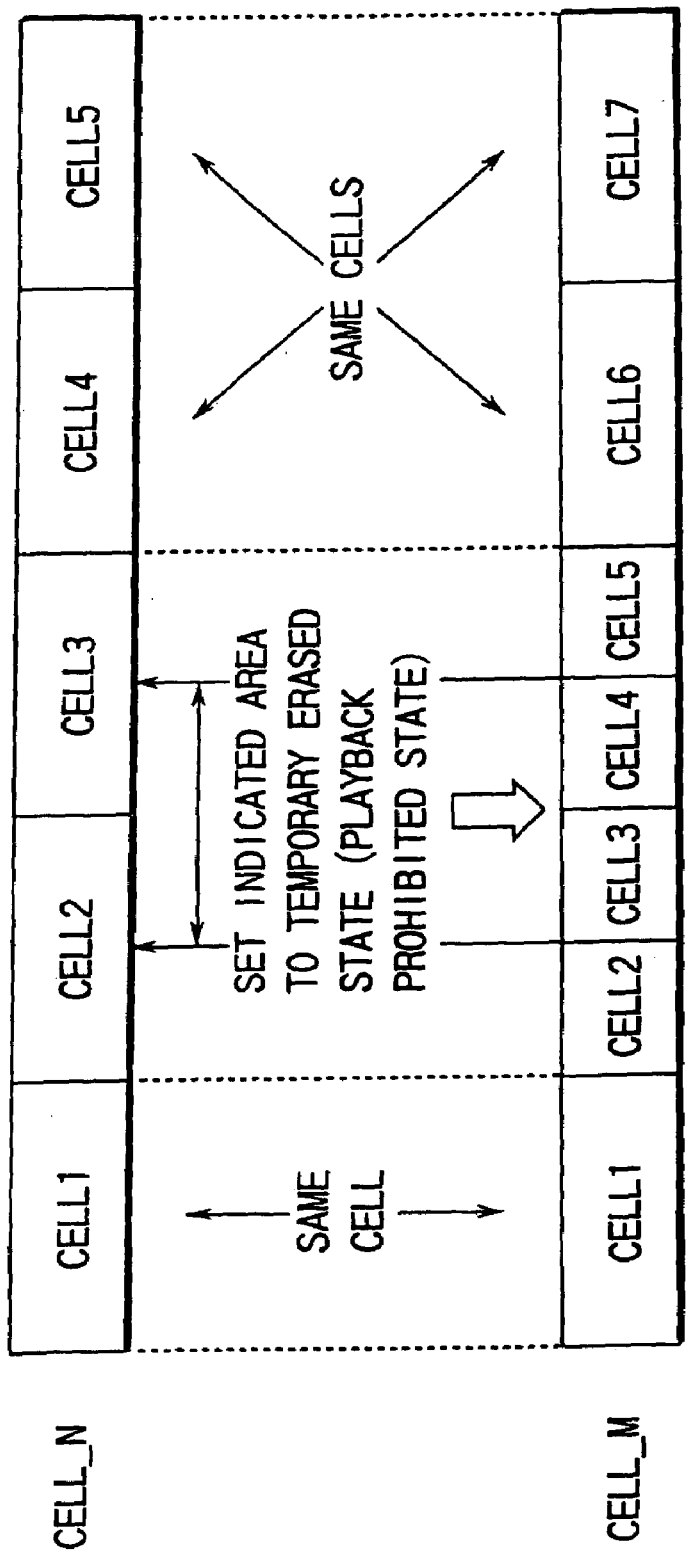
FIG. 39 is a view for explaining cell division.

FIGS. 36 and 37 are flow charts for explaining erasion level setting (temporary erasion process). FIG. 38 shows examples of windows displayed in this temporary erasion process, and FIG. 39 is a view for explaining the principle of cell division upon executing the temporary erasion process.

When an erasion key of key input unit 49 shown in FIG. 34 (or a remote controller (not shown)) has been pressed, MPU 30 shown in FIG. 34 starts the process shown in FIGS. 36 and 37.

1) It is checked if there is PGC with the trash PGC flag=01h in PGC_GI shown in FIG. 15, i.e., trash PGC (step B2). If no trash PGC is found, a file of trash PGC is prepared (step B3).

2) The user selects a title (VTS or PGC) (step B4).

3) A time bar corresponding to the playback time of the selected title (VTS or PGC), and a cursor for designating that time range (see the time bar in 15-min increments shown in FIG. 38) are displayed (step B5).

In this time bar display, PGC of interest may be divided in units of cells using the dotted lines and the like, so as to inform the user that the range bounded by the dotted lines corresponds to an identical scene (one PGC). For example, in image sensing using a video camera, the range from the beginning of recording to a pause or the end of recording corresponds to this scene. In a TV drama, the range from a given CM to the next CM corresponds to this scene.

4) The user designates the erasion start position using a cursor key and marker key of key input unit 49 (step B6), and the VOBU address corresponding to the designated position, and the like are saved in the internal work memory (not shown) of MPU 30 (step B7).

At this time, when the start I-picture of VOBU pointed by the cursor is simultaneously displayed on the cursor window as a reduced-scale image (thumbnail picture), the user can recognize the contents of a cell at the cursor position, thus allowing easy operation.

The playback time at the cursor position at that time can also be displayed. The playback time can be calculated by C_PBTM+C_ELTM within the range from the first cell to the immediately preceding cell of the title with reference to cell elapse time C_ELTM (FIG. 7) in a navigation pack and cell playback time C_PBTM (FIG. 12) in cell playback information.

Or the playback time at the cursor position can be calculated with reference to the contents of time map information TMAPI (FIG. 25) and movie cell general information M_C_GI (FIG. 32).

5) The user designates the erasion end position using the cursor key and marker key of key input unit 49 (step B8), and the VOBU address corresponding to the designated position and the like are saved in the work memory (step B9).

6) Looking at the display in FIG. 38, the user confirms if he or she agrees with the current selected range (the displayed range from erasion start to erasion end) (step B10).

If the user disagrees with that range (NG in step B10), the work memory is cleared to repeat the processes in steps B6 to B9.

7) If the user agrees with the displayed selected range (OK in step B10), it is checked if cell division is necessary at the set start position, i.e., if the cell start position matches the set start position (step B11).

If no cell division is necessary at the start position (NO in step B11), the flow advances to step B16 in FIG. 37.

8) If cell division is necessary at the start position (YES in step B11), the cell to be divided (CELL_N) is determined based on start and end VOBUs in C_PBI of each cell (step B12). Alternatively, the cell number which was determined and saved upon setting by the cursor is used as CELL_N. Cell division is done using this CELL_N.

More specifically, start address C_LVOBU_SA, end address C_LVOBU_EA, and cell playback time C_PBTM of last VOBU in C_PBI of CELL_N are saved in the work memory, and C_LVOBU_SA, C_LVOBU_EA, and C_PBTM are rewritten on the basis of search information of a navigation pack of VOBU to be divided (step B13).

Then, C_PBI next to CELL_N is moved by one cell (step B14).

Note that the processes in step B13 and B14 can also be done using time map information TMAPI shown in FIG. 25 and PGC information PGCI shown in FIG. 27.

At the place reached in step B14, new cell playback information C_PBI with the following contents is recorded (step B15 in FIG. 37).

That is, the same cell category C_CAT as that of CELL_N, playback time C_PBTM of the divided cell, start address C FVOBU SA of first VOBU in the divided cell, end address C_FILVU_EA of first ILVU in the divided cell, start address C_LVOBU_SA of last VOBU in the divided cell, and end address C_LVOBU_EA of last VOBU in the divided cell are recorded as new cell playback information C_PBI of the divided cell.

9) Subsequently, the erasion level flag of the setting start cell (e.g., cell 3 in the lower cell array in FIG. 39) is set in a playback prohibition (temporary erasion) state.

The same processes as those in steps B11 to B15 are repeated for a cell at the setting end position (steps B16 to B20).

10) That is, it is checked if cell division is necessary at the setting end position (i.e., to check if the cell end position matches the setting end position). If no division is necessary (NO in step B16), the flow advances to step B21.

11) If the end cell must be divided (YES in step B16), the cell to be divided (CELL_M) is determined (that cell is determined based on start and end VOBUs in C_PBI of each cell. Or the cell number which was determined and saved upon setting by the cursor is used). The determined cell is divided (step B17).

More specifically, C FVOBU_SA to C_LVOBU_EA, and C_PBTM in cell playback information C_PBI of CELL_M are saved, and the saved C_FVOBU_SA to C_LVOBU_EA, and C_PBTM are rewritten based on search information of VOBU to be divided (step B18).

Then, C_PBI next to CELL_M is moved by one cell (step B19).

At the place reached in step B19, new cell playback information with the following contents is recorded (step B20).

That is, the same cell category C_CAT as that of CELL_M, playback time C_PBTM of the divided cell, start address C_FVOBU_SA of first VOBU in the divided cell, end address C_FILVU EA of first ILVU in the divided cell, start address C_LVOBU_SA of last VOBU in the divided cell, and end address C_LVOBU_EA of last VOBU in the divided cell are recorded as new cell playback information C_PBI of the divided cell.

12) The erasion level flag of each cell before the setting end cell (e.g., cell 4 in the lower cell array in FIG. 39) is set in a playback prohibition (temporary erasion) state (step B21).

13) C_PBI of each temporary erased cell (e.g., cells 3 and 4 in the lower cell array in FIG. 39) is added to trash PGC, and original PGC number PGC_N and original cell number C_ID_N are recorded in this C_PBI (FIG. 16) (step B22).

14) If cells to be subjected to erasion level setting (temporary erasion process) still remain (NO in step B23), operation repeats itself from step B6 in FIG. 36.

Upon completion of erasion level setting (temporary erasion process) (YES in step B23), pertinent data are written in trash PGC general information (FIG. 15) to record data required for file management (step B24).

Note that the processes for dividing a cell in steps B11 to B24 can also be done using information shown in FIGS. 21 to 33. More specifically, movie cell M_C_GI (FIG. 32) and movie cell entry point information M_C_EPI (FIG. 33) of M_CI of the divided cell can be rewritten on the basis of time map information TMAPI (FIG. 25) that corresponds to cell division.

In this case, data in a navigation pack is not necessary, and the cell division position can be specified by entry point information M_C_EPI#1 to M_C_EPI#n shown in FIG. 31. Also, erasion level (temporary erasion) setting information can be described in character information in M_C_EPI shown in FIG. 33.

Figure 40:
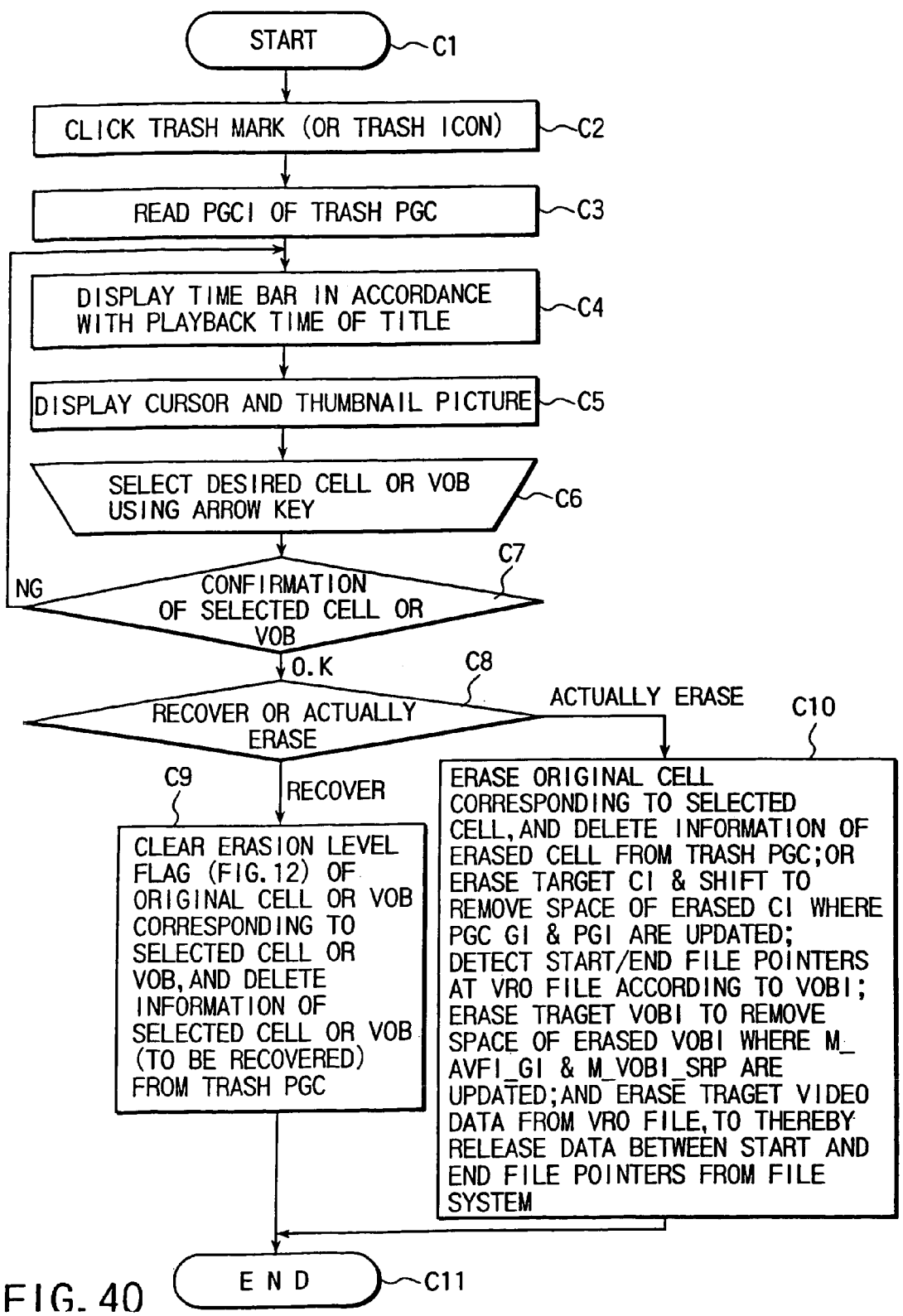
FIG. 40 is a flow chart for explaining recovery (restoration) and actual erasion of a cell in which an erasion level flag is set.
Figure 41:
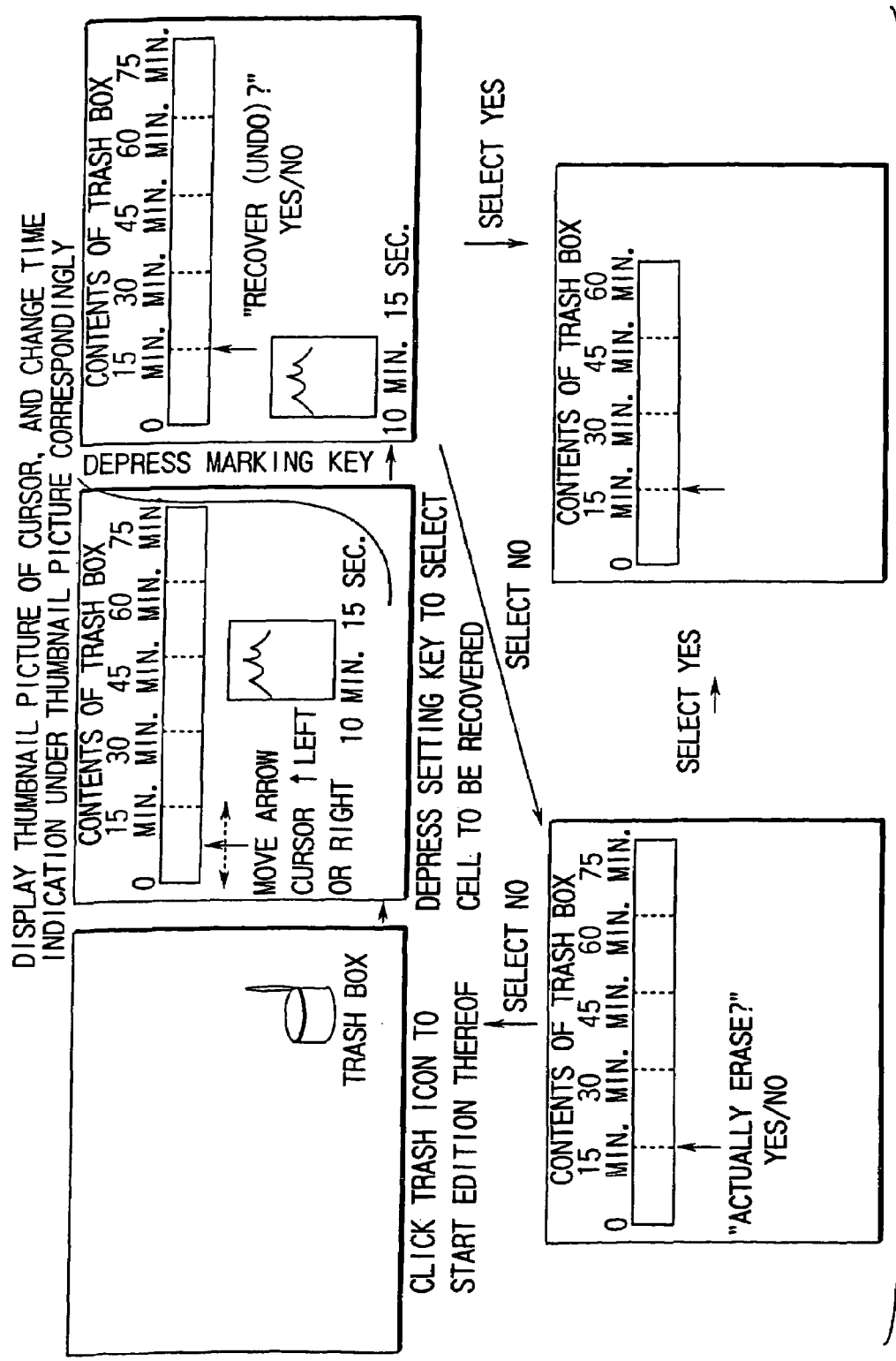
FIG. 41 is a view for explaining examples of windows displayed upon recovering (restoring) and actually erasing a cell in which an erasion level flag is set.

FIG. 40 is a flow chart for explaining recovery (restoration) and actual erasion of a cell in which an erasion level flag is set in a temporary erasion state. FIG. 41 shows examples of windows displayed upon recovering (restoring) and actually erasing a cell in which an erasion level flag is set.

In this embodiment, a process for recovering from a temporary erasion state (playback prohibition state) to a playback permitted state is done in units of cells. (Although not shown as a flow chart, a similar recovery process can be done in units of entry points.)

1) The user clicks a trash box mark (icon) by key operation on the remote controller (not shown) (or by mouse operation (not shown)) while observing the upper left window in FIG. 41 (step C2).

2) If trash PGC has been selected upon clicking the trash icon, MPU 30 shown in FIG. 34 reads information (FIGS. 15 and 16) of trash PGC from disc 10 (step C3).

3) Then, a time bar is displayed in accordance with the playback time of trash PGC, as illustrated on the upper central window in FIG. 41 (step C4). At this time, title text "contents of trash box" is also displayed to indicate trash PGC. Furthermore, a cursor for designating a cell to be recovered to a playback permitted state, and a reduced-scale image (thumbnail picture) of I-picture of that cell are displayed (step C5).

4) The user then designates a cell to be recovered to the playback permitted state (i.e., to cancel the temporary erasion state) using a cursor key and marker key (not shown) on the remote controller (step C6).

If the aforementioned erasion cancel designation is erroneously done or cells to be erasion-canceled still remain (NG in step C7), processes in steps C4 to C6 are repeated.

5) After the designated cell is confirmed (OK in step C7), the user determines if the designated cell is to be recovered to the playback permitted state or to be actually erased (step C8).

6) When the designated cell (or VOB) is to be recovered to the playback permitted state, MPU 30 specifies an original cell (or VOB) of the selected cell (or VOB) by referring to PGC_N and C_ID_N (or CI) of trash PGC shown in FIG. 16. MPU 30 then clears the erasion level flag (FIG. 12) of that original cell (or VOB) to 00h (playback permitted), and deletes information (PGC_N and C_ID_N; or CI) of the cell (or VOB) in the temporary erasion state from trash PGC (step C9).

7) As to cell, when the designated cell is to be actually erased, MPU 30 specifies an original cell of the selected cell by referring to PGC_N and C_ID_N of trash PGC shown in FIG. 16. MPU 30 erases that original cell, and deletes information (PGC_N and C_ID_N in FIG. 16) of the erased cell from trash PGC (step C10).

7*) As to VOB, when the designated VOB is to be actually erased, MPU 30 erases the target cell information CI and shifts upward the subsequent CI to remove the space of erased CI where PGC_GI and PGI are updated (step C10).

At this time, the start and end file pointers (FPs) at the VRO file are detected according to the VOB information (VOBI) (step C10).

The target VOBI is then erased, and the space of the erased VOBI is removed where the movie AV file general information (M_AVFI_GI) and movie VOBI search pointer (M_VOBI_SRP) are updated (step C10).

Thereafter, the target video data is erased from the VRO file, to thereby release from the file system the data between the start and end file pointers (step C10).

Figure 42:
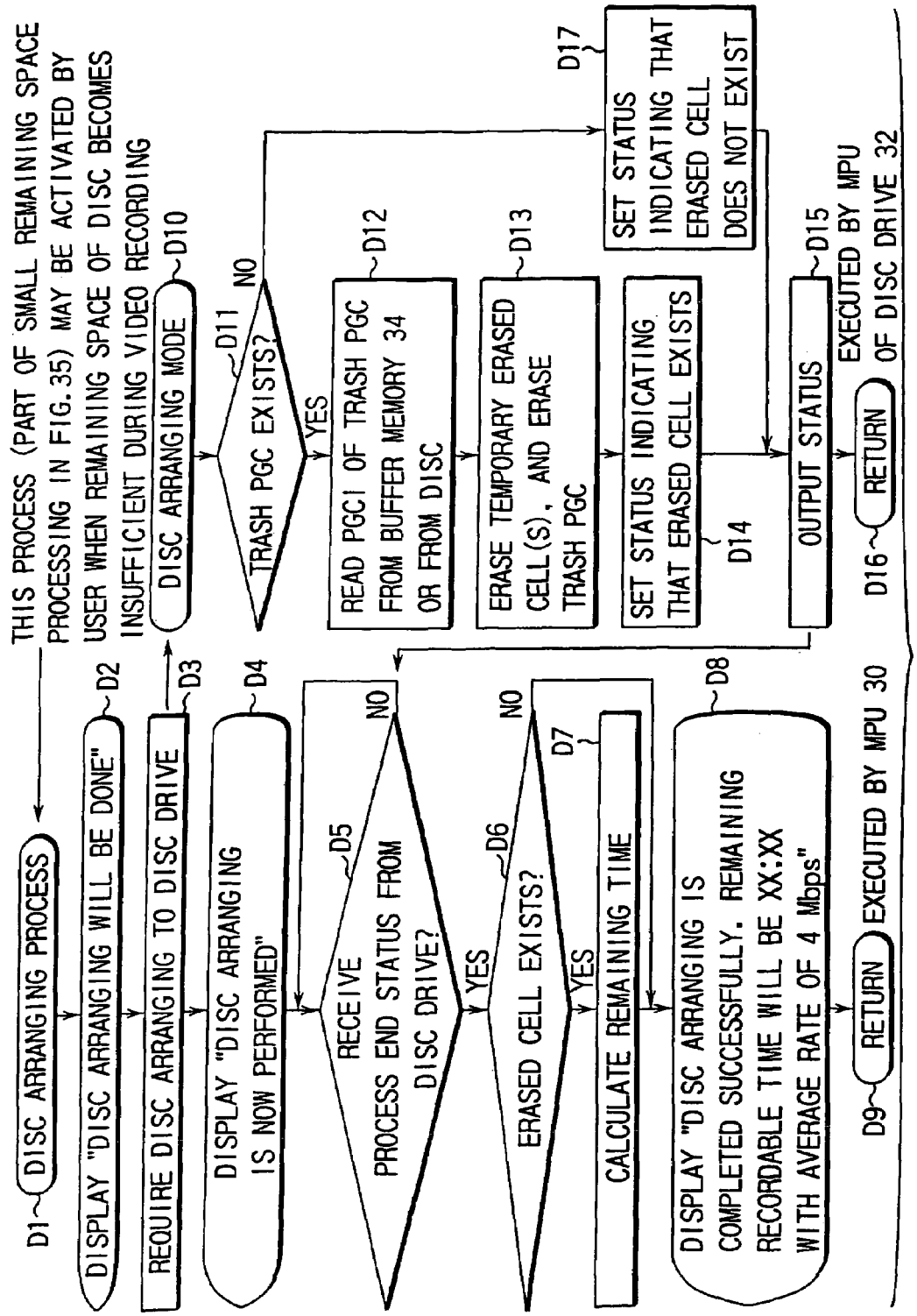
FIG. 42 is a flow chart for explaining automatic erasion of a cell in which an erasion level flag is set.
Figure 43:
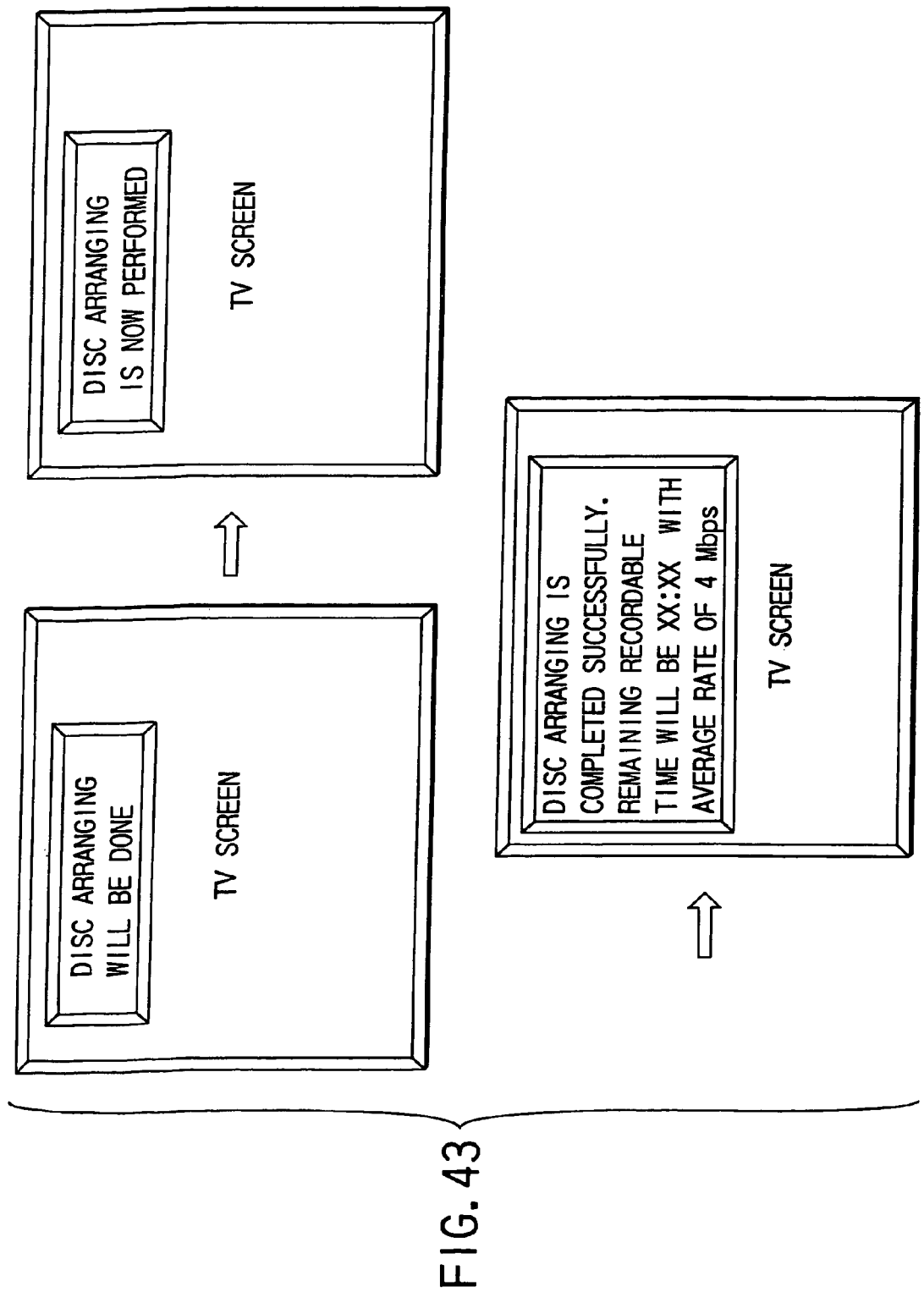
FIG. 43 is a view for explaining example of windows displayed upon erasing a cell in which an erasion level flag is set.

FIG. 42 is a flow chart showing automatic erasion (disc arranging process) of a cell in which an erasion level flag is set. FIG. 43 shows examples of windows displayed upon erasing a cell in which an erasion level flag is set.

The disc arranging process shown in FIG. 42 is executed when the timer reservation time before the beginning of recording is longer than the time corresponding to the remaining space of disc 10, when the remaining space of disc 10 becomes short during recording, or when the user actually wants to erase a cell in a temporary erasion state in trash PGC.

More specifically, when the remaining space of disc 10 becomes short or when the user inputs an erasion command, MPU 30 executes the disc arranging process shown in FIG. 42.

1) If the control enters this process, message "disc arranging will be done" is displayed on the TV monitor screen, as illustrated on the upper left window in FIG. 43 (step D2).

2) MPU 30 then instructs disc drive 32 to start disc arranging (step D3).

In response to this instruction, the internal MPU (not shown) of disc drive 32 executes the following process of the disc arranging mode (step D10).

More specifically, the internal MPU checks based on the contents of the trash PGC flag shown in FIG. 15 if trash PGC is present on currently set disc 10 (step D11).

If trash PGC with a trash PGC flag=01h is found, the internal MPU reads out information (FIGS. 15 and 16) of that PGC from disc 10 (or a buffer memory if it is recorded on the buffer memory of temporary buffer memory 34) (step D12).

The internal MPU erases all original cells in a temporary erasion state (i.e., those with an erasion level flag (FIG.

12)=01h) in trash PGC on the basis of the readout information (PGC_N and C_ID_N in FIG. 16), and also erases empty trash PGC (step D13).

The internal MPU then sends back to MPU 30 status indicating that erased cells exist (steps D14 and D15).

On the other hand, if no trash PGC is found on that disc (NO in step D11), the internal MPU sends back to MPU 30 status indicating that a cell to be erased does not exist (steps D17 and D15).

3) While disc drive 32 is executing the processes in steps D11 to D17, message "disc arranging is now performed" illustrated on the upper right window in FIG. 43 is displayed on the TV monitor screen (step D4).

4) If disc drive 32 has completed the processes in steps D11 to D17 and sends back status (YES in step. D5), MPU 30 checks if erased cells exist.

5) If erased cells exist (YES in step D6), since the remaining space of disc 10 increases accordingly, the remaining recordable time is recalculated (step D7).

This recalculation can be made on the basis of the number of sectors of the unrecorded space of disc 10, the mode (MPEG1 or MPEG2) used in the subsequent recording, the average recording rate (bits/sec) used in the subsequent recording, contents (%) of dummy packs, and the like.

If no erased cell exists (NO in step D6), since the remaining space of disc 10 remains the same even after disc arranging, the flow skips the recalculation of the remaining recordable time.

6) After the remaining time of disc 10 is obtained, as described above, message "disc arranging completed successfully. Remaining recordable time will be 6 min 15 sec with average rate of 4 Mbps", as shown at the center in FIG. 43, is displayed on the TV monitor screen (step D8).

With this process, the recorded files on the disc in use are arranged, and temporary erased cells are actually erased, thus increasing the recordable space of the arranged disc.

Also, the erasion level can be set in small units.

Figure 44:
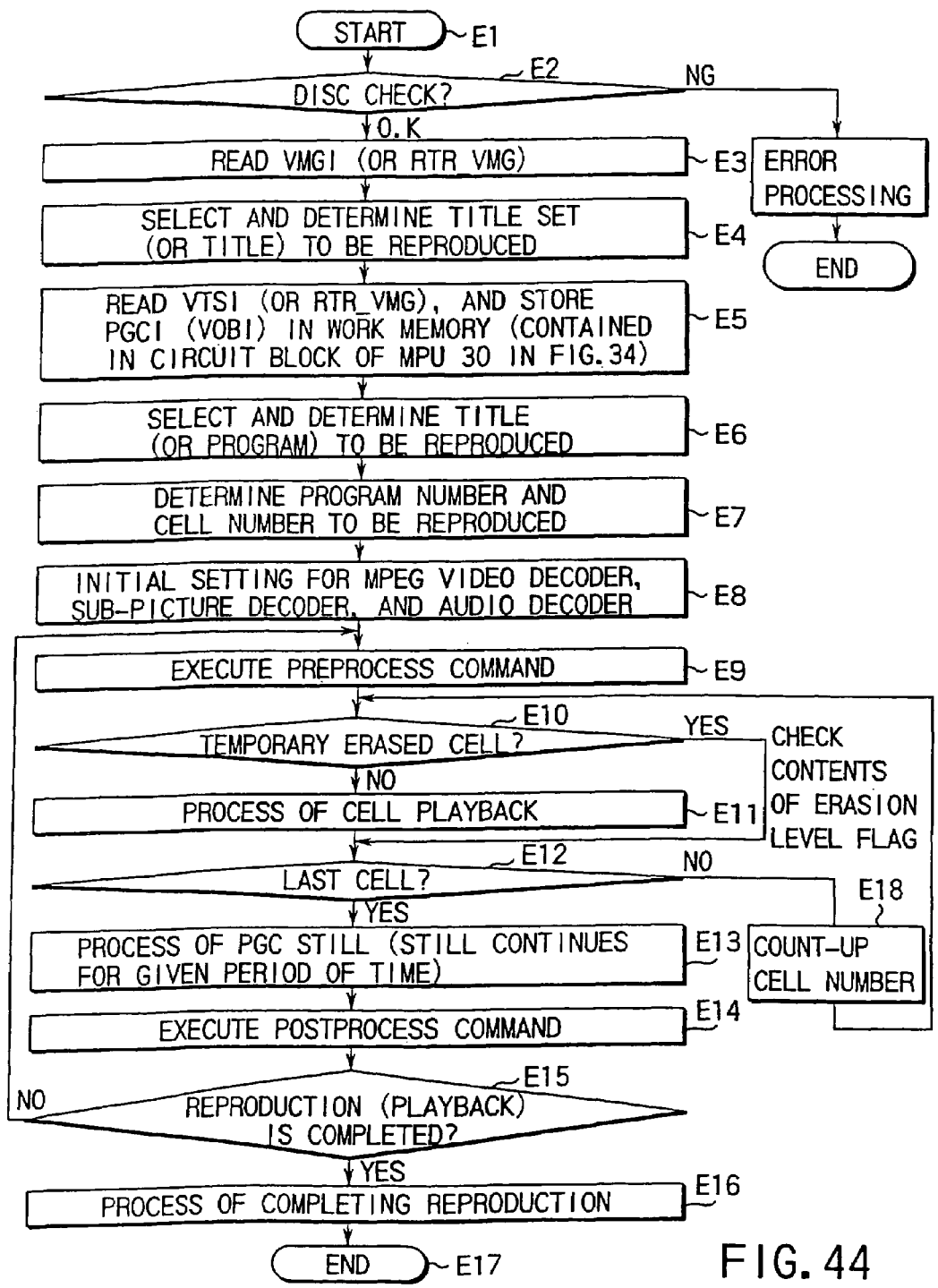
FIG. 44 is a flow chart for explaining the playback process of the apparatus shown in FIG. 34.

FIG. 44 is a flow chart for explaining playback upon playing back the contents on the disc that describes the aforementioned erasion level information.

Upon receiving a playback start command, it is checked if the disc is a DVD_RTR disc (step E2).

If the disc is a DVD_RTR disc, management information VMGI is read (step E3), and menus and the like are displayed, as needed.

If a title set to be reproduced or played back (or a title to be played back) has been selected (step E4), VTSI (or RTR_VMG) of that title is read (step E5) to set up an environment, and PGC information (PGCI) or VOB information (VOBI) is stored.

The title (or program) is selected and determined (step E6), and a program number, cell number, and the like to be played back are determined to determine the playback order and the like (step E7).

The video decoder, sub-picture decoder, audio decoder, and the like are initially set up (step E8).

Subsequently, a preprocess command is executed (step E9), and it is checked if the read cell is a temporary erased cell (step E10).

Incidentally, no preprocess command is executed in a RTR_DVD system.

If the read cell has no flag of the erasion state (i.e., it is not in the temporary erasion state), cell playback is executed (step E11).

If the read cell describes a flag of the erasion state (temporary erasion state), playback of that cell is skipped, and the next cell is played back.

After the last cell has been played back (YES in step E12), a still picture is played back for a preset period of time (a predetermined period of time including zero time) (step E13), and a postprocess command is executed (step E14).

If the last cell has not been played back yet (NO in step E12), the cell number is incremented by one (step E18), and the processes in steps E10, E11, and E18 are repeated until the last cell is played back.

Upon completion of playback of the last cell and execution of the postprocess command, if the user has pressed a stop button on the remote controller to quit playback (YES in step E15), a process for completing playback is executed (step E16), and the apparatus (RTR video recorder) is at rest to wait for the next user command.

On the other hand, even after completion of playback of the last cell and execution of the postprocess command, if the user has pressed a play button on the remote controller to direct playback start (NO in step E15), the processes in steps E9 to E15 are executed again.

Incidentally, no postprocess command is executed in the RTR_DVD system.

FIGS. 45-48 are a set of flow charts explaining a manner of dividing video objects (VOB) and cells.

Figure 49:
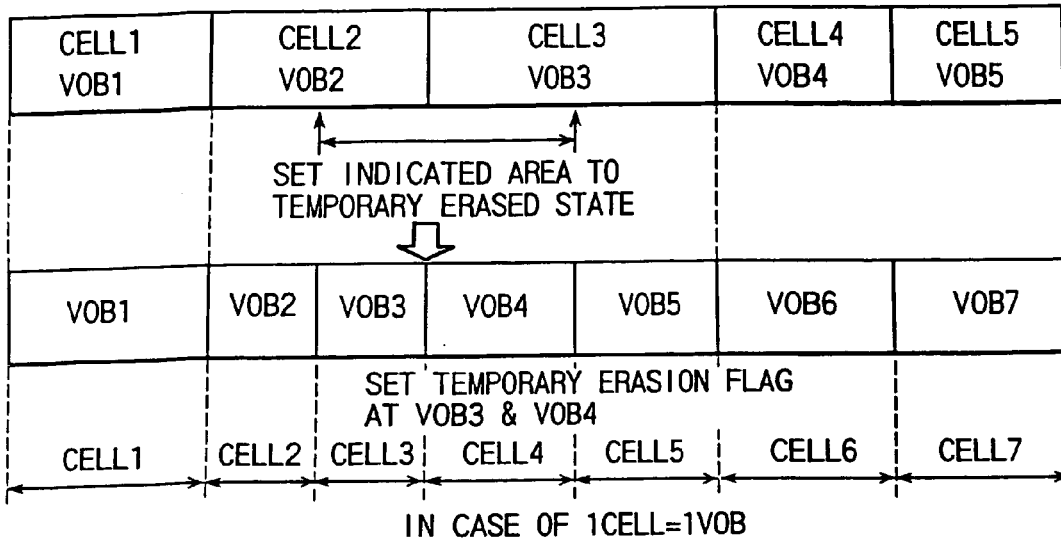
FIG. 49 explains a manner of dividing cells where one cell is equal to one VOB.
Figure 50:
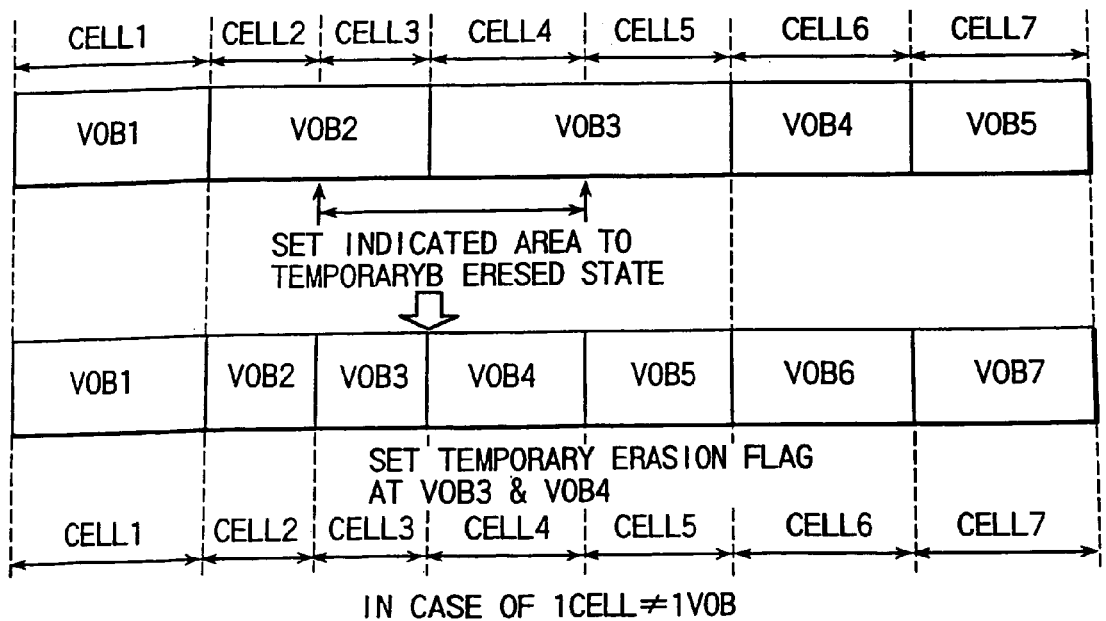
FIG. 50 explains a manner of dividing VOBs where one cell is not equal to one VOB.

FIG. 49 explains a manner of dividing cells where one cell is equal to one VOB, and FIG. 50 explains a manner of dividing VOBs where one cell is not equal to one VOB.

Figure 45:
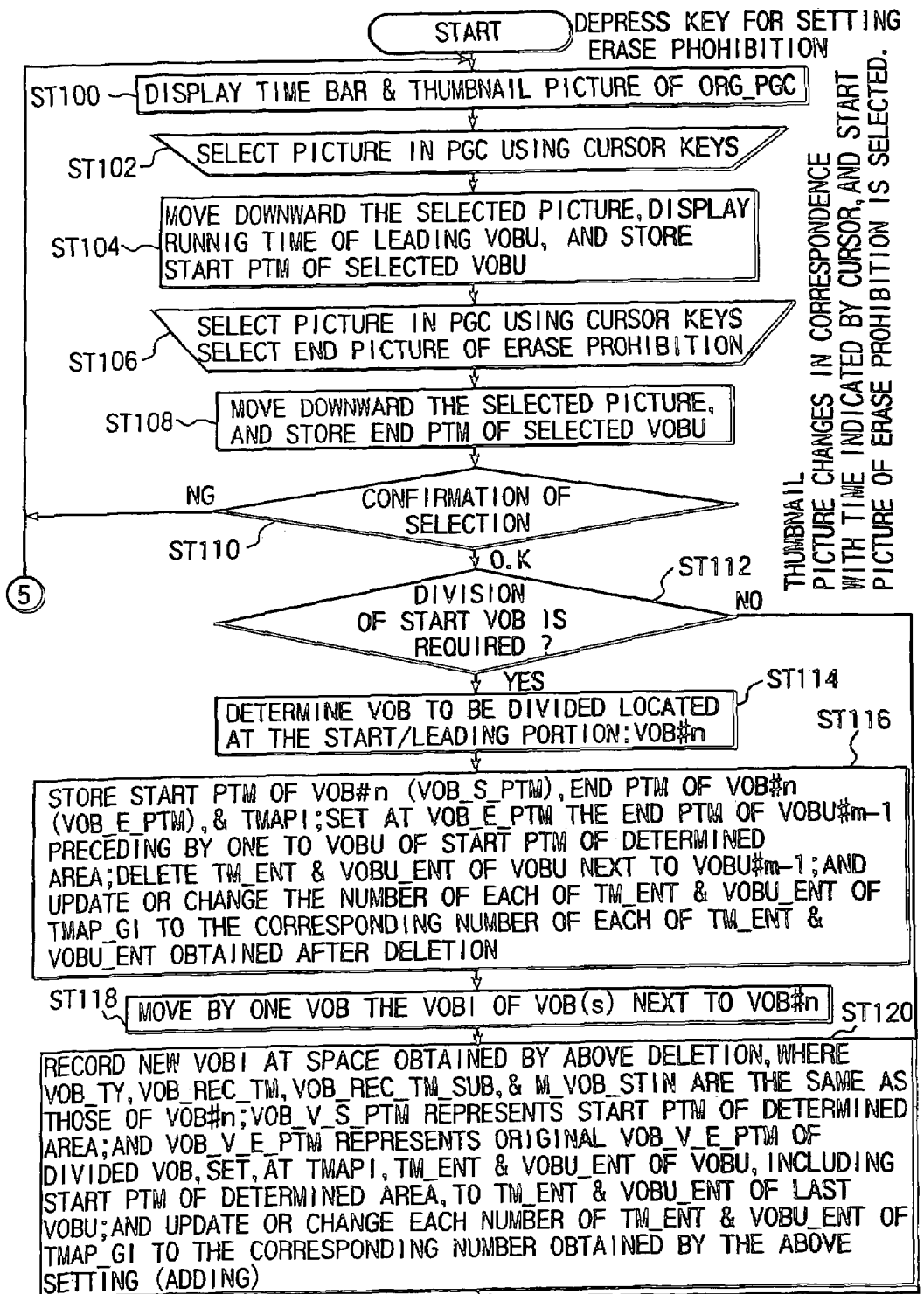
FIGS. 45-48 are a set of flow charts explaining a manner of dividing VOB and cell.

As shown in FIG. 45, when a user depresses a key for setting the erase prohibition, a control device (e.g., MPU 30 in FIG. 34) acts on decoder 60, etc., so that the time bar and thumbnail picture(s) as shown in FIG. 38 are displayed on the screen of a TV monitor (not shown) (step ST100).

The user may move the cursor displayed on the screen, using cursor keys of key input section 49 or a remote controller (not shown). When the cursor is moved, the content of displayed thumbnail picture is changed correspondingly. During the cursor key manipulation, the user can select a picture in the PGC (step ST102). At this time, the selected picture indicates the start portion of the erase prohibition.

Then, the displayed position of the selected picture moves downward, and the running time of leading VOBU (video object unit) of the moved picture is displayed on the screen. At this time, the start PTM (presentation time) of this VOBU is stored in a RAM or register (not shown) of MPU 30 (step ST104).

The user may further select a picture in the PGC (step ST106).

Then, the displayed position of the selected picture moves downward, and the end PTM of selected VOBU is stored in the RAM or register (not shown) of MPU 30 (step ST108).

At this time, the user can confirm his/her selections of the displayed pictures (step ST110).

If the user is not satisfied (NG at step ST110), the process returns to step ST0100.

When the user is satisfied (OK at step ST110), it is checked whether a division of the start VOB is necessary (step ST112).

If the division of the start VOB is not necessary (NO at step ST112), the process goes to step ST122 described hereinafter.

When the division of the start VOB is necessary (YES at step ST112), the VOB (VOB#n) to be divided (which is located at the start portion) is determined (step ST114).

Then, start PTM of VOB#n (VOB_S_PTM), end PTM of VOB#n (VOB_E_PTM), and time map information (TMAPI) are stored in the RAM or register of MPU 30 (step ST116).

At this time, the end PTM of VOBU#m−1 which proceeds by one to the VOBU of the start PTM of the determined area is set at VOB_E_PTM (step ST116).

Further, a time entry (TM_ENT) and a VOBU entry (VOBU_ENT) of VOBU next to VOBU#m−1 are deleted, and the number of each of TM_ENT and VOBU_ENT of time map general information (TMAP_GI) are updated or changed to the corresponding number of each of TM_ENT and VOBU_ENT obtained after the deletion (step ST116).

Then, video object information (VOBI) of VOB(s) next to VOB#n is moved by one VOB (step ST118).

A space is created by the deletion of step ST116. The new VOBI of step ST118 is recorded in the created space (step ST120), where VOB type (VOB_TY), VOB recording time (VOB_REC_TM), sub-second information of VOB_REC_TM (VOB_REC_TM_SUB), and movie VOB stream information number (M_VOB_STIN) are the same as those of VOB#n. VOB_V_S_PTM represents the start PTM of this VOB. VOB_V_E_PTM (end PTM of this VOB) represents the original VOB_V_E_PTM of the divided VOB.

Further, data of a group from "the TM_ENT and VOBU_ENT of the divided VOBU including the start PTM of the determined area" to "the TM_ENT and VOBU_ENT of the last VOBU" are set at TMAPI (step ST120).

Still further, each number of the TM_ENT and VOBU_ENT of a time map general information (TMAP_GI) is updated or changed to the corresponding number obtained by the above setting at the TMAPI (step ST120).

Figure 46:
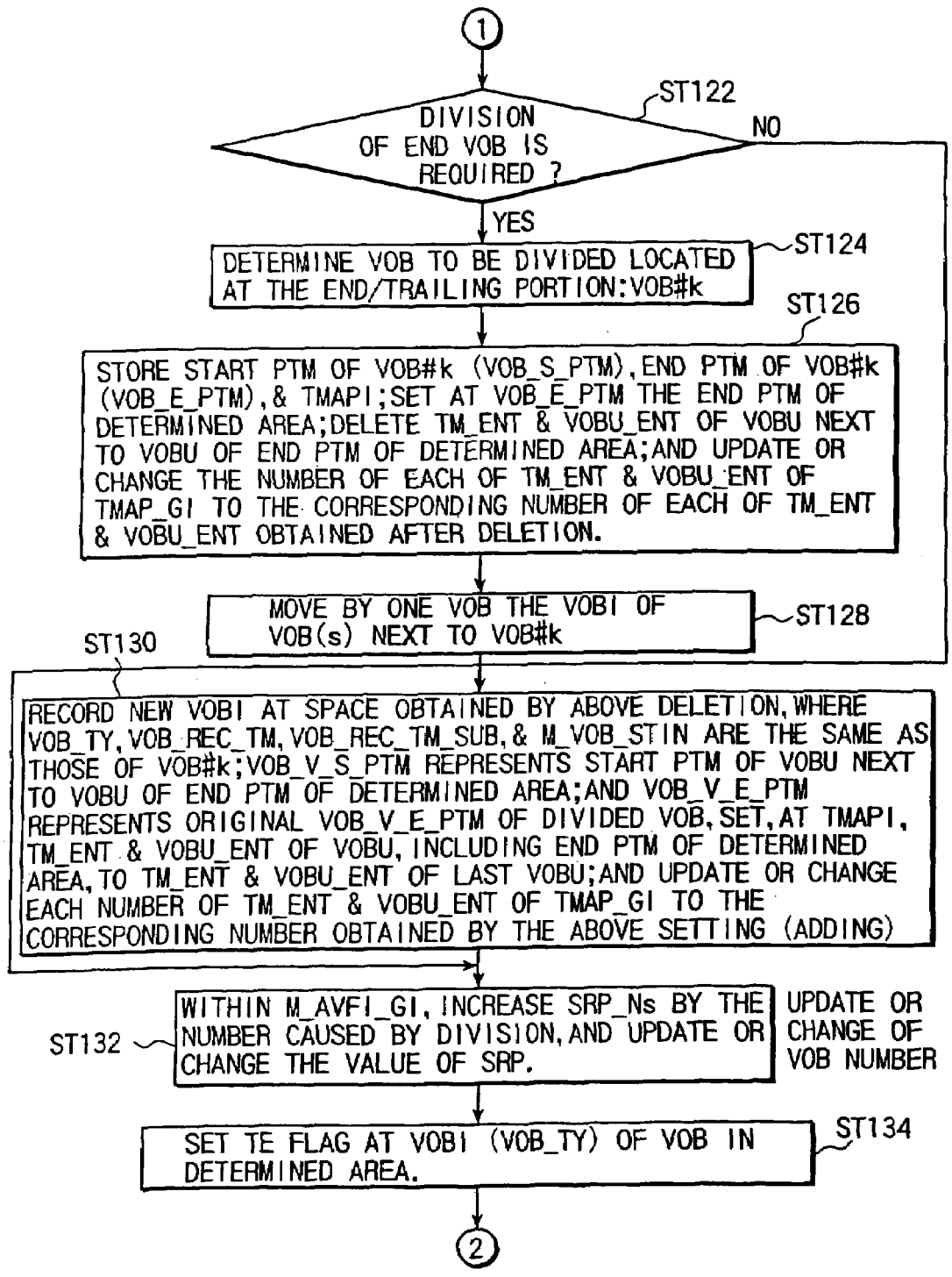

The reference will be made to FIG. 46.

It is checked whether a division of the end VOB is necessary (step ST122).

If the division of the end VOB is not necessary (NO at step ST122), the process goes to step ST132 described hereinafter.

When the division of the end VOB is necessary (YES at step ST122), the process goes to step ST124 described hereinafter.

When the division of the end VOB is necessary (YES at step ST122), the VOB (VOB#k) to be divided (which is located at the last portion) is determined (step ST124).

Then, start PTM of VOB#k (VOB_S_PTM), end PTM of VOB#k (VOB_E_PTM), and time map information (TMAPI) thereof are stored in the RAM or register of MPU 30 (step ST126).

At this time, the end PTM of the determined area is set at VOB_E_PTM (step ST126).

Further, the TM_ENT and the VOBU ENT of VOBU next to VOBU of end PTM of the determined area are deleted, and the number of each of TM_ENT and VOBU_ENT of TMAP_GI are updated or changed to the corresponding number of each of TM_ENT and VOBU_ENT obtained after the deletion (step ST126).

Then, video object information (VOBI) of VOB(s) next to VOB#k is moved by one VOB (step ST128).

A space is created by the deletion of step ST126. The new VOBI of step ST128 is recorded in the created space (step ST130), where VOB_TY, VOB_REC_TM, VOB_REC_TM_SUB, and M_VOB_STIN are the same as those of VOB#k. VOB_V_S_PTM represents the start PTM of VOBU next to the PTM of the end of the determined area. VOB_V_E_PTM (end PTM of this VOB) represents the original VOB_V_E_PTM of the divided VOB.

Further, data of a group from "the TM_ENT and VOBU_ENT of the VOBU next to the VOBU of the end PTM of the divided area" to "the TM_ENT and VOBU_ENT of the last VOBU" are set at TMAPI (step ST130).

Still further, each number of the TM_ENT and VOBU_ENT of TMAP_GI is updated or changed to the corresponding number obtained by the above setting at the TMAPI (step ST130).

Then, within a movie AV file information general information (M_AVFI_GI), the number of search pointers (SRP_Ns) is increased by the number of VOBI caused by the division, and the value of search pointer (SRP) is updated or changed (step ST132).

Thus, the VOB number is updated or changed.

Thereafter, a flag of the temporary erase (TE) is set at VOBI (VOB_TY) of VOB in the determined area (step ST134).

Figure 47:
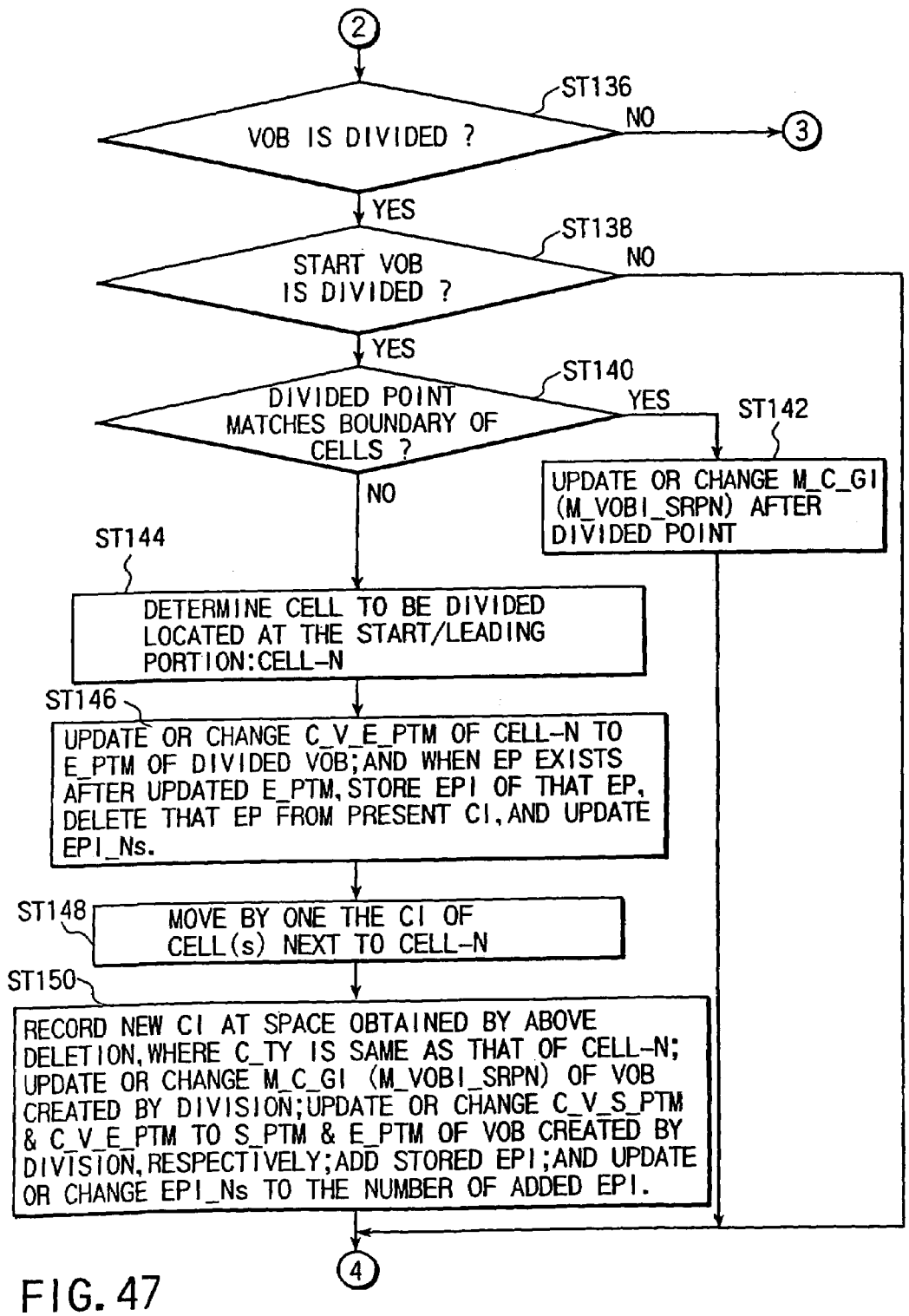

The reference will be made to FIG. 47.

It is checked whether (any) VOB is divided (step ST136).

If no VOB is divided (NO at step ST136), the process goes to step ST158 described hereinafter.

When any VOB is divided (YES at step ST136), it is further checked whether the divided VOB is the start VOB (step 138).

If the start VOB is not divided (NO at step ST138), the process goes to step ST158.

When the start VOB is divided (YES at step ST138), it is still further checked whether the divided point of the start VOB matches the boundary of related cells (step 140).

When the divided point matches the boundary of cells (or the boundary of VOBS) (YES at step ST140), no cell division (or VOB division) is necessary. Then, only movie VOBI search pointer number M_VOBI_SRPN in movie cell general information M_C_GI of cells after the divided point is updated or changed accordingly (step ST142).

Then, the process goes to step ST158.

If the divided point does not match the boundary of cells (or the boundary of VOBS) (NO at step ST140; see the vertically directed arrows in the illustration of FIG. 49 or 50), then the cell (called CELL-N) to be divided, located at the start or leading portion of the dividing area, is determined (step ST144).

The end PTM of CELL-N (C_V_E_PTM) is updated or changed to the end PTM (E_PTM) of the divided VOB (step ST146).

When any entry point (EP) exists after the updated E_PTM, the entry point information (EPI) of the EP is stored, the EP is deleted from the current (or present) cell information (CI), and the number of EPI (EPI_Ns) is updated so that the EPI_Ns is reduced by the number of deleted EP (step ST146).

Then, cell information (CI) of cell(s) next to CELL-N is moved by one CI (step ST148).

A space is created by the deletion of step ST146. The new CI of step ST148 is recorded in the created space (step ST150), where cell type (C_TY) is the same as that of CELL-N, the movie VOBI search pointer number (M_VOBI_SRPN) of M_C_GI of VOB created by division is updated or changed, the start PTM of the cell (C_V_S_PTM) and end PTM of the cell (C_V_E_PTM) are updated or changed to the start PTM (S_PTM) and end PTM (E_PTM) of VOB created by division, respectively, stored entry point information (EPI) is added, and the number of EPI (EPI_Ns) is updated or changed to the added number of EPI (step ST150).

Figure 48:
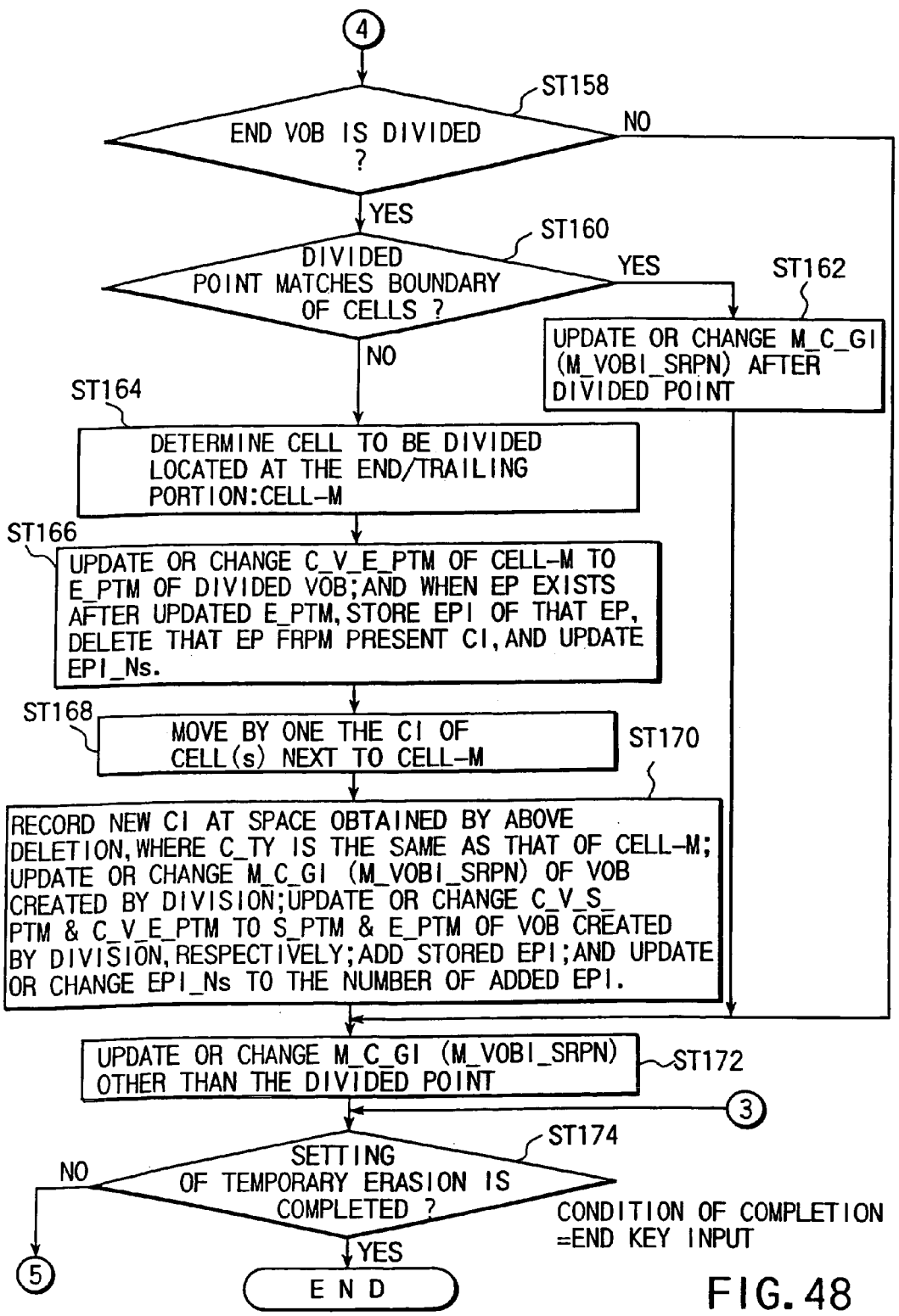

The reference will be made to FIG. 48.

If the end VOB is not divided (NO at step ST158), the process goes to step ST172.

When the end VOB is divided (YES at step ST158), it is checked whether the divided point of the end VOB matches the boundary of related cells (step 160).

When the divided point matches the boundary of cells (or the boundary of VOBS) (YES at step ST160), no cell division (or VOB division) is necessary. Then, only movie VOBI search pointer number M_VOBI_SRPN in movie cell general information M_C_GI of cells after the divided point is updated or changed accordingly (step ST162).

Then, the process goes to step ST172.

If the divided point does not match the boundary of cells (or the boundary of VOBS) (NO at step ST160), then the cell (called CELL-M) to be divided, located at the end or trailing portion of the dividing area, is determined (step ST164).

The end PTM of CELL-M (C_V_E_PTM) is updated or changed to the end PTM (E_PTM) of the divided VOB (step ST166).

When any entry point (EP) exists after the updated E_PTM, the entry point information (EPI) of the EP is stored, the EP is deleted from the current (or present) cell information (CI), and the number of EPI (EPI_NS) is updated so that the EPI_Ns is reduced by the number of deleted EP (step ST166).

Then, cell information (CI) of cell(s) next to CELL-M is moved by one CI (step ST168).

A space is created by the deletion of step ST166. The new CI of step ST168 is recorded in the created space (step ST170), where cell type (C_TY) is the same as that of CELL-M, the movie VOBI search pointer number (M_VOBI_SRPN) of M_C_GI of VOB created by division is updated or changed, the start PTM of the cell (C_V_S_PTM) and end PTM of the cell (C_V_E_PTM) are updated or changed to the start PTM (S_PTM) and end PTM (E_PTM) of VOB created by division, respectively, stored entry point information (EPI) is added, and the number of EPI (EPI_Ns) is updated or changed to the added number of EPI (step ST170).

Then, each M_VOBI SRPN in M_C GI of cells other than the divided point is updated or changed (step ST172).

At this time, information pieces, such as the total number of cells (CI_SRP_Ns) in PGC general information (PGC_GI), the number of cells (C_Ns) in program information (PGI), the cell information search pointer (CI_SRP), etc., are also updated or changed (step ST172).

Further, when user defined PGC information (UD_PGCI) exists, similar processing will be made with respect to UD_PGCI (step ST172).

Finally, the user may confirm whether or not the setting of temporary erasion is completed (step ST174).

If the temporary erasion is not completed (NO at step ST174), the process returns to step ST100 of FIG. 45.

When the user depresses an end key or the like, the condition of completing the temporary erasion setting is entered (YES at step ST174), and the operation of FIGS. 45-48 is finished.

The present invention is not limited to the aforementioned embodiment. Software that includes the processing sequences shown in the respective flow charts is recorded in advance on a recording medium (disc 10 shown in FIG. 1 or the like), and is read by a playback apparatus (or a personal computer with a DVD-RAM drive) to automatically set up an environment for implementing the processes of the respective flow charts.

In other words, the present invention includes a case wherein the medium itself has information (software application) for implementing the processes of the respective flow charts.

The characteristic features of the above-mentioned embodiment can be summarized as follows.

A recording medium is constructed by a management area and data area, which divisionally records data in one or more sequences (program chains). Each sequence consists of one or more cells, and one cell consists of one or more data units. Each data unit is recorded by packing video and audio data to be played back within a predetermined period of time in a plurality of packs. The management area (hierarchically) contains a management table for managing the sequences, a management table for managing the cells, and a management table for managing the data units.

Note that one feature is that temporary erasion playback sequence information (PGCI of trash PGC) is recorded in the management area. Another feature is that the temporary erasion playback sequence information records an original PGC number and cell number of a temporary erased cell.

A recording/playback method and apparatus are characterized by having a cell erasion level setting means for appending erasion level information to the cell management table. Also, the method and apparatus are characterized by having a cell division detection unit (a function of. MPU 30) for, when temporary erasion is designated in units of data units, checking if the designated data unit is present at a division of a cell, a cell division unit (another function of MPU 30) for dividing a cell when the cell is divided based on a signal from the detection unit, and an erasion level setting unit (still another function of MPU 30) for appending erasion level data to a cell corresponding to the designated data unit.

The playback method and apparatus are further characterized by having an erasion level range designation unit (still another function of MPU 30) for displaying time information corresponding to the playback time of a sequence, and designating an erasion level range using the time information, and a video display unit (still another function of MPU 30) for displaying video data of a data unit closest to a display time corresponding to the designated time position, so as to allow the user to easily set (or cancel) the erasion level.

Furthermore, the method and apparatus are characterized by having an erasion level designation unit (still another function of MPU 30) for displaying time information corresponding to the playback time of a sequence, and designating an erasion prohibition range using the time information, and a video display unit (still another function of MPU 30) for displaying the playback time corresponding to the designated time position, so as to allow the user to easily set (or cancel) the erasion level.

Moreover, the recording/playback method and apparatus are characterized by having a cell designation unit (still another function of MPU 30) for designating a temporary erased area in units of cells, and a cell recovery unit (still another function of MPU 30) for recovering a cell designated by the designation unit.

Further, the method and apparatus are characterized by having a cell designation unit (still another function of MPU 30) for designating a temporary erased area in units of cells, and a cell actual erasion unit (still another function of MPU 30) for actually erasing the cell designated by the cell designation unit.

In addition, the method and apparatus for recording/playing back information on/from a recordable recording medium are characterized by having a cell arranging unit (still another function of MPU 30) for erasing a temporary erased cell when the remaining recordable space becomes smaller than a predetermined amount.

Also, the method and apparatus are characterized by having a PGC arranging unit (still another function of MPU 30) for erasing trash PGC after the temporary erased cell has been erased.

The method and apparatus are also characterized by having a trash PGCI creation unit (still another function of MPU 30) for creating sequence information which can be played back as a sequence that can be played back by joining temporary erased cells.

Furthermore, the method and apparatus are characterized by having a recording unit for recording sequence information from the trash PGCI creation unit.

Moreover, the method and apparatus are characterized by having a trash PGCI display unit for displaying sequence information which can be played back as a sequence that can be played back by joining temporary erased cells.

To restate, according to the present invention, the erasion level can be designated (or canceled) in small units, thereby allowing flexible data management.

The invention claim is:

1. An apparatus for reproducing information from an information recording medium, the information recording medium comprising,
    a data area configured to store said audio/video data included in one or more video objects; and
    a management area separate from said data area and configured to store said control information,
    wherein said control information includes movie AV file information having movie video object information corresponding to one of said video objects,
    said movie AV file information includes M_AVFI general information and one or more movie VOBI search pointers,
    said movie video object information includes time map information containing time map general information,
    said time map general information includes time offset for said time map information,
    said movie video object information includes movie video object general information containing temporary erase information of one of said video objects,
    one of said video objects is configured to be set at a temporarily erased state, said temporarily erased state indicated by said temporary erase information,
    a video object corresponding to said temporarily erased state results from a division of an original video object including said audio/video data,
    a start position of said division is set as time information,
    said control information includes program chain information having cell information corresponding to a cell,
    said cell information includes cell general information and one or more pieces of cell entry point information corresponding to cell entry points of said cell,
    said cell general information includes information of a type of said cell, movie VOBI search pointer numeral information corresponding to one of said video objects of said cell, information describing a number of said cell entry point information, information describing a presentation start time of said cell, and information describing a presentation end time of said cell, and
    one piece of said cell entry point information includes type information of one of said cell entry points and information of a presentation time for one of said cell entry points,
    said apparatus comprising:
    a first reproducer configured to reproduce said control information from the management area; and
    a second reproducer configured to reproduce said audio/video data from the data area.

2. A method for recording information on an information recording medium, the information recording medium comprising,
    a data area configured to store said audio/video data included in one or more video objects; and
    a management area separate from said data area and configured to store said control information,
    wherein said control information includes movie AV file information having movie video object information corresponding to one of said video objects,
    said movie AV file information includes M_AVFI general information and one or more movie VOBI search pointers,
    said movie video object information includes time map information containing time map general information,
    said time map general information includes time offset for said time map information,
    said movie video object information includes movie video object general information containing temporary erase information of one of said video objects,
    one of said video objects is configured to be set at a temporarily erased state, said temporarily erased state indicated by said temporary erase information,
    a video object corresponding to said temporarily erased state results from a division of an original video object including said audio/video data,
    a start position of said division is set as time information,
    said control information includes program chain information having cell information corresponding to a cell,
    said cell information includes cell general information and one or more pieces of cell entry point information corresponding to cell entry points of said cell,
    said cell general information includes information of a type of said cell, movie VOBI search pointer numeral information corresponding to one of said video objects of said cell, information describing a number of said cell entry point information, information describing a presentation start time of said cell, and information describing a presentation end time of said cell, and
    one piece of said cell entry point information includes type information of one of said cell entry points and information of a presentation time for one of said cell entry points,
    said method comprising:
    recording said audio/video data on the data area; and
    recording said control information on the management area.

3. A method for reproducing information from an information recording medium, the information recording medium comprising,
    a data area configured to store said audio/video data included in one or more video objects; and
    a management area separate from said data area and configured to store said control information,
    wherein said control information includes movie AV file information having movie video object information corresponding to one of said video objects,
    said movie AV file information includes M_AVFI general information and one or more movie VOBI search pointers,
    said movie video object information includes time map information containing time map general information,
    said time map general information includes time offset for said time map information, said movie video object information includes movie video object general information containing temporary erase information of one of said video objects, one of said video objects is configured to be set at a temporarily erased state, said temporarily erased state indicated by said temporary erase information, a video object corresponding to said temporarily erased state results from a division of an original video object including said audio/video data, a start position of said division is set as time information, said control information includes program chain information having cell information corresponding to a cell, said cell information includes cell general information and one or more pieces of cell entry point information corresponding to cell entry points of said cell, said cell general information includes information of a type of said cell, movie VOBI search pointer numeral information corresponding to one of said video objects of said cell, information describing a number of said cell entry point information, information describing a presentation start time of said cell, and information describing a presentation end time of said cell, and one piece of said cell entry point information includes type information of one of said cell entry points and information of a presentation time for one of said cell entry points, said method comprising:

reproducing said control information from the management area; and reproducing said audio/video data from the data area.

* * * * *